Sept. 9, 1930.  T. CAHILL  1,775,222
TYPE COMPOSING MACHINE AND OTHER SIMILAR INSTRUMENT
Filed Dec. 8, 1927  34 Sheets-Sheet 1

Sept. 9, 1930. T. CAHILL 1,775,222
TYPE COMPOSING MACHINE AND OTHER SIMILAR INSTRUMENT
Filed Dec. 8, 1927 34 Sheets-Sheet 2
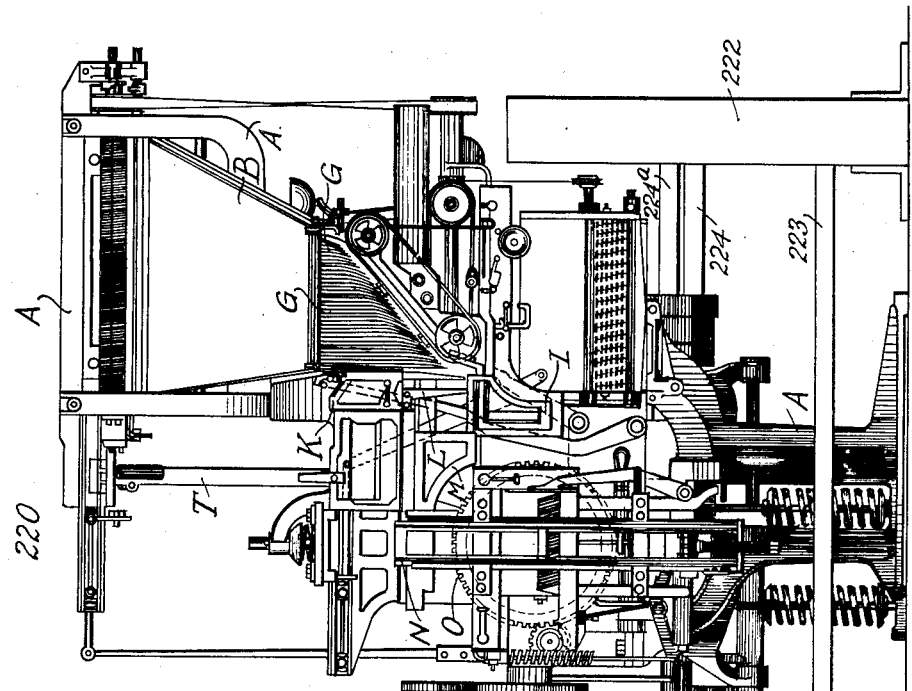
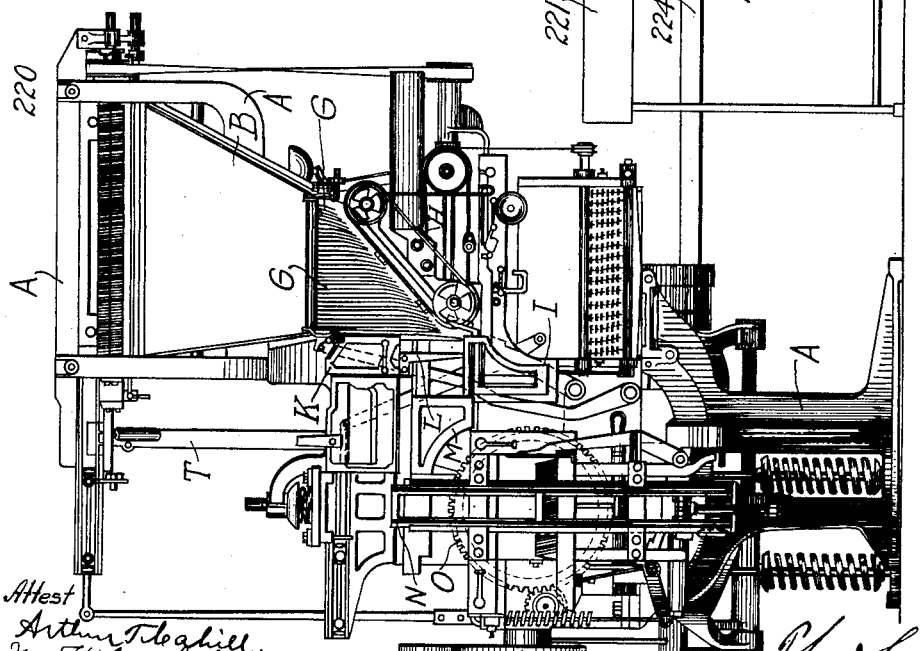

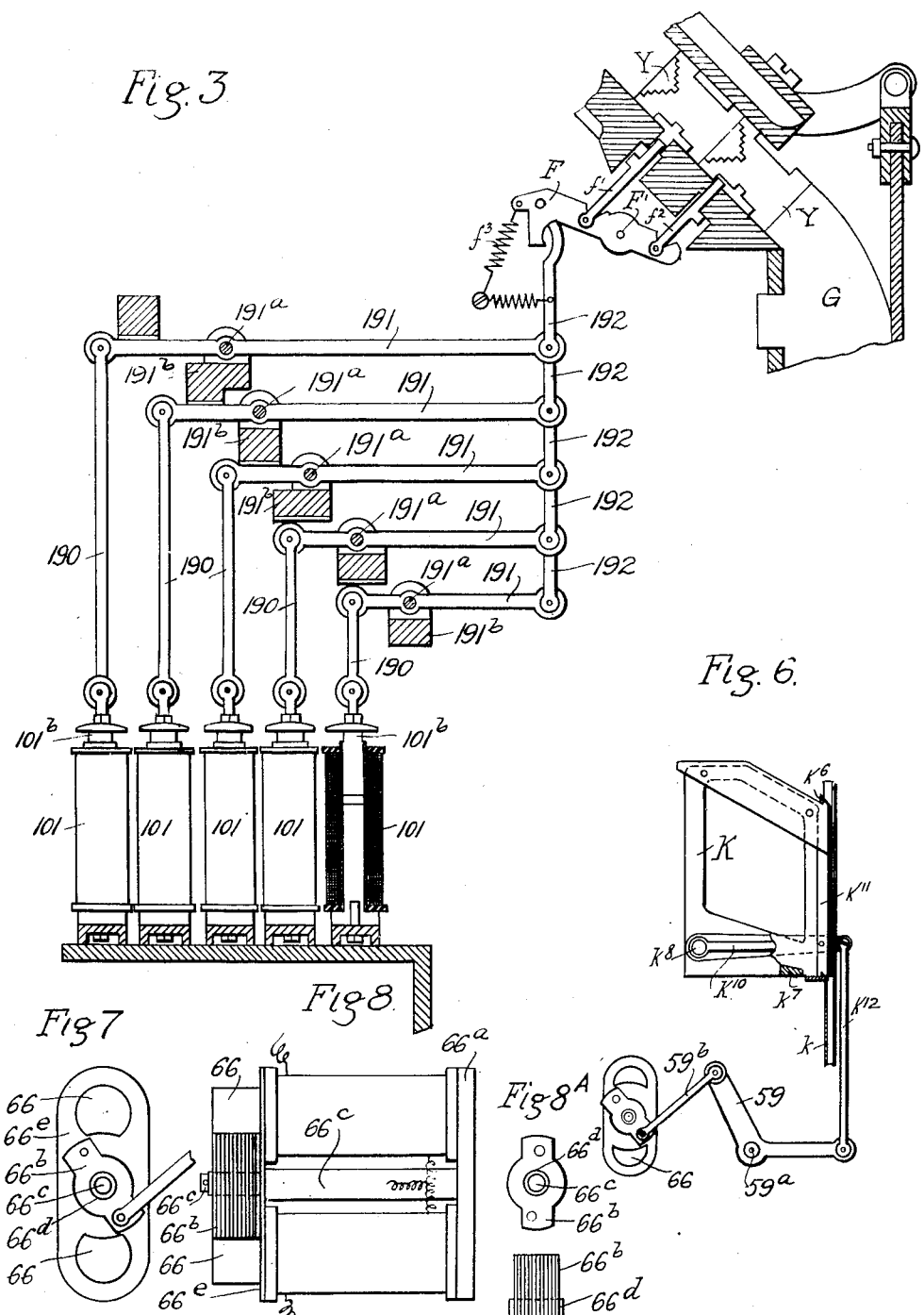

Sept. 9, 1930. T. CAHILL 1,775,222
TYPE COMPOSING MACHINE AND OTHER SIMILAR INSTRUMENT
Filed Dec. 8, 1927 34 Sheets-Sheet 4

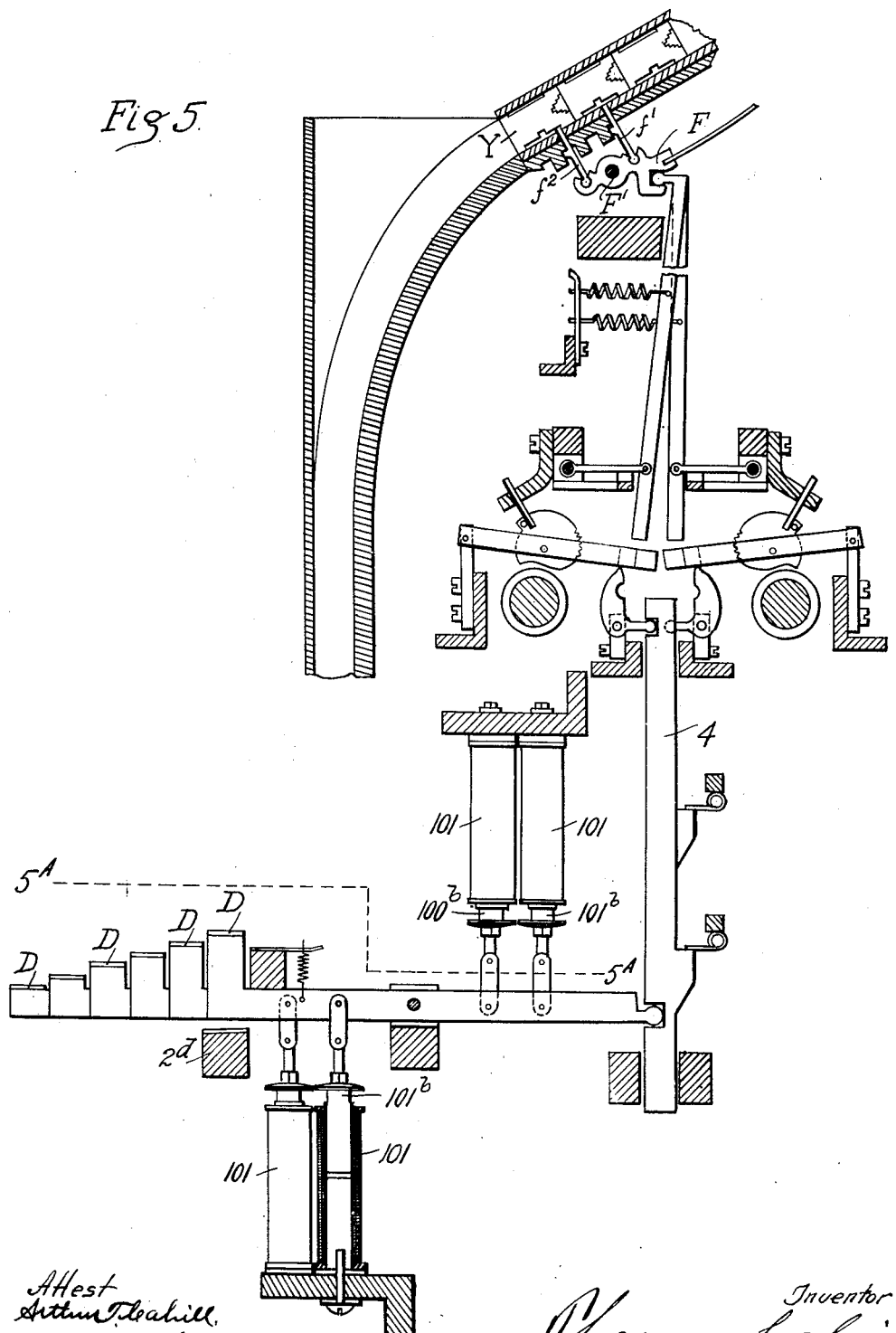

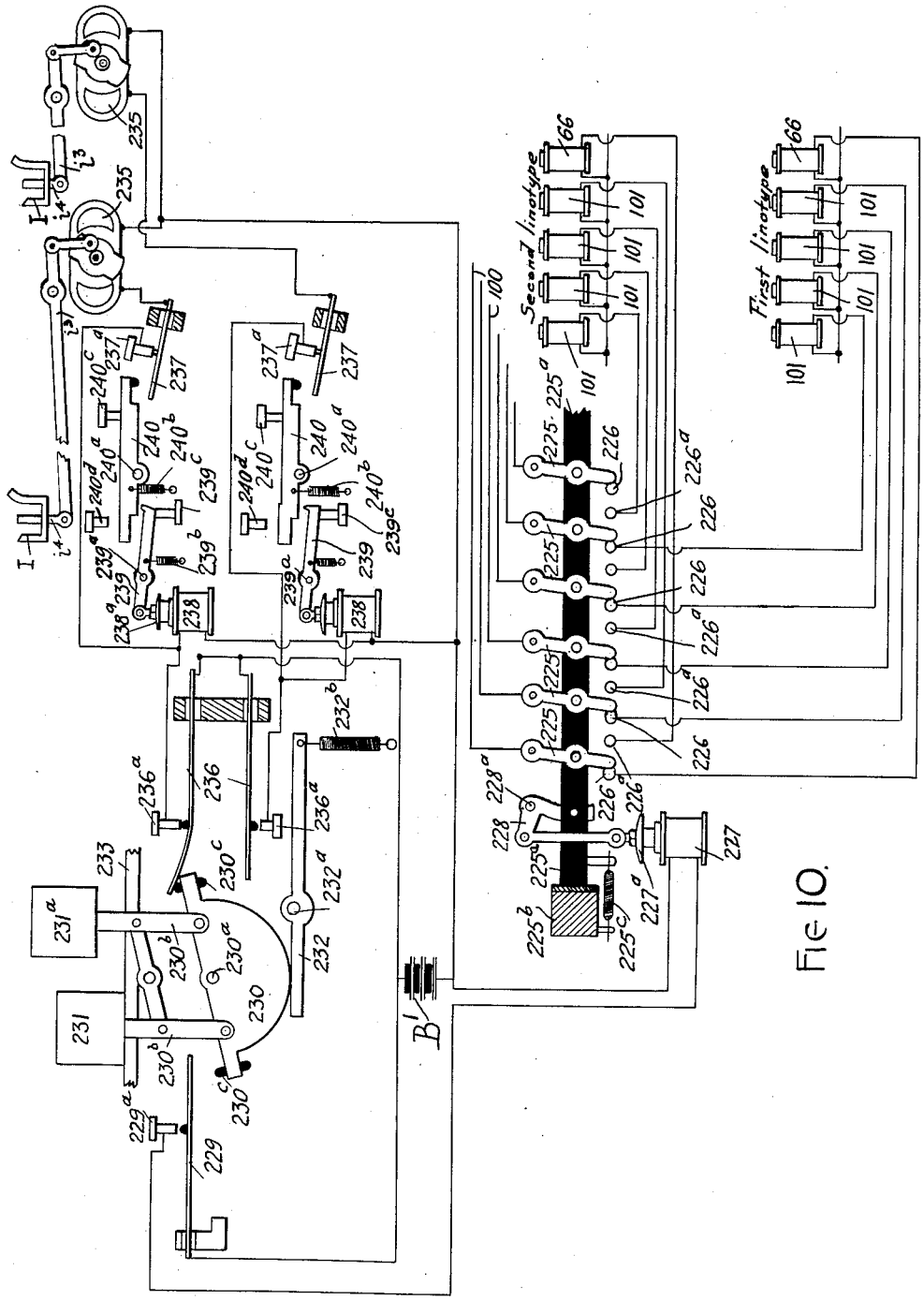

Sept. 9, 1930. T. CAHILL 1,775,222
TYPE COMPOSING MACHINE AND OTHER SIMILAR INSTRUMENT
Filed Dec. 8, 1927 34 Sheets-Sheet 7
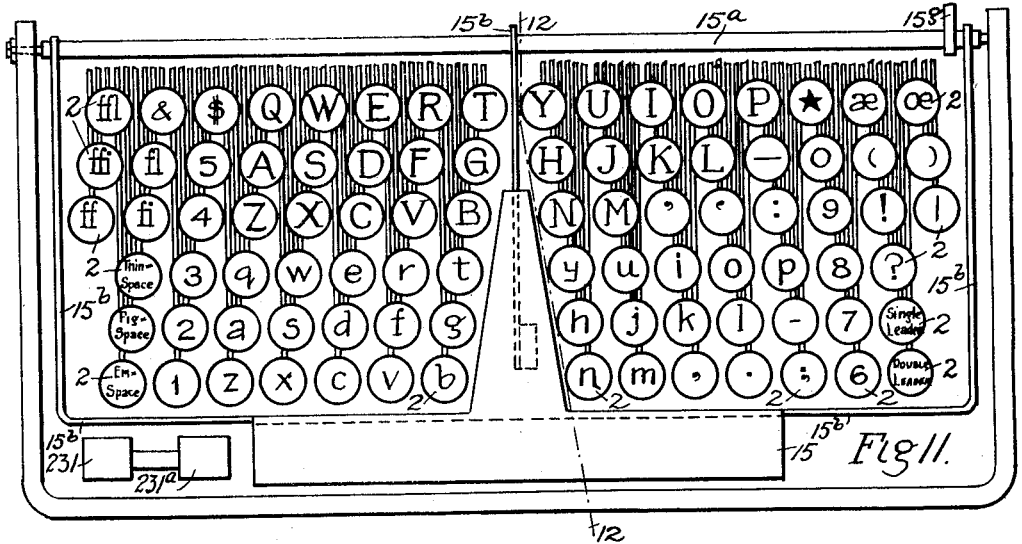
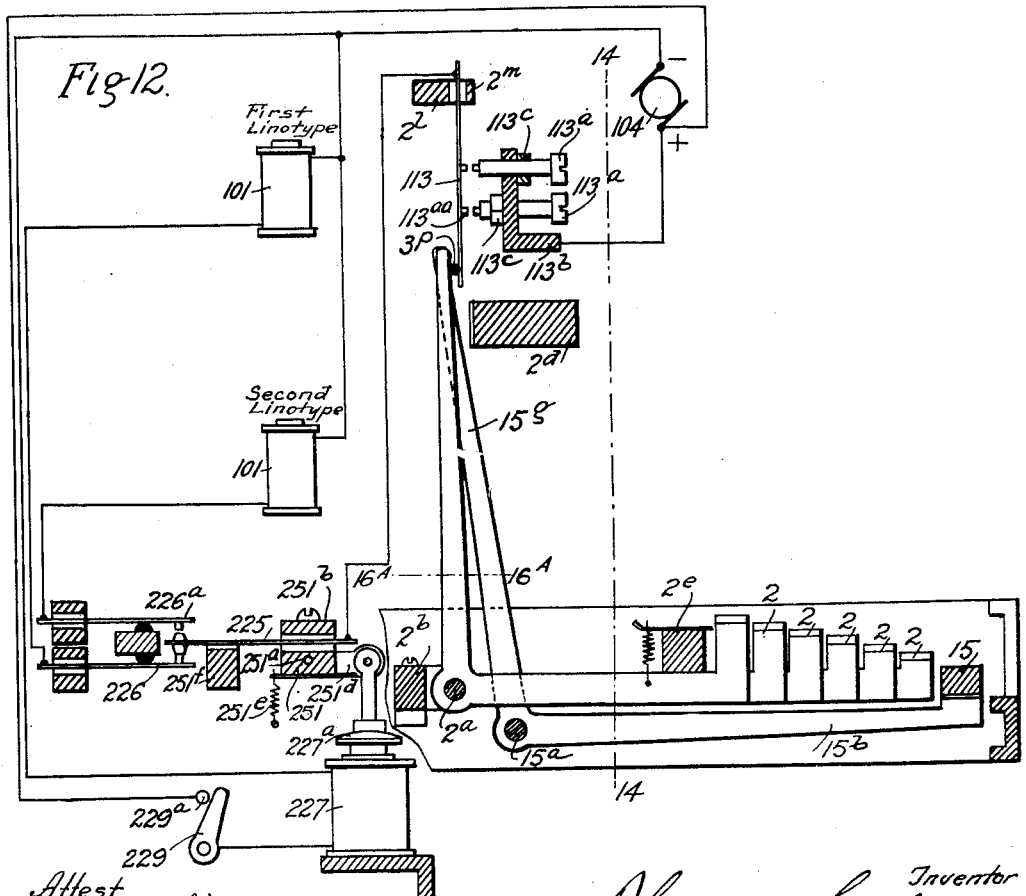

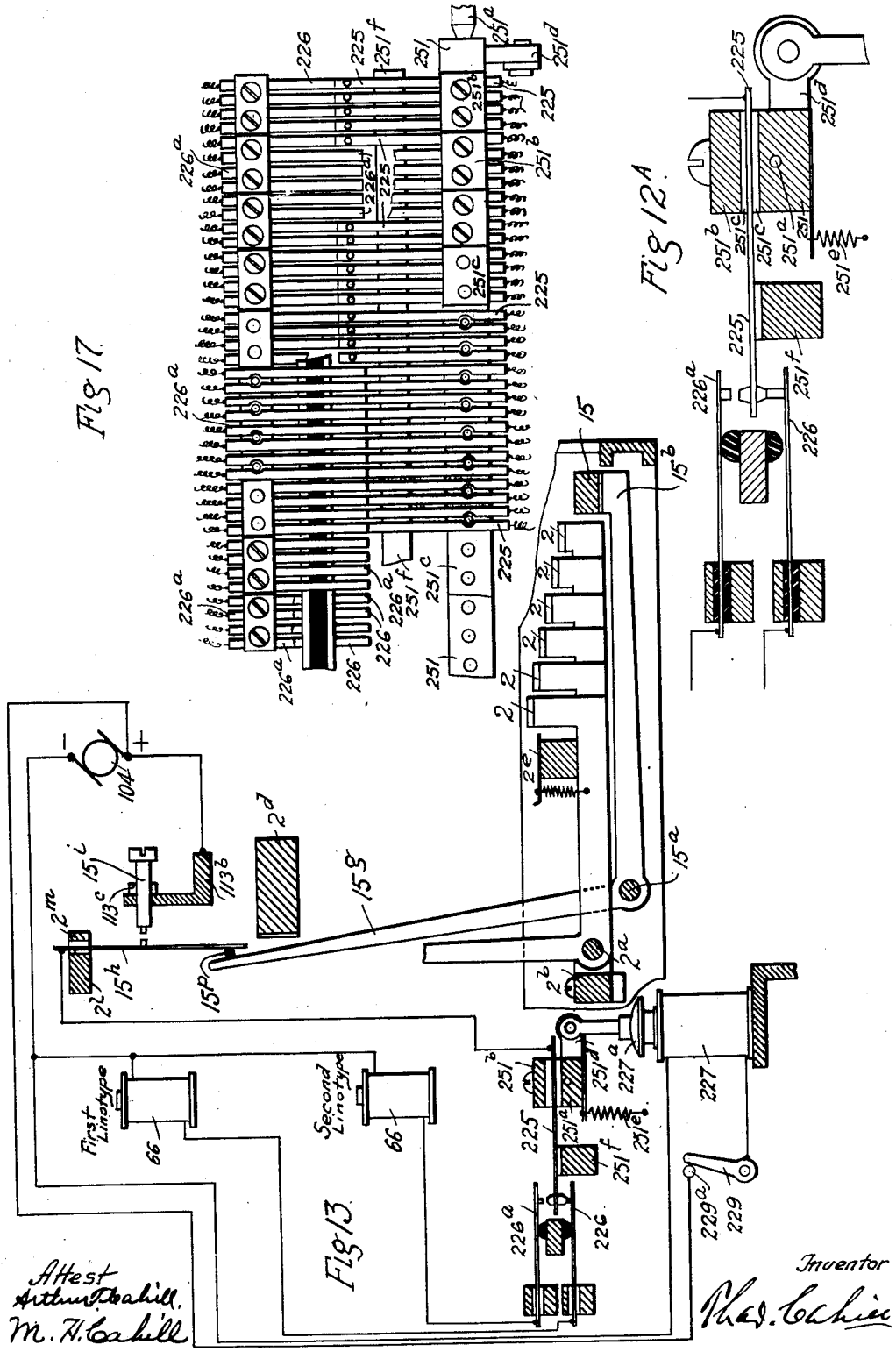

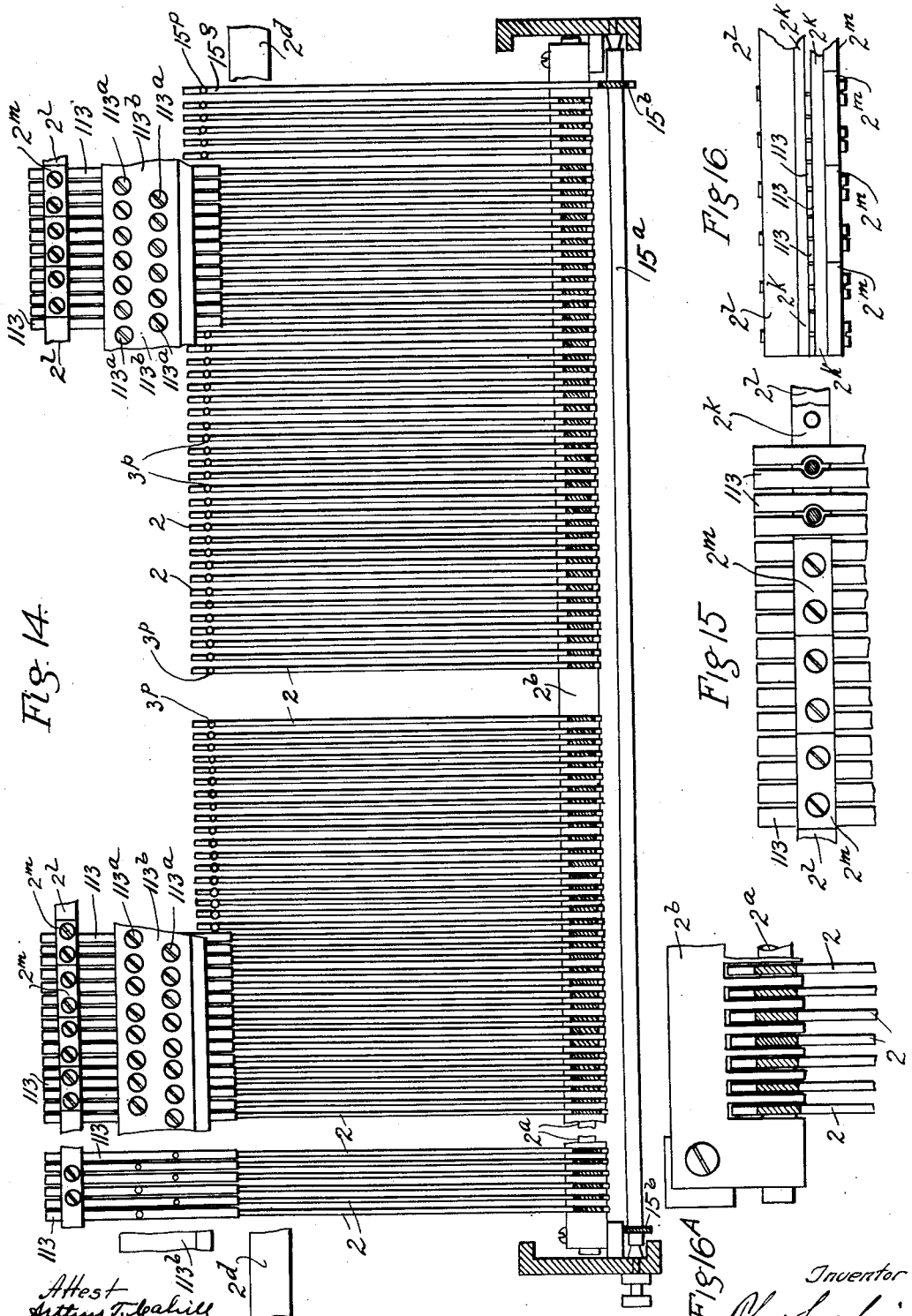

Sept. 9, 1930. T. CAHILL 1,775,222
TYPE COMPOSING MACHINE AND OTHER SIMILAR INSTRUMENT
Filed Dec. 8, 1927 34 Sheets-Sheet 10

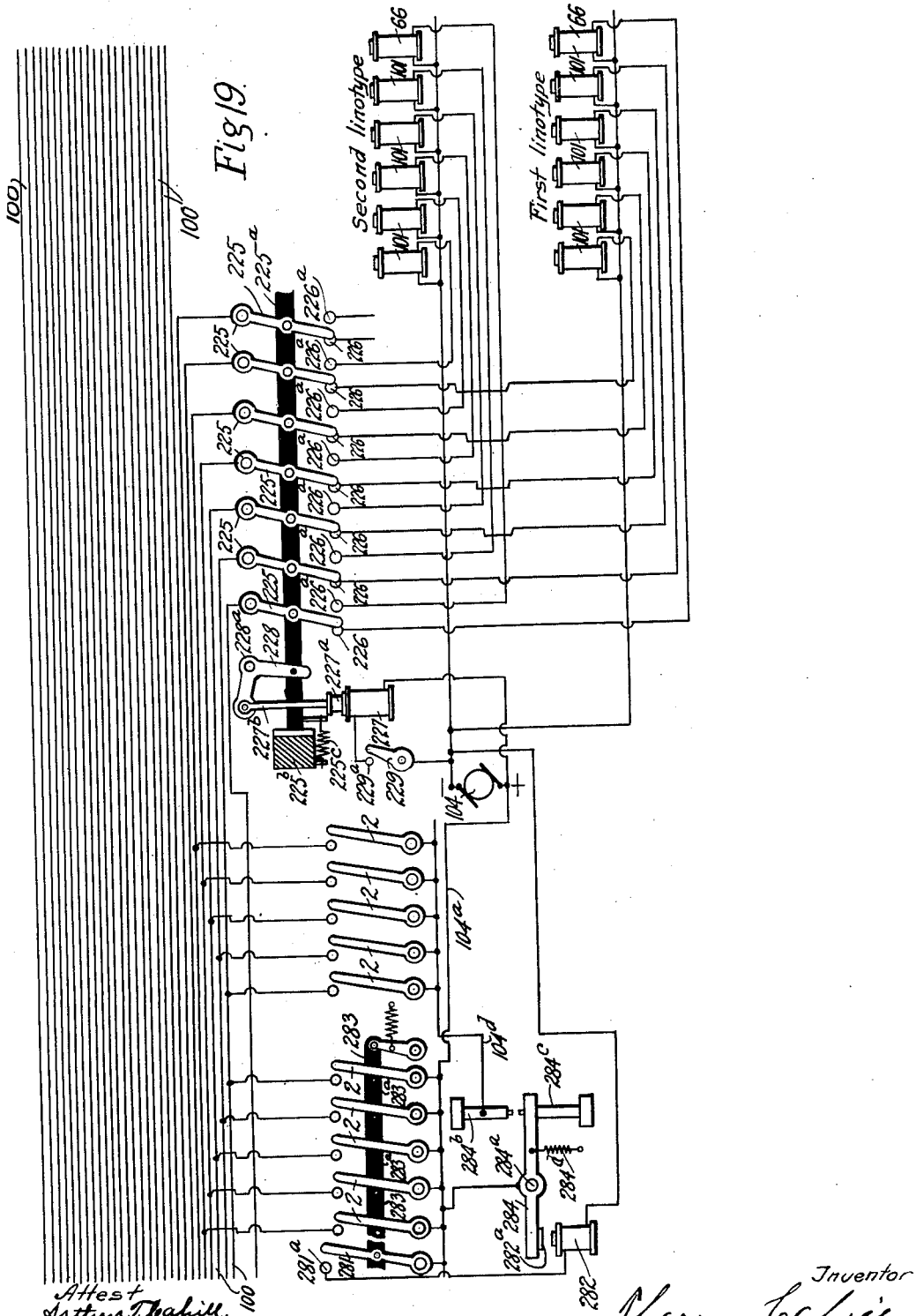

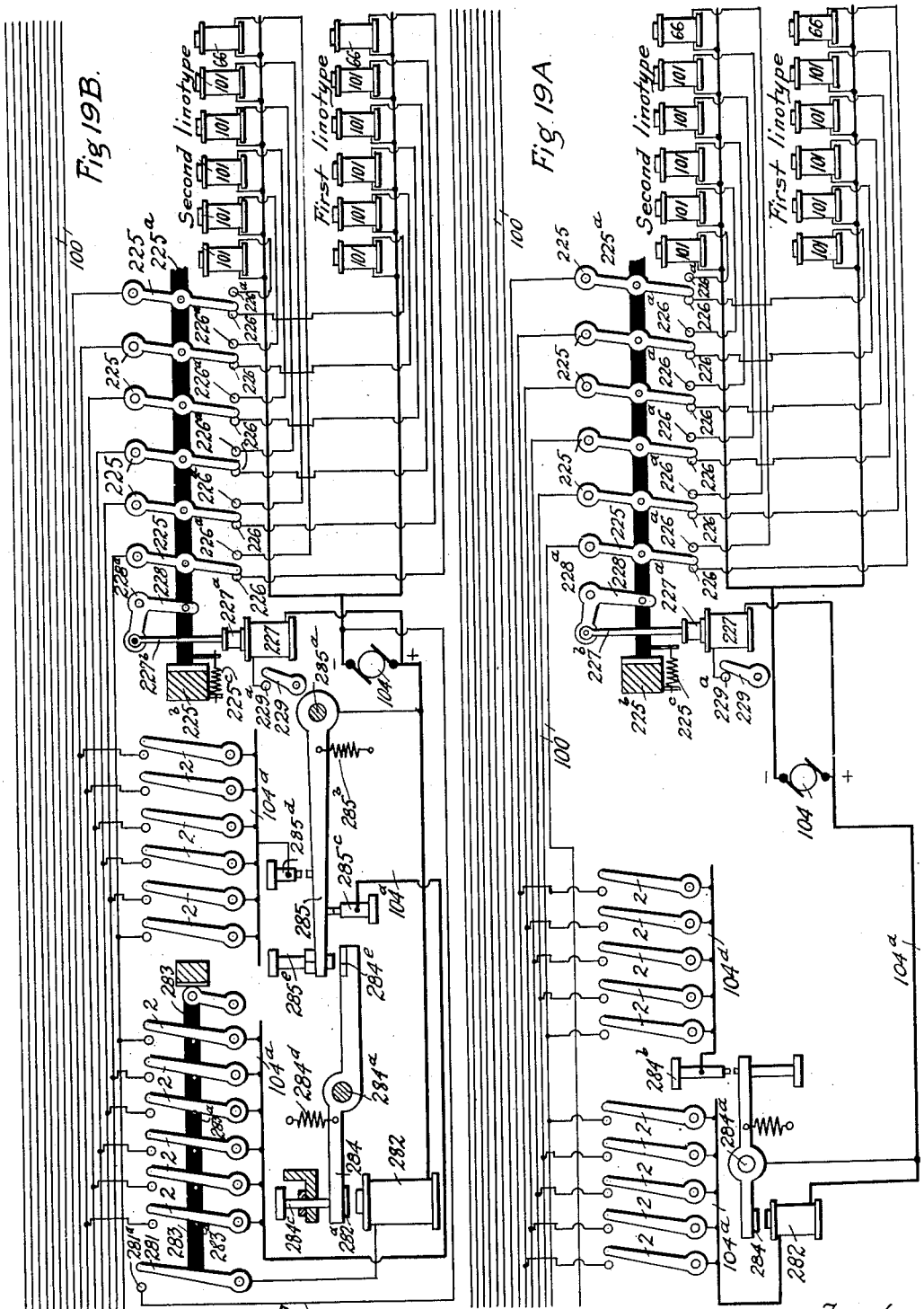

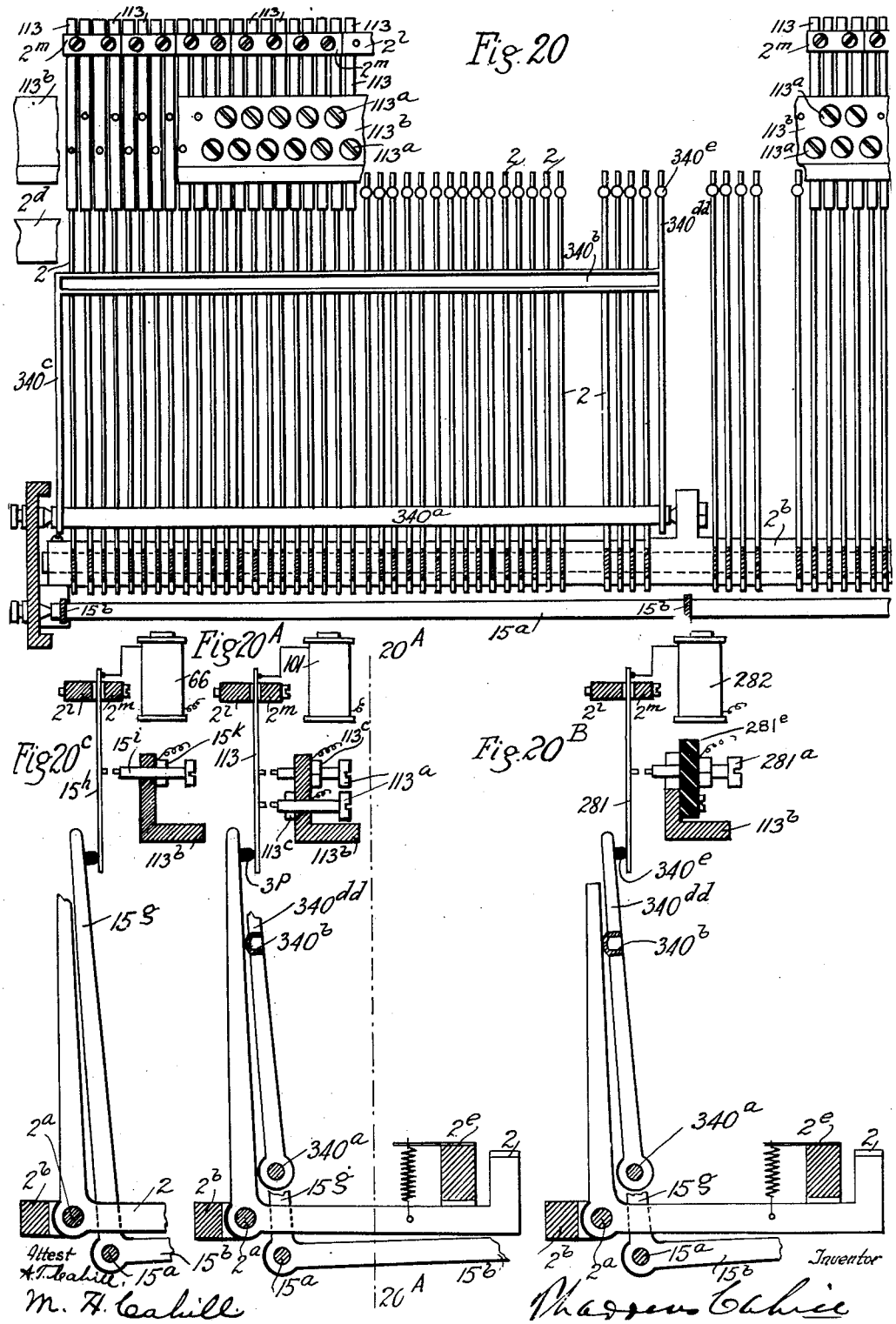

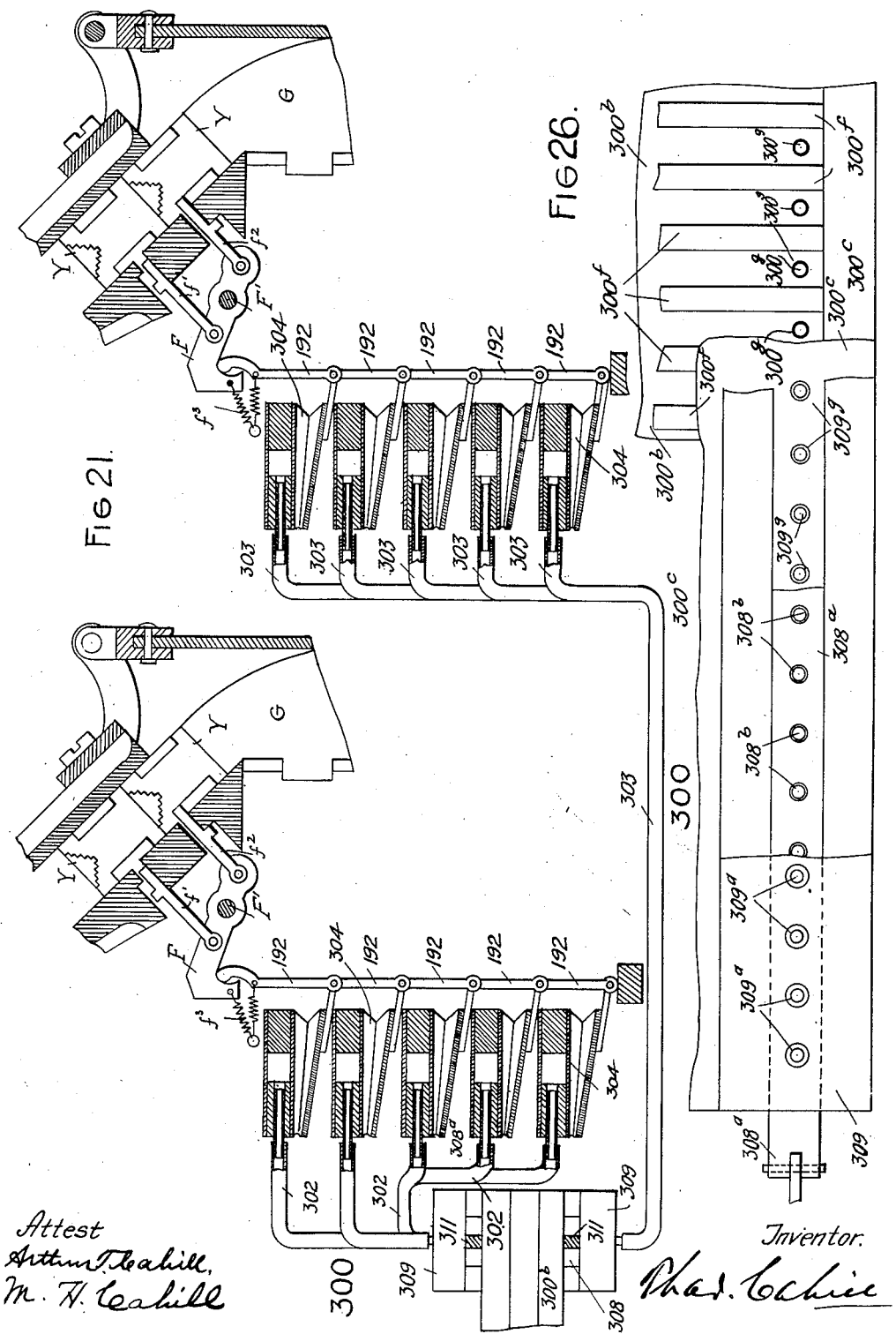

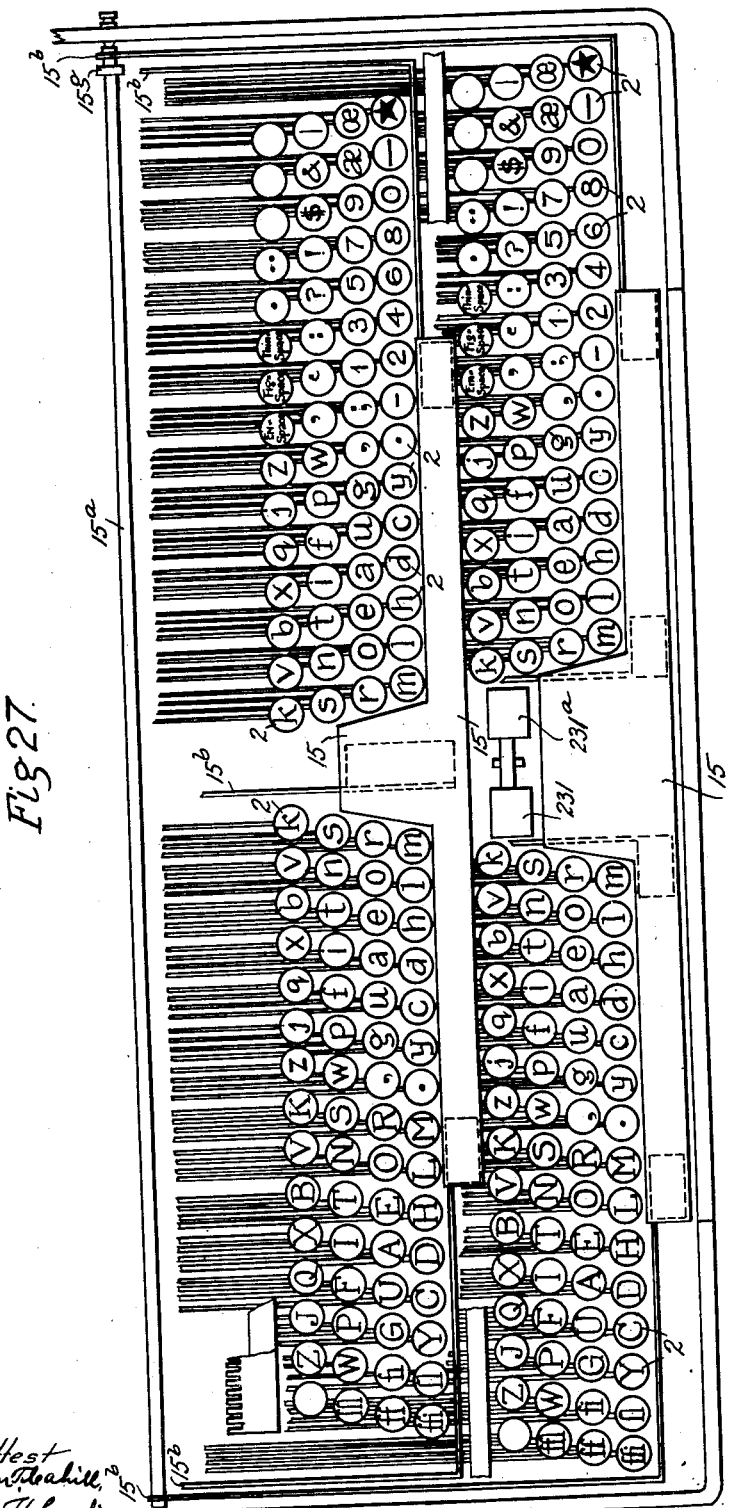

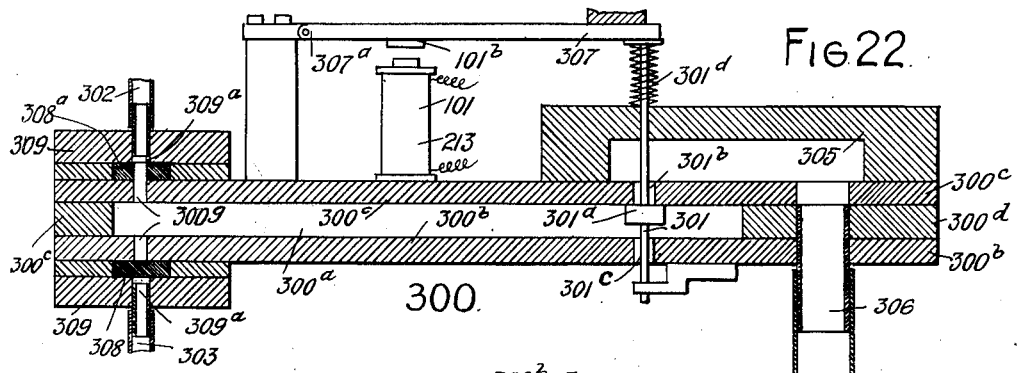
Fig.22.
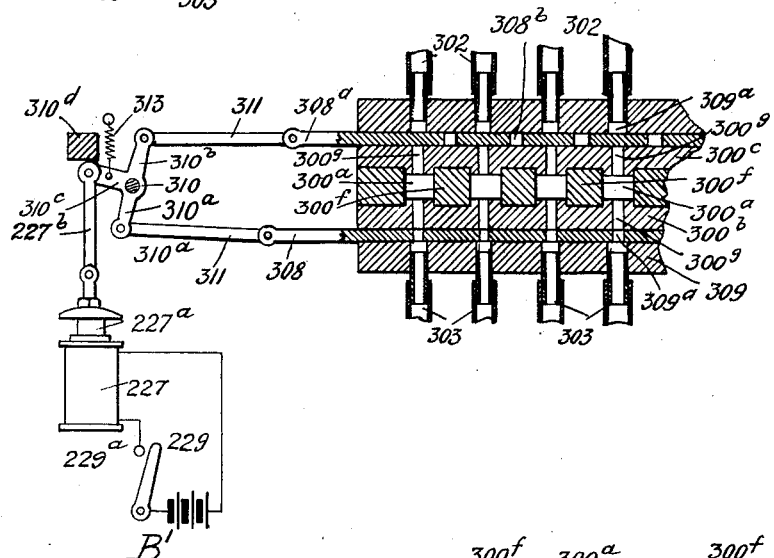
Fig.23.
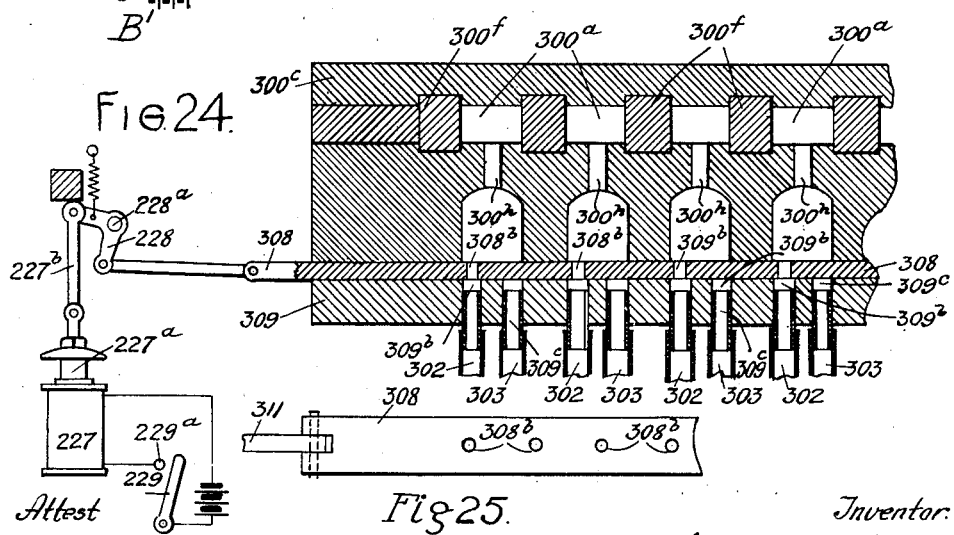
Fig.24.
Fig.25.

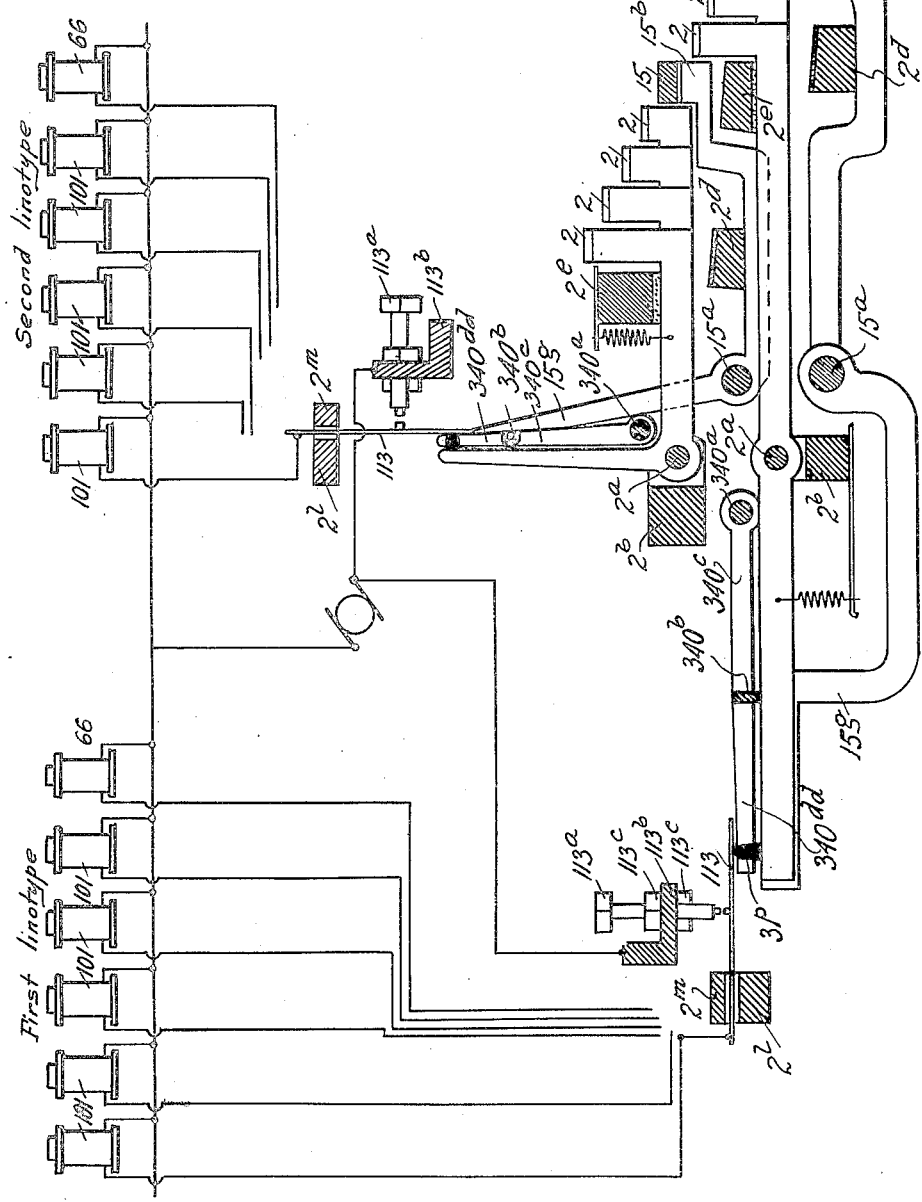

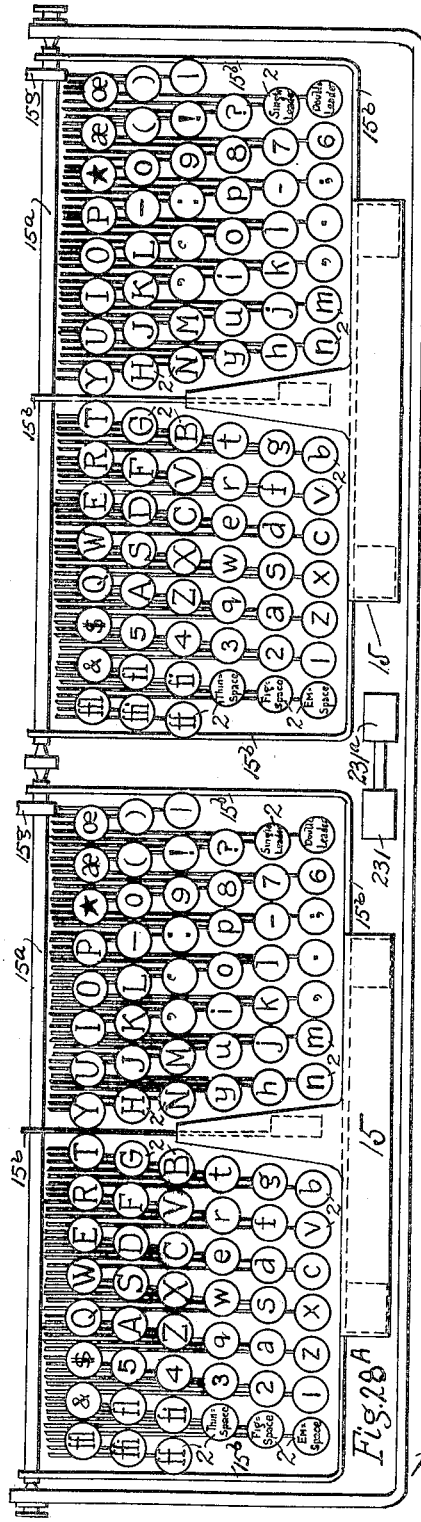

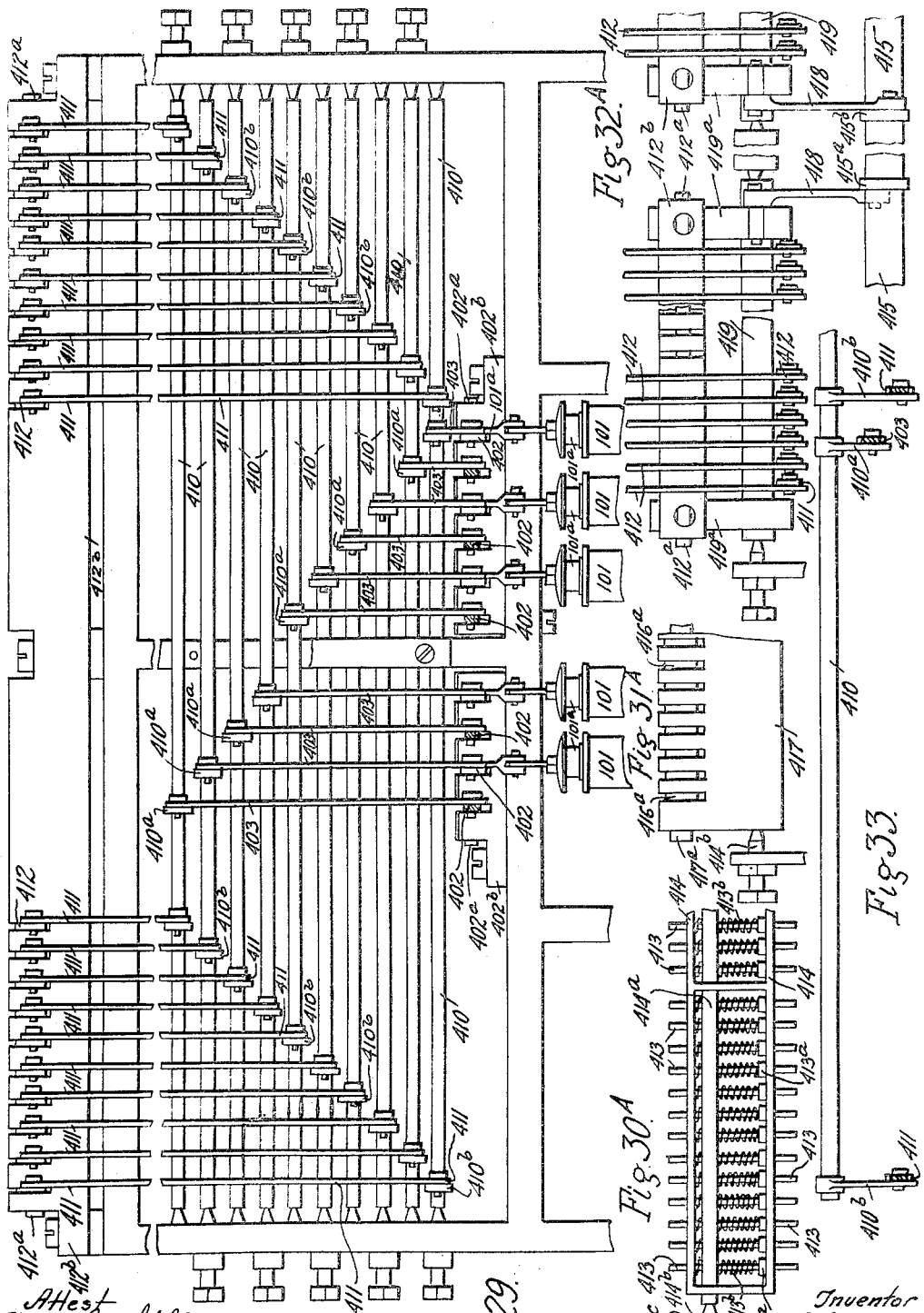

Sept. 9, 1930. T. CAHILL 1,775,222
TYPE COMPOSING MACHINE AND OTHER SIMILAR INSTRUMENT
Filed Dec. 8, 1927 34 Sheets-Sheet 20
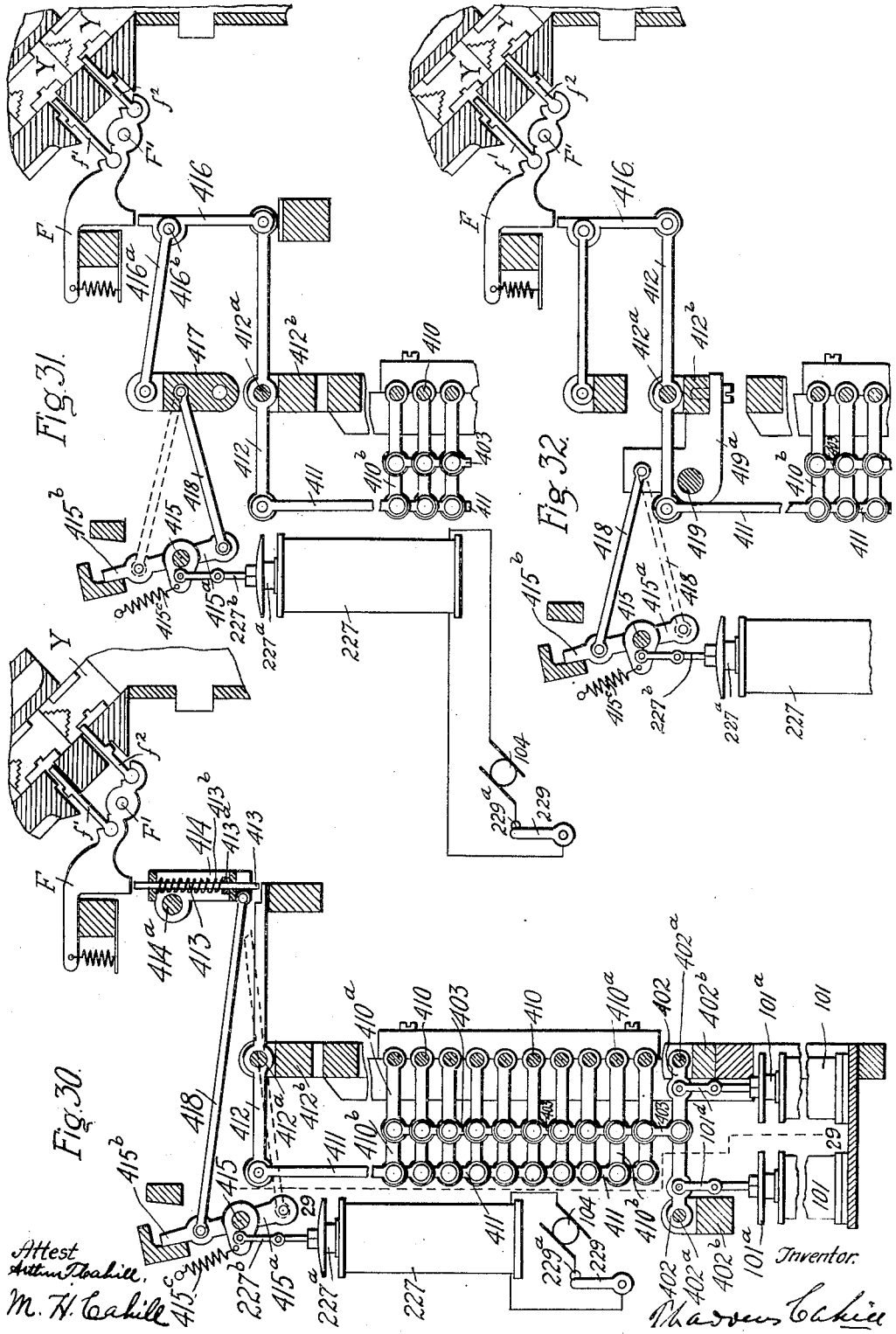

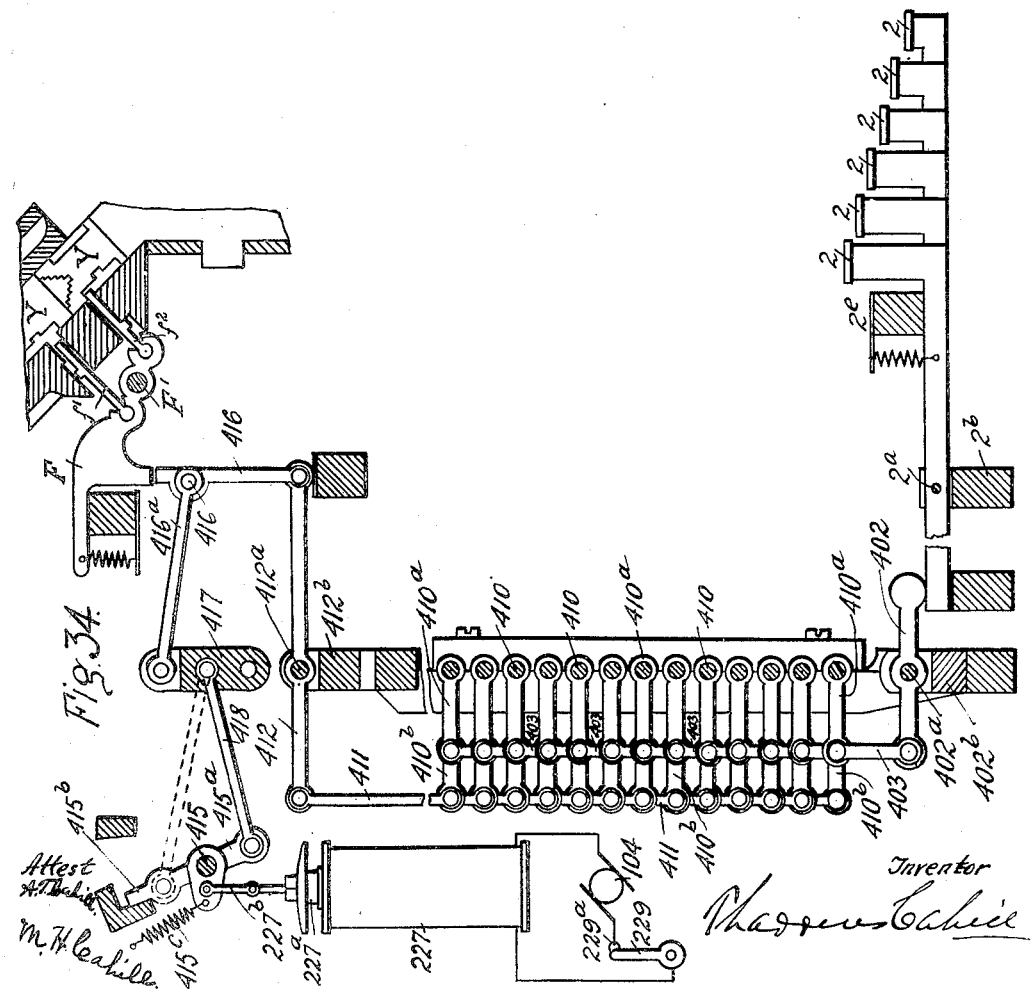

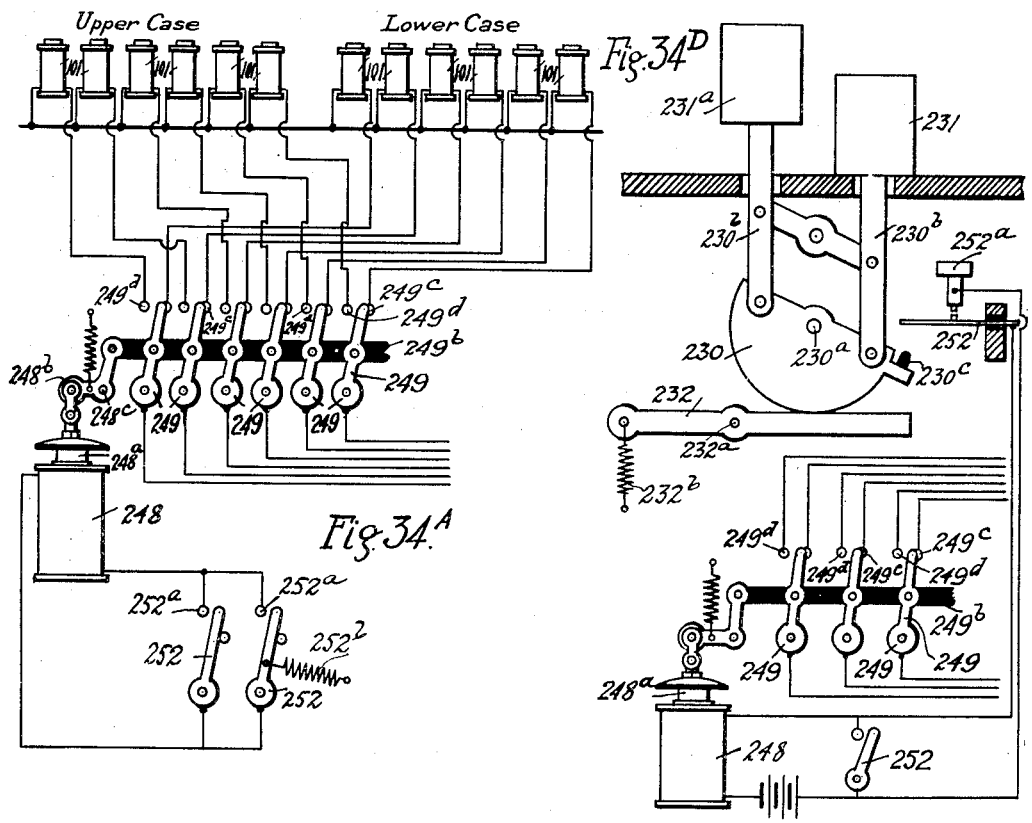
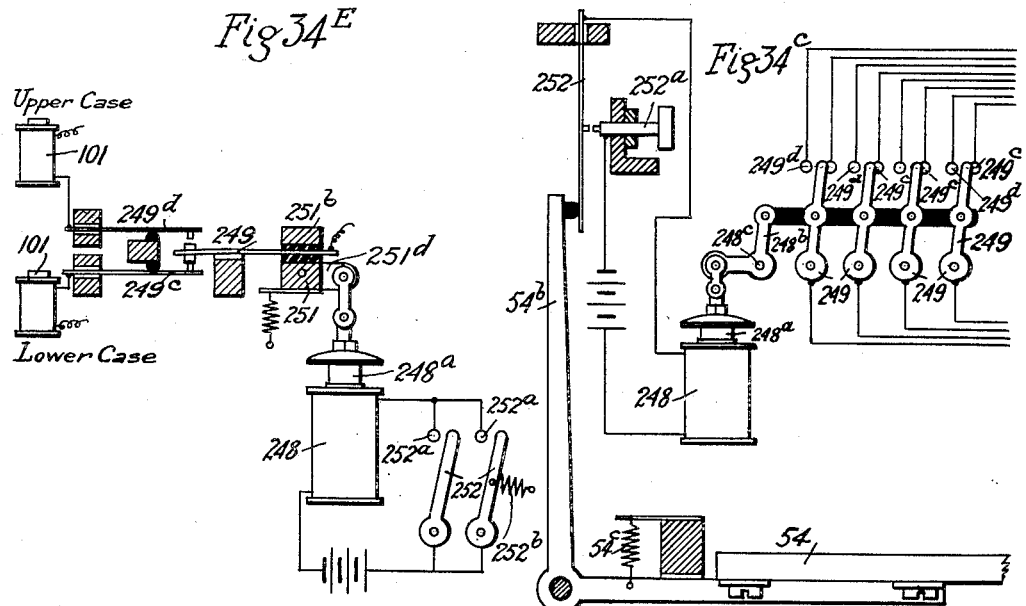

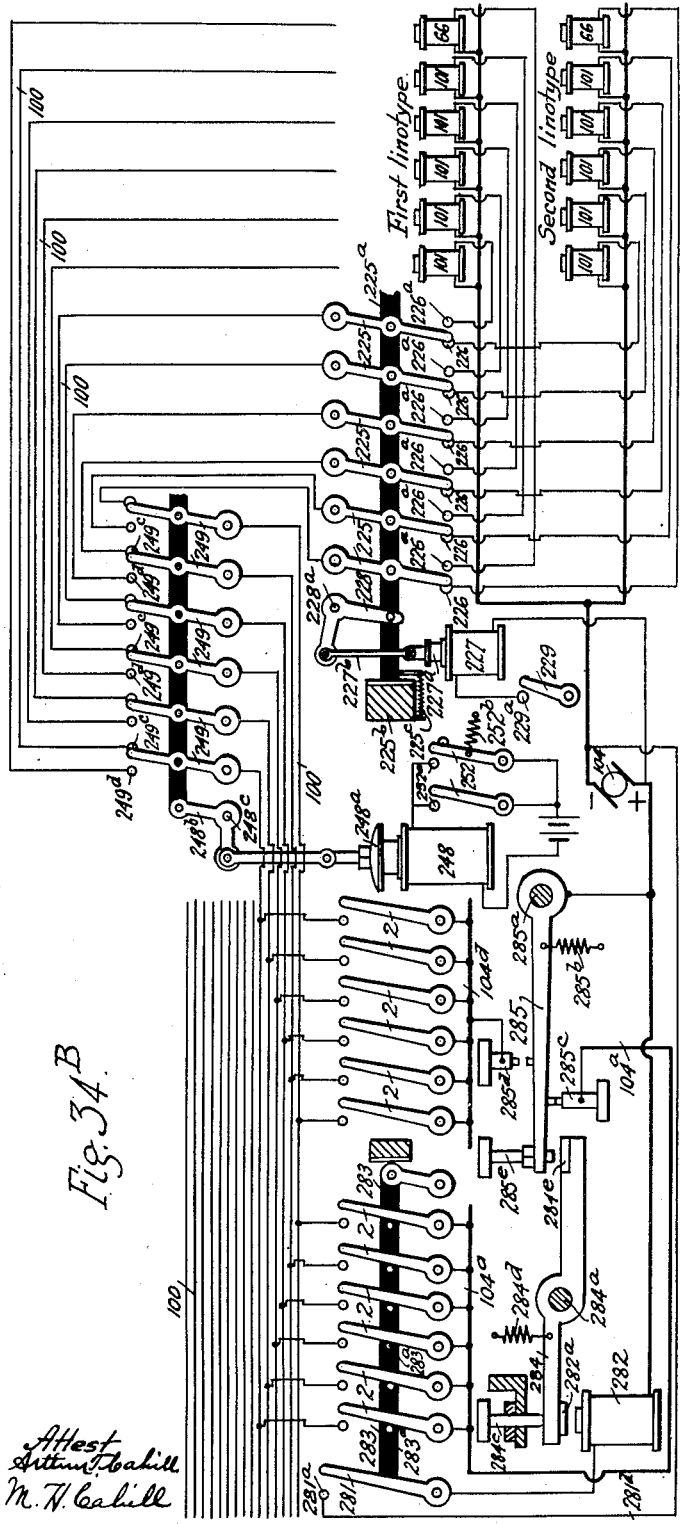

Sept. 9, 1930. T. CAHILL 1,775,222
TYPE COMPOSING MACHINE AND OTHER SIMILAR INSTRUMENT
Filed Dec. 8, 1927 34 Sheets-Sheet 24
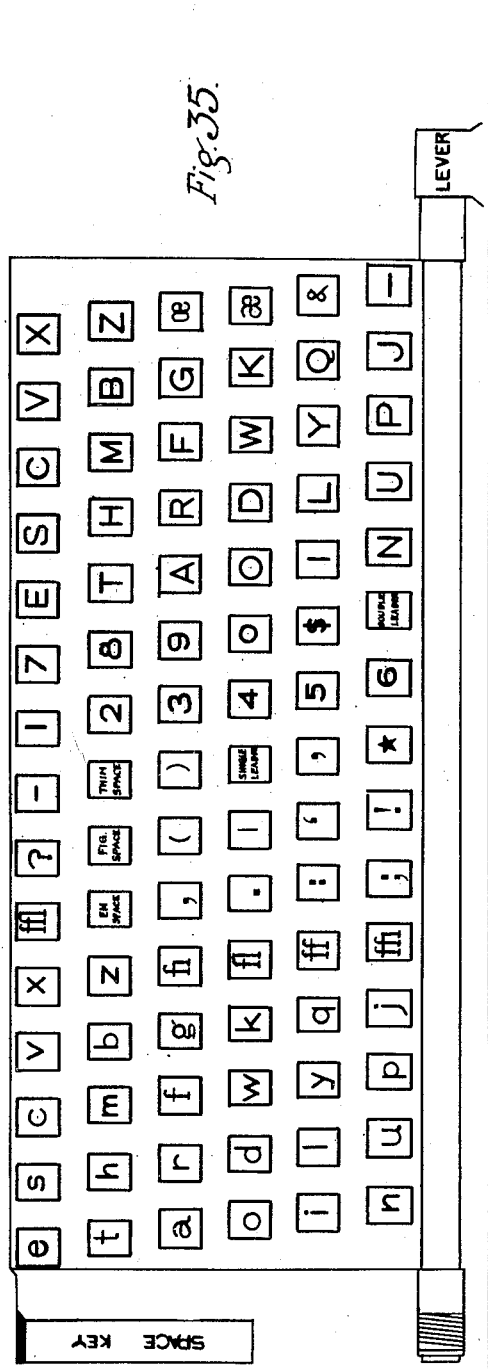
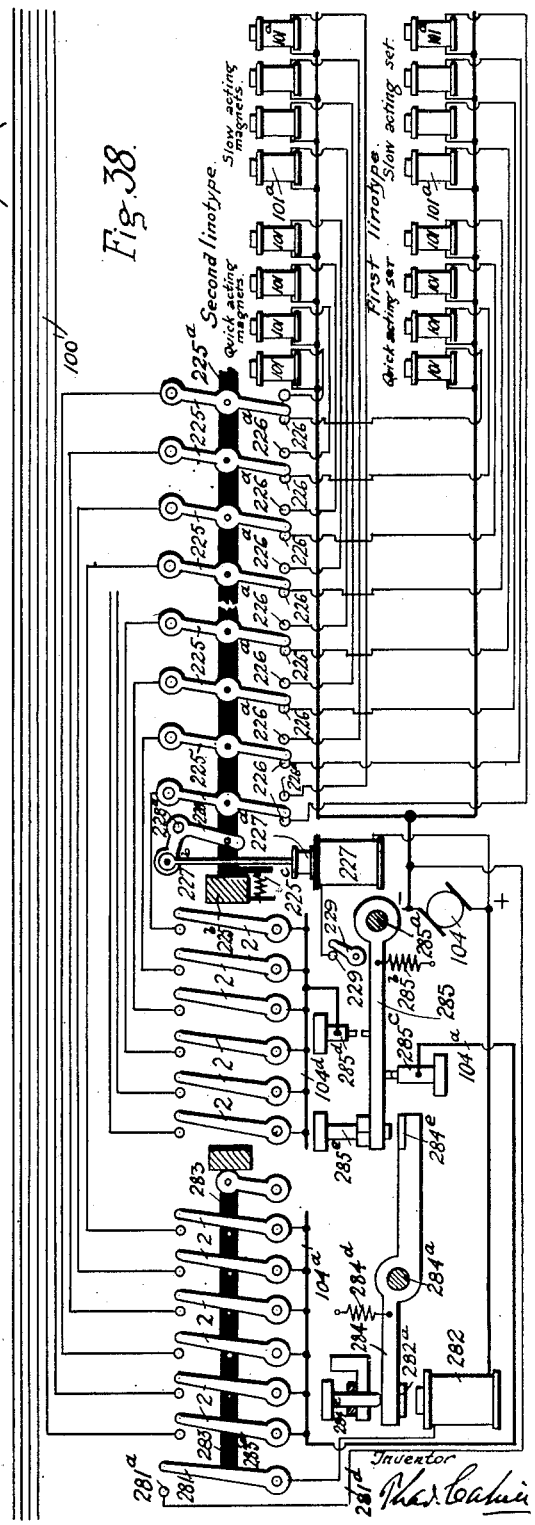

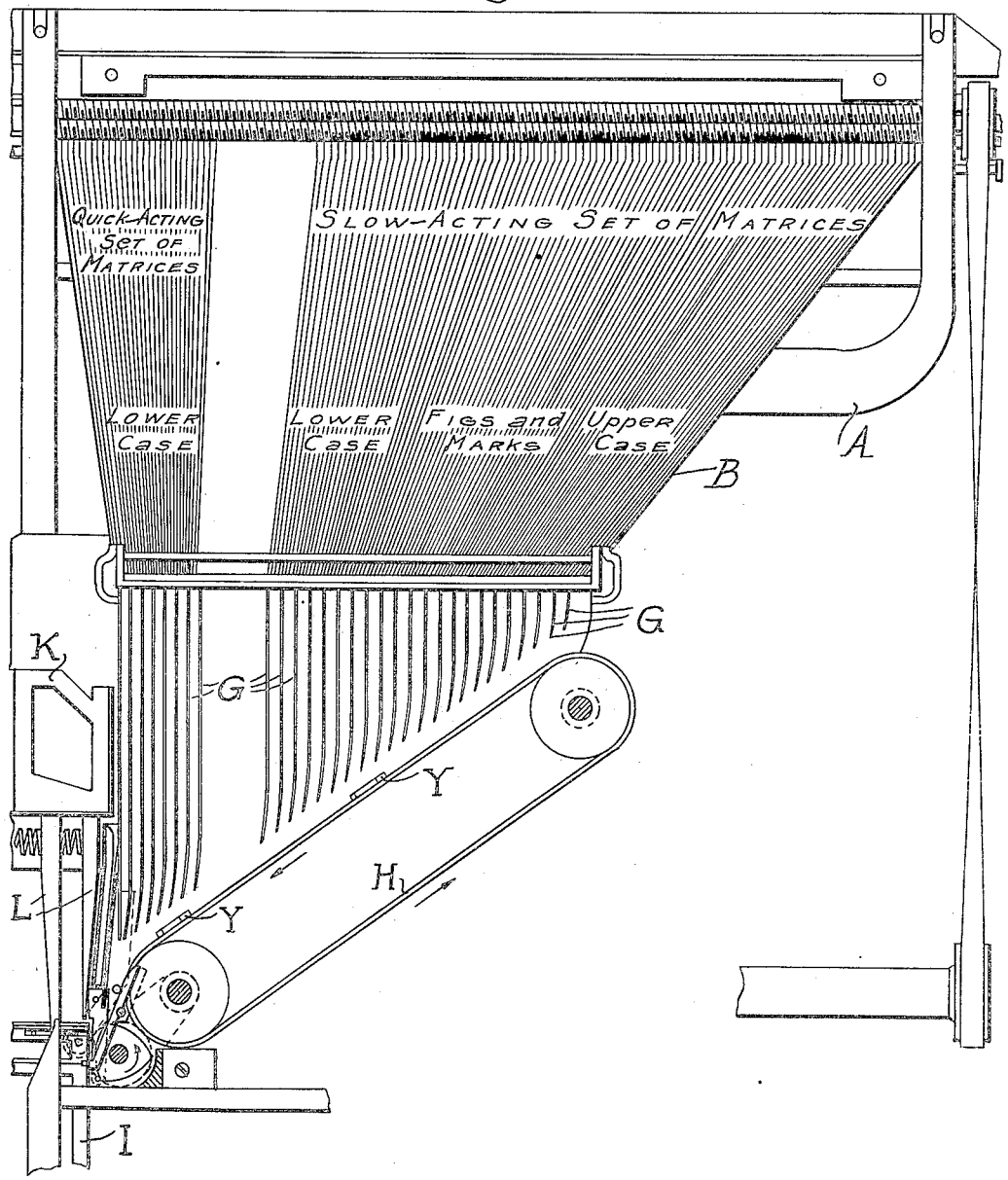

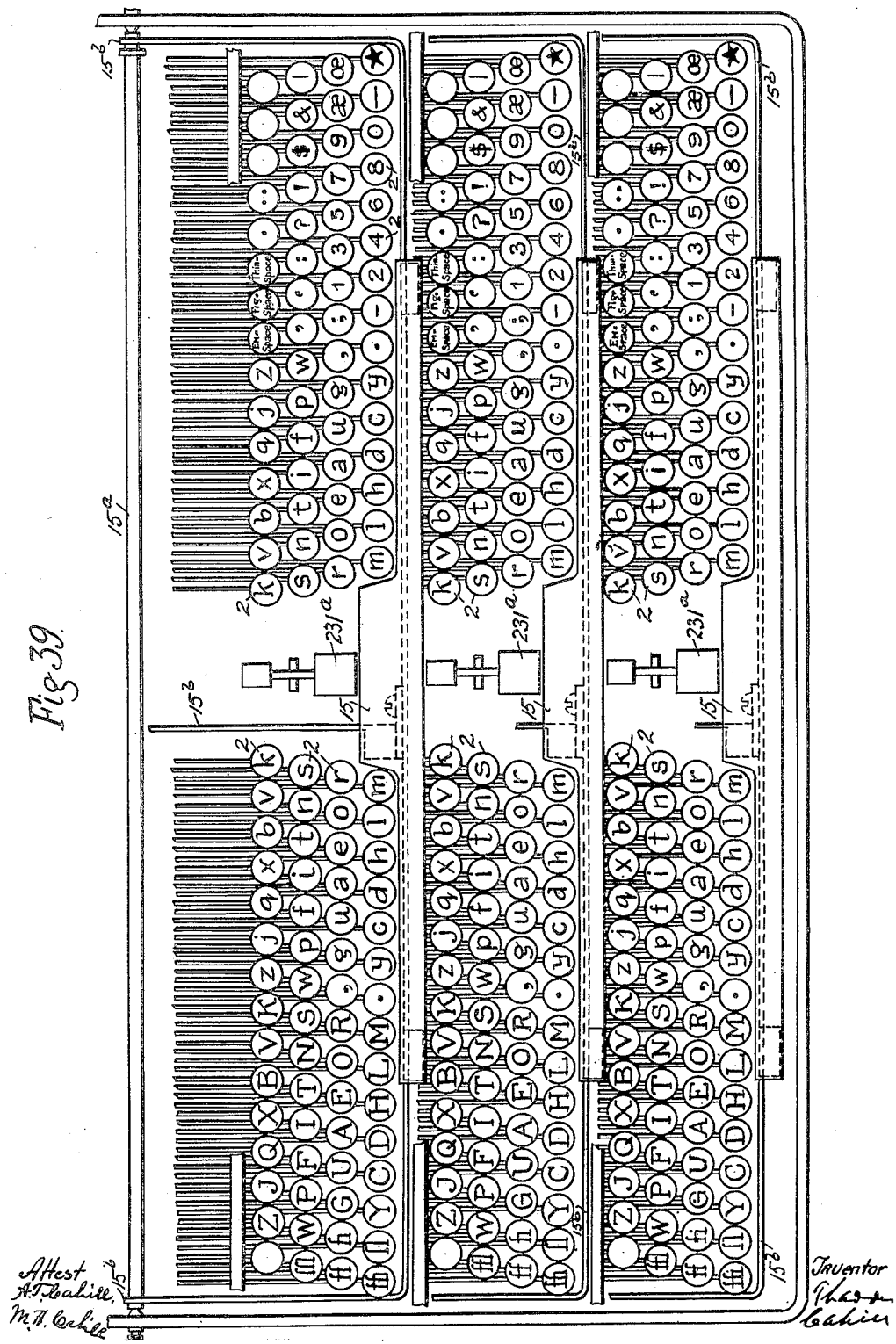

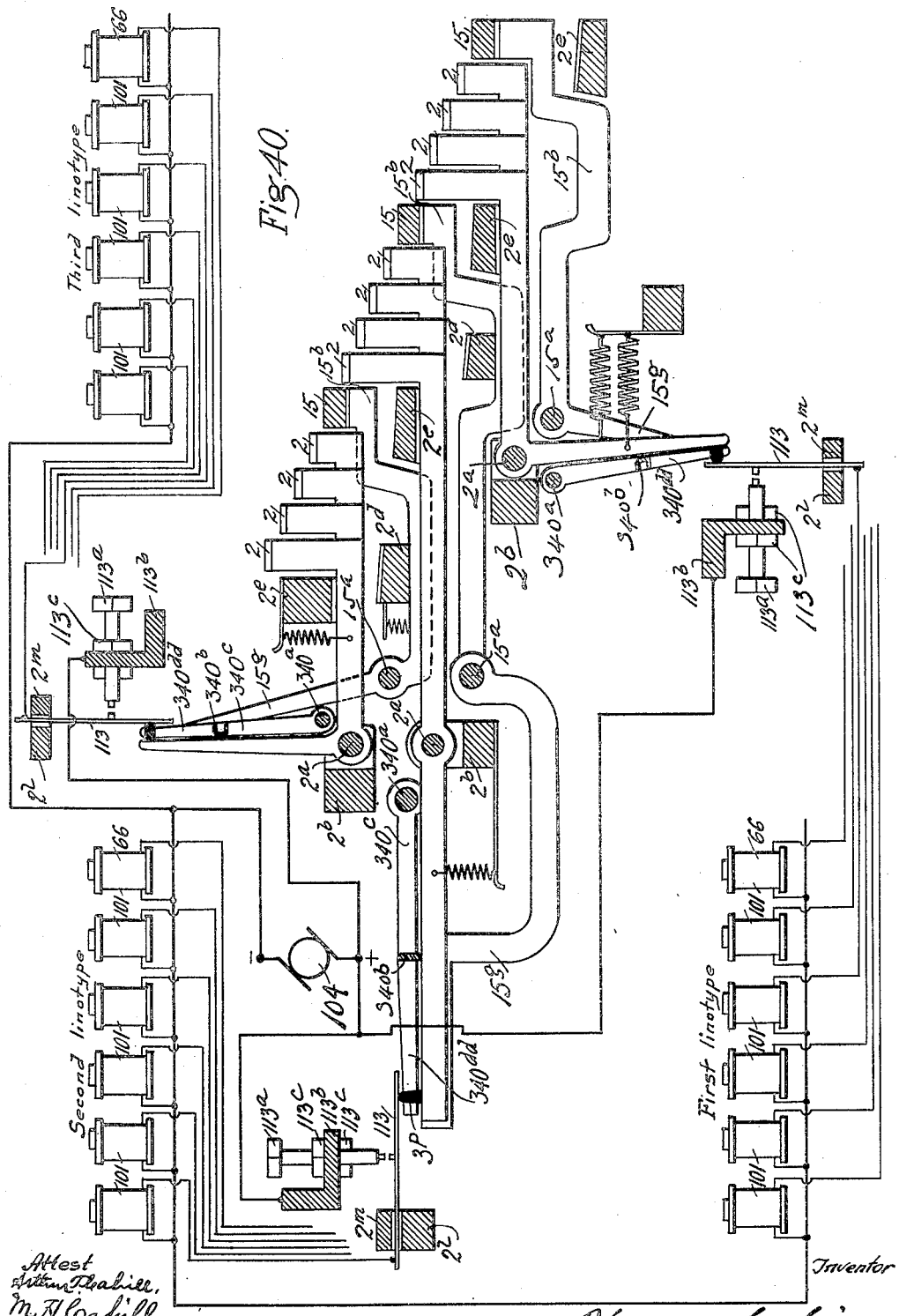

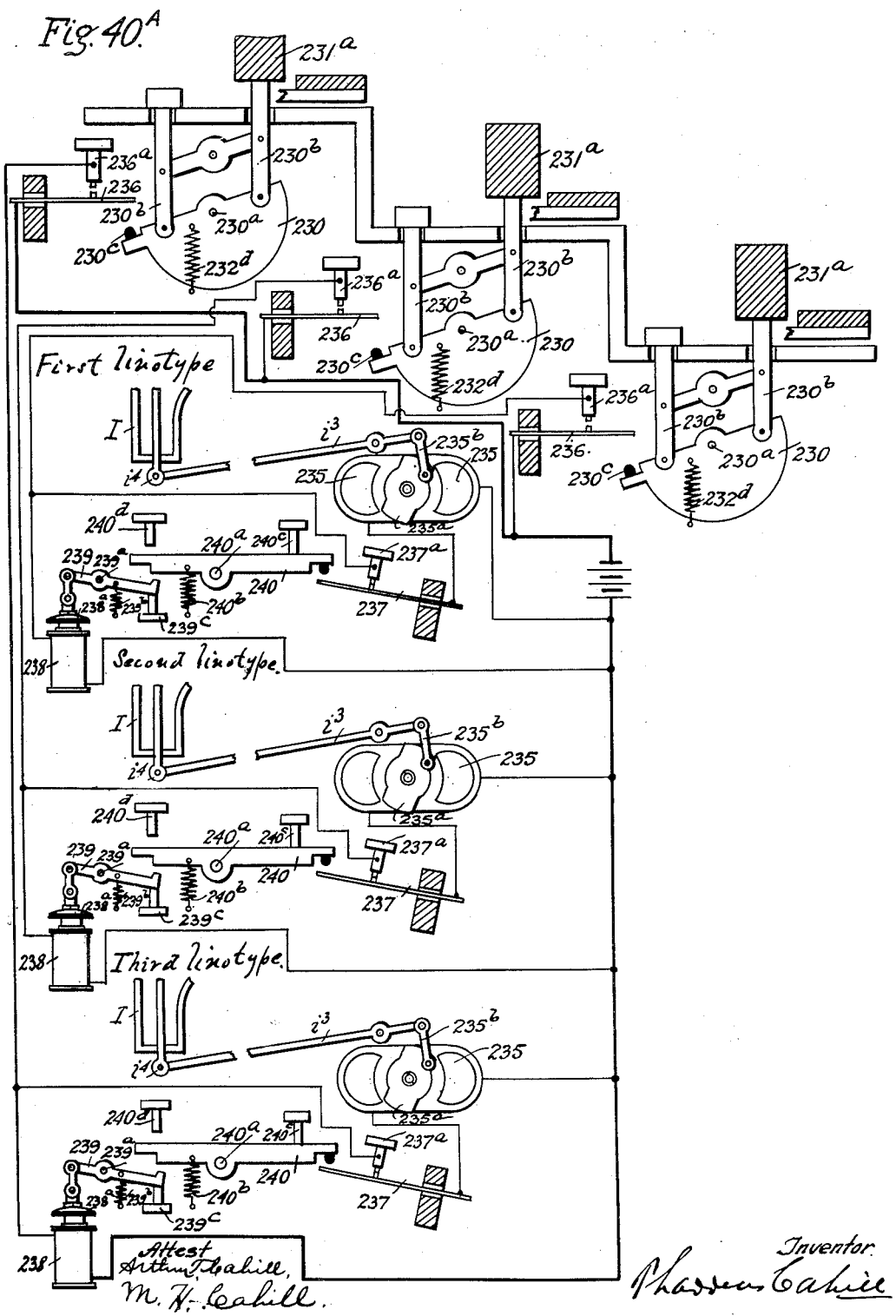
Fig. 40ᴬ

Sept. 9, 1930. T. CAHILL 1,775,222
TYPE COMPOSING MACHINE AND OTHER SIMILAR INSTRUMENT
Filed Dec. 8, 1927 34 Sheets-Sheet 30
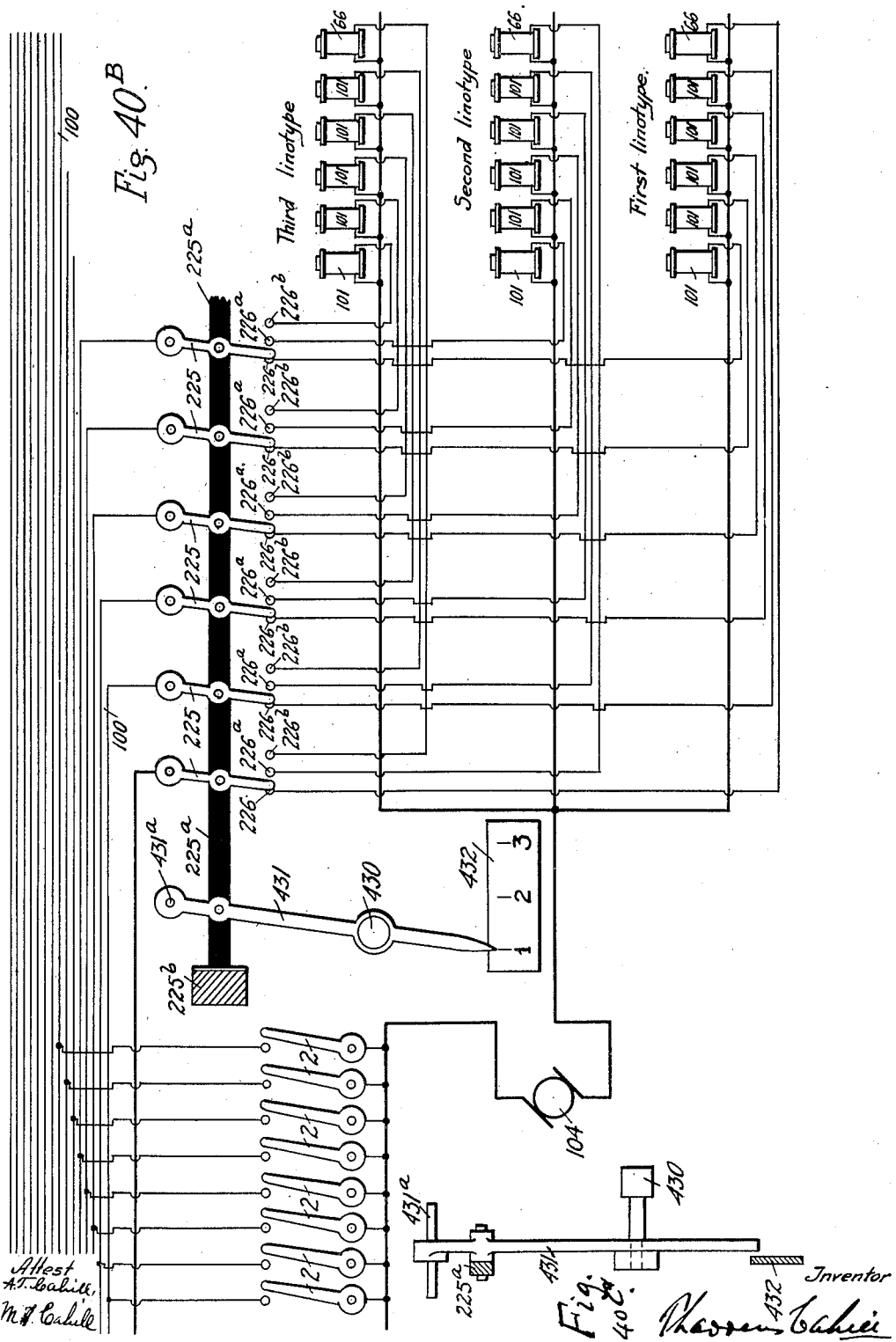

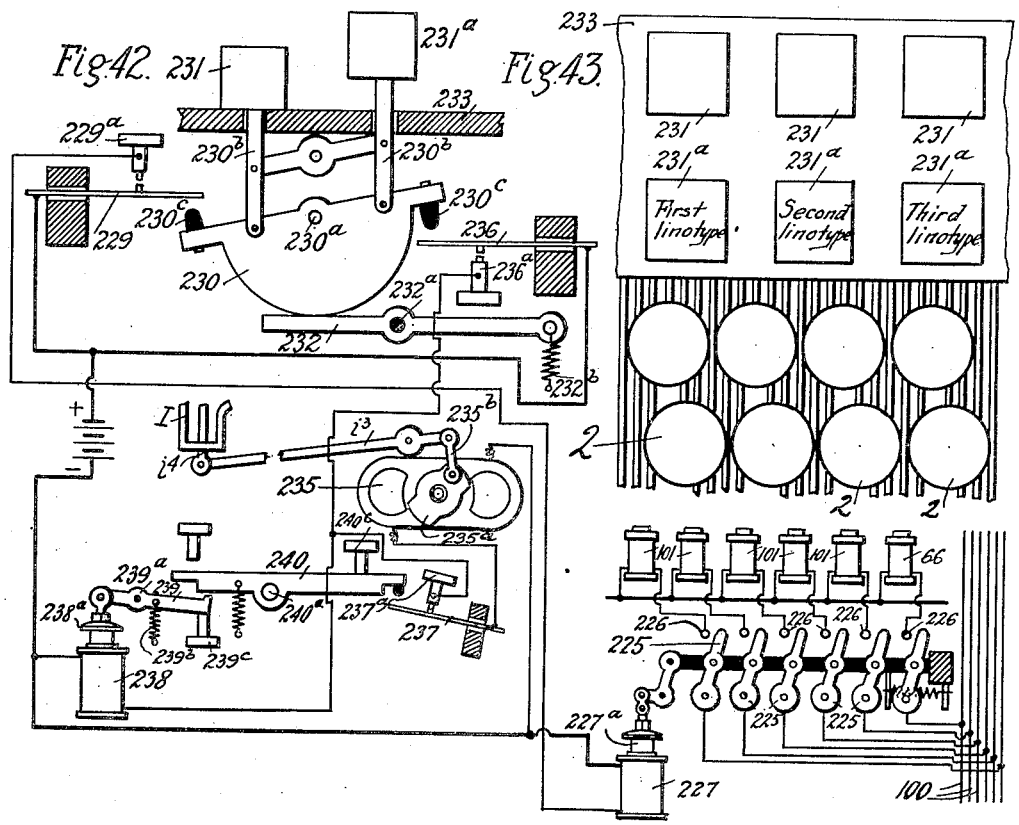

Sept. 9, 1930.  T. CAHILL  1,775,222
TYPE COMPOSING MACHINE AND OTHER SIMILAR INSTRUMENT
Filed Dec. 8, 1927   34 Sheets-Sheet 33

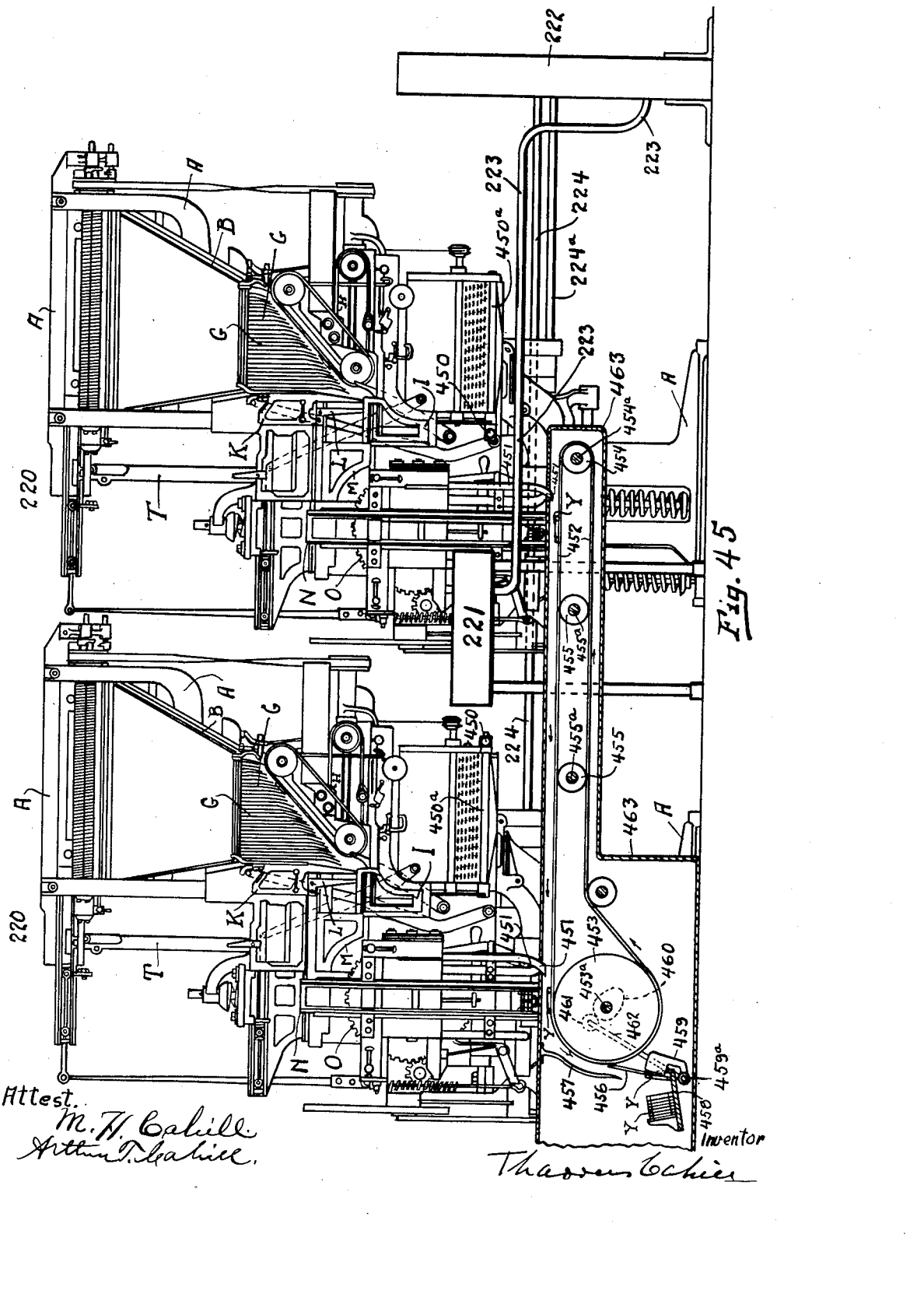

Patented Sept. 9, 1930

1,775,222

UNITED STATES PATENT OFFICE

THADDEUS CAHILL, OF NEW YORK, N. Y.

TYPE-COMPOSING MACHINE AND OTHER SIMILAR INSTRUMENT

Application filed December 8, 1927. Serial No. 238,713.

This application is a continuation as to most of the subject matter disclosed in it of my prior pending application No. 441,425, filed January 31, 1921, which was itself a continuation, in part, of an earlier-filed and then pending application, No. 248,595, filed August 6, 1918—all as stated more at length below.

The principal object of my present invention is to enable a type-machine operator to set more type in a given time (for example, in an hour) than has been practicable heretofore.

For convenience sake, I shall first describe my invention in connection with a linotype machine, for these machines are well known and in common use.

In linotype machines, inter-type machines and other similar machines, as now constructed, the first limitation which is reached on the output of the machine, is the speed of casting. The mechanical experts in charge of linotype machines do not, as a rule, wish to run such a machine at a greater speed than that which is sufficient to cast, say, seven-and-a-half or eight lines of type a minute; but for a rapid operator and under favorable circumstances, this speed may be increased somewhat. The next limitation on the speed of the machine, is the speed of the distributing apparatus; and the third limitation, is the speed with which the matrices can be assembled.

I increase the number of lines per minute which an operator can set, preferably, in two ways, namely:

First. I combine two machines with a single key-board, which operates both machines and forms with them, in effect, a duplex machine, and I arrange things in such a manner, as hereinafter described, that alternate lines of type are set on the two machines alternately; the first, third, fifth, etcetera, lines being set on the one machine and the second, fourth, sixth, etcetera, lines being set on the other machine. Thus, I put two assembling devices into action, to assemble the alternate lines of type; I put two casting devices into action, at the same time to cast the linotypes or slugs (as in the ordinary linotype machine) or to cast the individual type (as in the Stringer-type machine or the Grantype machine, for example); and I put two distributors to work, at the same time, to distribute the type or matrices; and thus twice as many lines can be cast and distributed per minute, although each machine is casting and distributing only with its accustomed speed. And, Second. To facilitate the work of the operator in assembling the matrices or type into lines, I furnish my machine with an improved key-board, preferably, a duplex key-board, with which he selects the matrices, or otherwise selects the letters, ordinarily, two letters at a time; preferably, one letter with the right hand and the other letter, at the same time, with the left hand.

Thus, by enabling the operator to select his matrices, in general, two letters at a time, and by putting two machines, in effect, a duplex machine with two assembling devices, two casting devices and two distributors, under his control, by which the slugs or the type are cast, at the same time, by two independently-operating casting mechanisms and are distributed simultaneously by two distributors, I greatly increase the amount of work which he can do.

I shall describe my invention in connection with a circulation-machine, by which I mean a machine, in which the type-dies or matrices are released or otherwise taken from their places in the magazine by the depressing of the keys at the key-board; are presented (whether as a line, as in the original Mergenthaler machine, or as individual types, as in the Stringer type and some other improved forms of the Mergenthaler) to the casting mechanism, by which the slugs or the individual type (as the case may be) are cast; and are then distributed back to their proper places in the magazine. But my invention, it is to be understood, may be used in connection with any other type-setting machine whatever, that is suitable for the purpose.

The linotype machine, as before said, is one type of machine that is suitable for my purpose, and it is well known in the art and widely used in the printing trade. Its principal features are described in the specifications of the following United States Letters Patent, namely: to Mergenthaler, No. 317,828, dated May 12, 1885; to Mergenthaler, No. 347,629, dated August 17, 1886; to Mergenthaler, No. 378,798, dated February 28, 1888; to Mergenthaler, No. 436,531, dated September 16, 1890; to Mergenthaler, No. 436,532, dated September 16, 1890; to Mergenthaler, No. 557,000, dated March 24, 1896; of which the last three and especially the last two describe a machine which is very nearly the commercial machine of the present day, or at least, is very much nearer to it than the constructions shown in the earlier Mergenthaler patents.

Various improvements have since been made on Mergenthaler's work, and reference may be made particularly to the following patents to other persons, namely:

To Dodge, No. 530,931, dated December 18, 1894, and showing a key-operated cam-action, for giving movement to the matrix-releasing escapements;

To Rogers, No. 640,633, dated December 26, 1899;

To Rogers, No. 767,169, dated August 4, 1904; as well as divers other patents of later date, which it is not deemed necessary to enumerate.

Brief but intelligent descriptions of the Mergenthaler machine will be found in the following books, namely:

Le Gros and Grant, Typographical Printing Surfaces; London, 1915; New York, Longmans, Green and Company; pages 421 to 436; and, Theodore N. De Vinne, The Practice of Typography, Modern Methods of Bookmaking; New York, 1904, The Century Book Company, pages 403 to 446.

And a much lengthier and more detailed account of the machine, is given by John S. Thompson in his book, The Mechanism of the Linotype, published by the Inland Printer Company, Chicago, Ill.

The machine invented by Mergenthaler and called by him and by the public since, the linotype, is manufactured under that name by the Mergenthaler Linotype Company, Brooklyn, New York, and by several other companies in foreign countries; and substantially the same machine, with subsequent improvements of more or less importance, is manufactured under other trade names by other houses, such as the intertype machine, made by the Intertype Company, Brooklyn, New York, and the linograph machine, made by the Linograph Company, Davenport (or Dubuque) Iowa; and a machine which is in substance a linotype, but with some improvements in the mode of casting, is manufactured in England, under the name of the Grantype. Also, a machine retaining the essential Mergenthaler feature of circulating matrices, which are assembled, cast from and returned to their proper channels in the magazine, but with certain improvements, by which the matrices can be cast from singly, instead of in lines, is manufactured and used in England, under the name of the Stringer-type, before mentioned—so-called from its inventor, H. Gilbert-Stringer. This machine is described in United States Letters Patent to Gilbert-Stringer No. 675,827, dated June 4, 1901; No. 675.829, dated June 4, 1901; No. 690,720, dated January 7, 1902; and with certain improvements, in the patents to Gilbert-Stringer and Druitt No. 1,074,546, dated Sept. 30, 1913; and No. 1,188,265, dated June 20, 1916.

My present invention relates to and is applicable to this whole class of machines, whether circulation machines or not, in which type, type-dies or matrices (whether of male or of female type) are stored in a magazine or reservoir and are released or taken from their respective grooves, or compartments or channels in such magazine or reservoir, by escapements or delivering devices, which are themselves controlled by keys at the key-board.

In the accompanying drawings:

Fig. 1 is a diagrammatic view, in which two linotypes are roughly indicated, in plan, controlled by one key-board, 221, through suitable connections;

Fig. 2 is a view in general similar to Fig. 1, but showing in elevation and partly diagrammatically, the two linotypes which are shown in plan in Fig. 1, controlled by the key-board 221;

Fig. 3 is a sectional view in elevation, showing one convenient mode of applying my electro-magnets, controlled by my key-board 221 to operate the matrix-releasing devices of a linotype machine;

Figure 5:
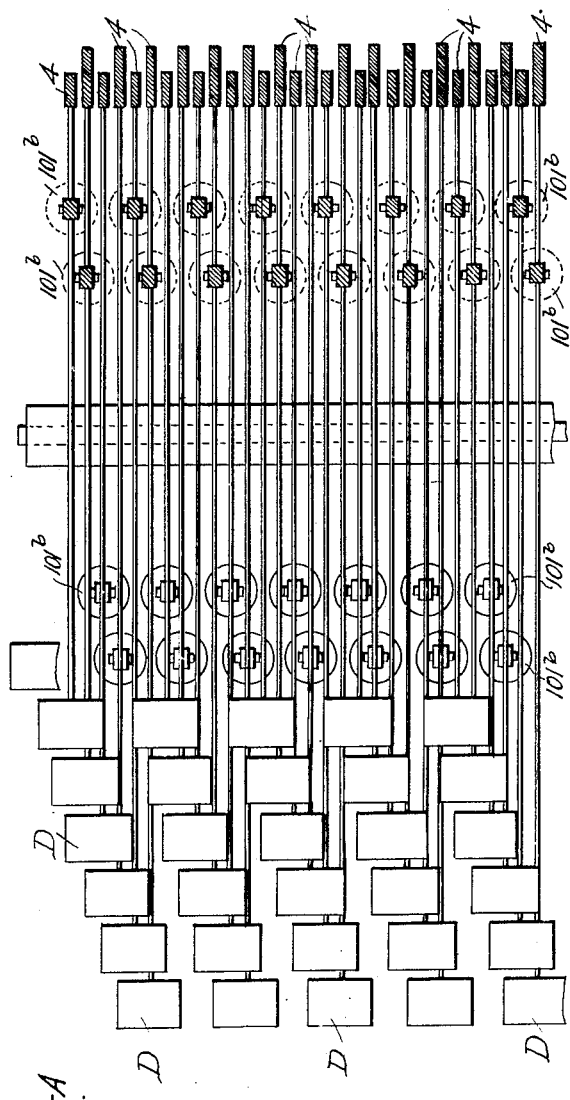
Fig. 5 is likewise a sectional view in elevation, showing my electro-magnets, 101, 101, controlled by my key-board 221, connected to operate the key-levers of a linotype machine, and showing, also, the usual and well known matrix-releasing action or mechanism of the linotype, controlled by said keys.

Fig. 5^A is a detail, a plan view, partly in section, on the line 5^A, 5^A, Fig. 5;

Fig. 6 is a detail view, in elevation, showing one mode of connecting an electro-magnet (which is controlled from the key-board 221, in the manner hereinafter described) to operate the space-band-releasing device of Mergenthaler's machine, as described in the Letters Patent aforesaid, No. 436,532, dated September 16, 1890;

Fig. 7 is a detail view, an elevation on a larger scale than Fig. 6, showing the magnet, marked 66, in said figures;

Fig. 8 is an elevation of said magnet, seen in a plane at a right angle to the plane of Figs. 6 and 7, and on a larger scale than that of Fig. 6;

Figs. 8$^A$ and 8$^B$ are details, on a larger scale, of the armature seen in Fig. 6; Fig. 8$^A$ being seen in the plane of Fig. 6, and Fig. 8$^B$ being seen at a right-angle to this, in the same plane as Fig. 8;

Fig. 9 is a diagrammatic view showing the keys 2, 2, of my key-board (marked, as a key-board, 221, in Figs. 1 and 2) connected to operate the matrix-releasing magnets 101, 101, of two linotypes, so as to operate these two linotypes alternately, in order to set the successive lines of type alternately on the two machines, as before described; and in this Fig. 9, the keys (marked 2, 2) of my key-board 221 are shown diagrammatically as pivoted keys or switches, in order to make the electrical system and the electrical connections more clear and easy-to-be-understood;

Fig. 10 is a diagrammatic view, illustrating electrical connections, controlled from the key-board 221, by which the operator is enabled, with a single action, both to raise the matrix-elevator, or assembling elevator or assembling-block, as it has been variously termed (marked I, in Figs. 2 and 10) when he has assembled a line of matrices therein, so as to set those matrices in a course of motion towards the mould, at which the linotype or slug is cast, and also, at the same time, to shift the connections of his key-board from the one linotype, in which assembling-elevator a line has just been assembled, to the other linotype, in which the next line of matrices is to be assembled; this view is largely diagrammatic, for it serves to make clear a system of electrical connections, which is suitable for our purpose.

Figs. 9 and 10, before mentioned, illustrate the things shown in them largely in a diagrammatic fashion, which is especially useful in connection with electrical circuits and arrangements. But Figs. 11, 12, 12$^A$, 13, 14, 15, 16, 16$^A$ and 17 illustrate, in a more nearly geometric and mechanical fashion, the same essential structures which are shown diagrammatically in Figs. 9 and 10. Of these—

Figure 18:
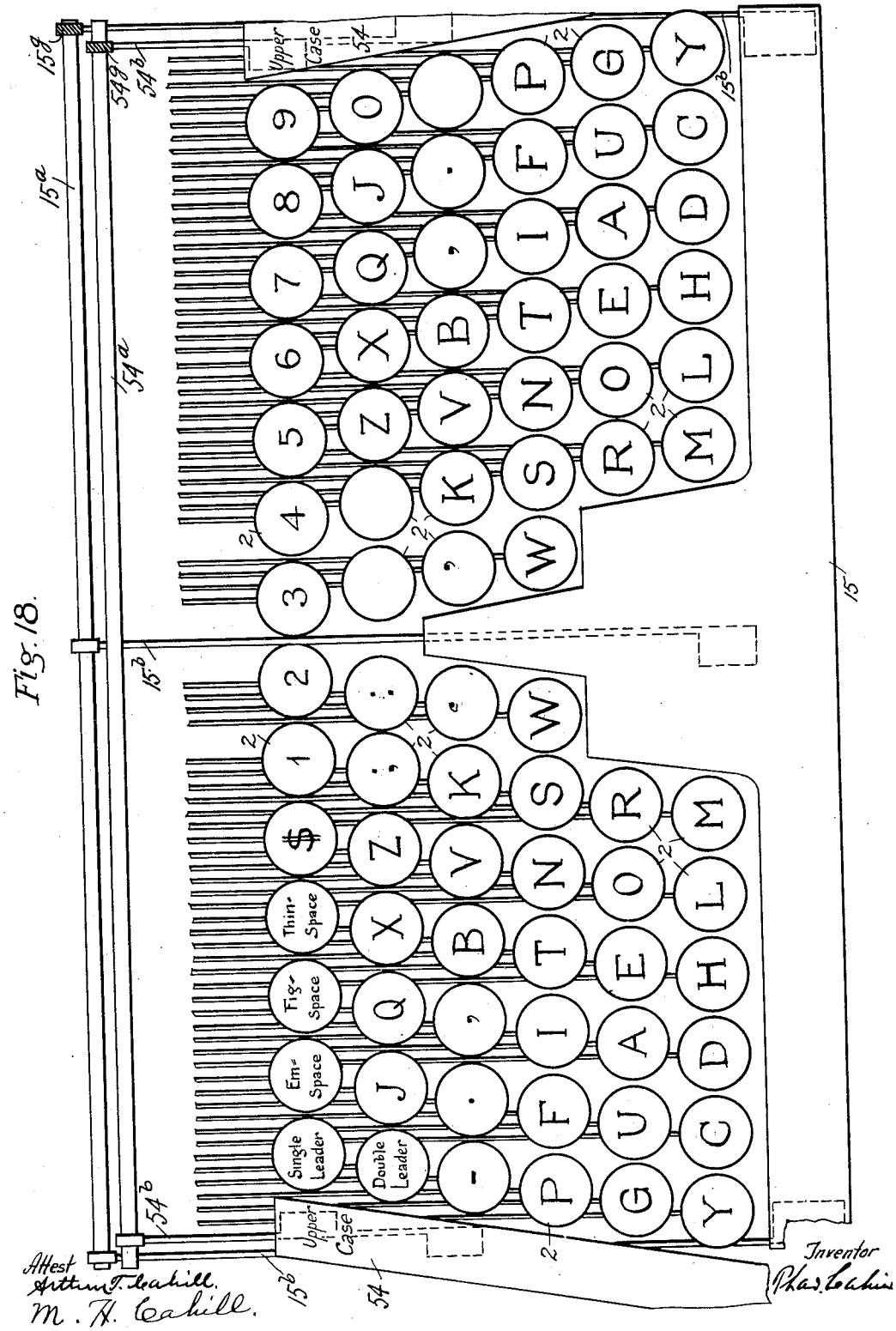

Fig. 11 is a plan view, illustrating one form of key-board which may be used in carrying out my invention, instead of the mere key-switches, 2, 2, shown in the diagrammatic view, Fig. 9;

Fig. 12 is a detail, a sectional view in elevation (and partly diagrammatic) through said key-board and the associated devices, on the line 12, 12, in Fig. 11;

Fig. 12$^A$ is a detail, a sectional view in elevation, showing, on a larger scale and more clearly, a portion of the mechanism seen in Fig. 12, for shifting the electrical connections of my key-board from one linotype to another, as required;

Fig. 13 is a view in general similar to Fig. 12, but while Fig. 12 shows the electrical connections which are controlled by one of the ordinary or matrix-releasing keys at the key-board, and which serve to operate one of the matrix-releasing electro-magnets 101, 101, in each of the two linotypes (now one linotype and then the other, alternately, as successive lines are set, as before mentioned and described more in detail hereinafter) Fig. 13 shows one convenient arrangement of parts, by which the space-bar 15, at the key-board, controls the electro-magnets 66, 66 (Figs. 6, 8 and 9) by which the space-band-releasing devices of the two linotypes, respectively, are operated, so that a space-band is released, whenever said space-bar 15 is depressed, in that one of the two linotypes, with which the key-board is, at the moment connected; this view is to be taken in connection with the other figures, especially Figs. 1, 5, 6, 9, 10, 11 and 12;

Fig. 14 is a detail, a sectional view in elevation, on the line 14, 14, Fig. 12, in a plane at a right-angle to the plane of said Fig. 12, further illustrating a convenient mechanical arrangement of the key-controlled electrical connections, which are shown diagrammatically in Figs. 9 and 10; and in this view, various parts of the mechanism are broken away, in order to illustrate the construction more clearly;

Fig. 15 is a detail view in elevation, showing on a larger scale, a portion of the mechanism which is seen in Figs. 14 and 12, namely, the circuit-closing switch-springs 113, 113, and a convenient means for mounting them; and in this view, one of the switch-spring clamps, 2$^m$, is removed, in order to illustrate the construction more clearly;

Fig. 16 is a detail, a top plan view of the parts shown in Fig. 15;

Fig. 16$^A$ is a detail view, partly in section, partly in plan, on the line 16$^A$, 16$^A$, Fig. 12, showing a portion of the milled-bar or hanger-bar 2$^b$, in which the rod 2$^a$, is set, on which the keys 2, 2, are mounted, but not showing the arm 15$^g$ or the rock-shaft 15$^a$, belonging to the space-frame;

Fig. 17 is a detail, a plan view, in part broken away, showing a convenient mechanical arrangement of the set or gang of switches, 225, 225, and the contact-springs 226, 226, and 226$^a$, 226$^a$, with which they coact, which are shown diagrammatically, in Figs. 9 and 10, as pivoted switches, 225, 225, and as contact-buttons 226, 226 and 226$^a$, 226$^a$, and which are seen, also, as switch-springs, in Figs. 12 and 13, at the left-hand lower corner of the figure in each case;

Fig. 18 is a plan view, showing one form of duplex key-board that may be used in connection with other parts of my invention, to enable the operator to select his letters or set his matrices, in general, two letters at a time;

Fig. 19 is a diagrammatic view, in general similar to Fig. 9, before described; but while Fig. 9 illustrates suitable electrical circuits for a key-board, with which the letters are selected and the matrices set one at a time only, Fig. 19 illustrates an arrangement of circuits that is suitable for my purpose with a duplex key-board (as, for example, and for example only, the key-board shown in Fig. 18) whereby the operator is enabled to set the matrices, in general, two letters at a time;

Fig. 19$^A$ is a diagrammatic view, in general similar to Fig. 19, but it differs from said Fig. 19 in this: the switch 281, for operating the magnet 282, and the key-controlled frame 283, for operating said switch 281, which are seen in Fig. 19, are both of them omitted from the apparatus illustrated by Fig. 19$^A$, and the magnet 282, is inserted in the common-return wire of the left-hand-operated switches 2, 2,— the switches, that is, which in Fig. 19 give movement to the frame 283 and switch 281; thus the circuit of the magnet 282 is closed, in the apparatus of Fig. 19$^A$, by the very same switches 2, 2, which close the circuits of the matrix-releasing electro-magnets 101, 101.

Fig. 19$^B$ is also a diagrammatic view, in general similar to Fig. 19, but illustrating a modified or alternative construction, which is hereinafter described, in which the armature-lever 284, instead of itself acting directly to throw the electrical current on the bus-bar or feed-wire 104$^d$ (which serves to feed the electric current to the matrix-releasing electro-magnets, 101, 101, which are controlled by the right-hand-operated keys 2, 2) acts for this purpose on the lever 285; by this means the amount of retardation in the time of acting of the matrix-releasing electro-magnets 101, 101, controlled by the right-hand keys 2, 2, as compared with those controlled by the left-hand-operated keys 2, 2, is more easily regulated;

Fig. 20 is a detail, a sectional view in elevation, on the line 20, 20 in Fig. 20$^A$, in general like Fig. 14, through my duplex key-board, illustrating particularly the frame 340, which is operated by the keys of the left-hand set, belonging to said key-board. This frame 340 is the practical thing for operating the magnet 282, when one of the left-hand-operated keys at said key-board is depressed and which is represented by the bar or frame 283, in the diagrammatic views, Figs. 19, and 19$^B$;

Fig. 20$^A$ is a detail, a sectional view in elevation, illustrating the arrangement with relation to each other of the keys 2, 2, and the circuit-closing frame 340, by which the timing electro-magnet 282, is controlled; a portion of the upward-extending circuit-closing arm 340$^{dd}$, of said frame 340 being broken away, in order to expose to view the electrical connections, which are operated by one of the keys, 2, 2;

Fig. 20$^B$ is a view in general similar to Fig. 20$^A$, but in Fig. 20$^B$ the electrical connection or switch, which is operated by the key 2, is not seen, and that which is operated by the frame 340 is seen;

Fig. 20$^C$ is a view in general similar to the two preceding figures, but showing the switch 15$^h$, which is operated by the space-bar 15, and which serves to close the circuit of the electro-magnet 66 (seen in Fig. 6) which operates the space-band-releasing device;

The preceding Figs. 1 to 20$^B$ inclusive, illustrate electrical mechanism for connecting my key-board with the two linotypes which are controlled by it. But Figs. 21 and 26 show pneumatic mechanism for this purpose. Of these—

Figure 36:
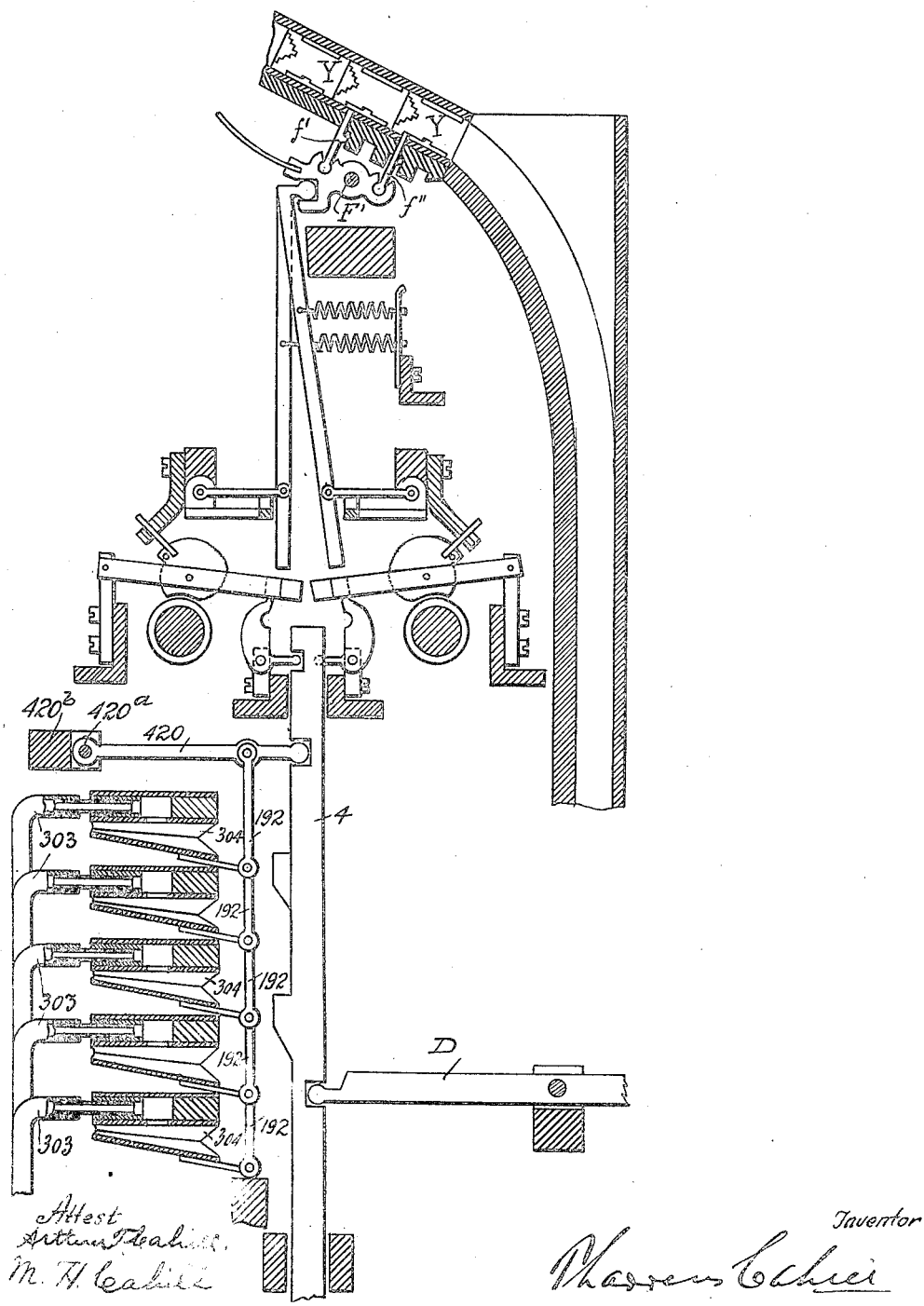

Fig. 21 is a sectional view, in elevation and partly diagrammatic, illustrating a form of mechanism in which a wind-chest, with valve-work, controlled from my key-board 221, is connected to two linotypes alternately, each as required, so as to make it practicable to set alternate lines of type on the two linotypes respectively;

Fig. 22 is a detail, a sectional view in elevation, showing a portion of the mechanism belonging to Fig. 21, but on a larger scale;

Fig. 23 is a somewhat similar view, in a plane at a right-angle to the plane of the preceding figure, illustrating an electro-magnet, arranged to control the two sliders 308 and 308$^a$, by the action of which the apparatus is connected alternately with the one linotype or the other of the two linotypes controlled by it;

Fig. 24 is a view in general similar to Fig. 23, but illustrating an arrangement of parts, in which a single one of the sliders 308 is used, instead of the two sliders, 308 and 308$^a$, shown in Fig. 23;

Fig. 25 is a detail, a plan view, illustrating a portion—relatively a small portion—of one of the sliders 308; the most of said slider being broken away;

Fig. 26 is a plan view, showing a portion of the wind-chest, which is seen at the left of Fig. 21; parts of said wind-chest being removed, in Fig. 26, to expose others more clearly to view, and much the largest portion of said wind-chest being broken away, by reason of the lack of space on the official sheet;

Fig. 27 is a plan view, showing one convenient arrangement of two sets of keys, disposed in a convenient position to be operated by the same operator and forming, in fact, one key-board; each set of said keys being connected with and serving to operate the matrix-releasing devices of a linotype machine or other type-setting machine, which corresponds to such set of keys, the two sets of keys serving to control two linotypes, so as to set alternate lines of type on said linotypes respectively; the first, third, fifth etcetera, lines being set on the one linotype, by operating on the one set of keys; and the second, fourth, sixth, etcetera, lines being set on the other linotype, by operating on the other set of keys;

Fig. 28 is a detail, a view in vertical cross-section through the key-board of Fig. 27, further illustrating the key-board of Fig. 27 and the connections from the keys to the matrix-releasing electro-magnets, 101, 101, of the two linotypes respectively; this figure is largely diagrammatic;

Fig. 28$^A$ resembles Fig. 27, in showing two sets of keys, combined into one key-board, to operate two linotype machines; but in this figure the two sets of keys, which in Fig. 27 are disposed one behind and above the other, are placed side by side; and while Fig. 27 shows a duplex key-board, for making the letters (or setting the letters) two at a time, Fig. 28$^A$ shows a key-board having two sets of keys, each of which sets is like the set shown in Fig. 11; but in this particular, the arrangement (as between Figs. 27 and 28$^A$) might be reversed; for either key-board may have either sort of sets of keys—either the duplex set, as shown in Fig. 27, or the single-acting set, as shown in Figs. 11 and 28$^A$, or any other set of keys (two sets in the key-board) that is suitable for the purpose;

In Figs. 1 to 20 and also in Fig. 28 and in Figs. 39 to 43, I show electrical means for connecting a key-board with two linotypes, first with one linotype and then with the other, so as to set alternate lines of type on the two machines respectively (or, in Figs. 39 to 43, to set the successive lines of type on the three machines, in a proper serial order); and in Figs. 21 to 26 and also in Fig. 36, I show pneumatic connections for connecting my key-board with two linotype machines, first with one and then with the other. But in Figs. 29, 30, 30$^A$, 31, 31$^A$, 32, 32$^A$, 33 and 34, I illustrate mechanical shifting connections, by means of which the keys of my key-board, 221, are connected with two linotypes alternately so as to set alternate lines of type on the two machines respectively. These figures are described more in detail below.

Figs. 34$^A$, 34$^B$, 34$^C$, 34$^D$ and 34$^E$ illustrate electrical case-shifting mechanism for a linotype or other type-setting machine, whereby, with a single-alphabet of keys at the key-board, the upper-case matrices and the lower-case matrices, are alike controlled. Of these figures—

Fig. 34$^A$, which is a diagrammatic drawing, to illustrate the electrical circuits, shows this case-shifting mechanism in a very simple form, to illustrate the principle more clearly;

Fig. 34$^B$ is a diagrammatic view, in general similar to Fig. 19$^B$, but with a gang or set of case-shifting switches, 249, 249, added to the apparatus, whereby a single alphabet of keys, 2, 2, is made to control both the upper-case matrices and the lower-case matrices;

Fig. 34$^C$ shows a simple means for controlling the case-shifting electro-magnet 248, from the key-board, so as to shift from lower-case to upper-case, so long as the shift-key 54 is held down, which is suitable for use in making a single capital letter, as in the usual cases of initial capitals, for proper nouns and for the first words of sentences. But—

Fig. 34$^D$ shows a form of switch mechanism, for closing the circuit of the case-shifting magnet, 248, which will keep that circuit closed and the machine set to upper-case until the operator acts on the key 231, to open said circuit. The keys 231$^a$ and 231 serve thus, so to speak, to effect a more or less permanent shifting from lower-case to upper-case, suitable for use in setting headings and other words and sentences, which are set in capital letters.

Figure 41:
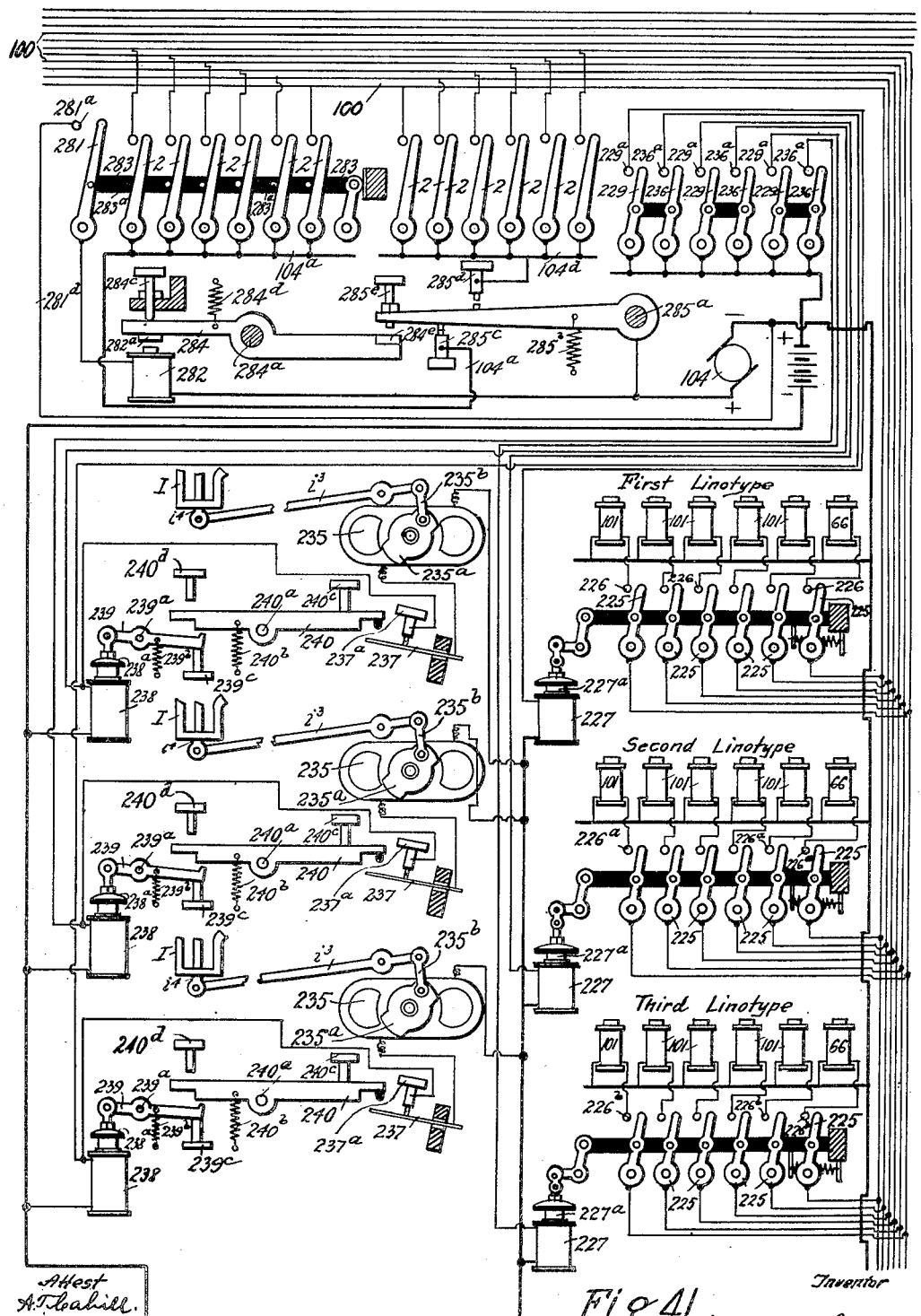
Figure 44:
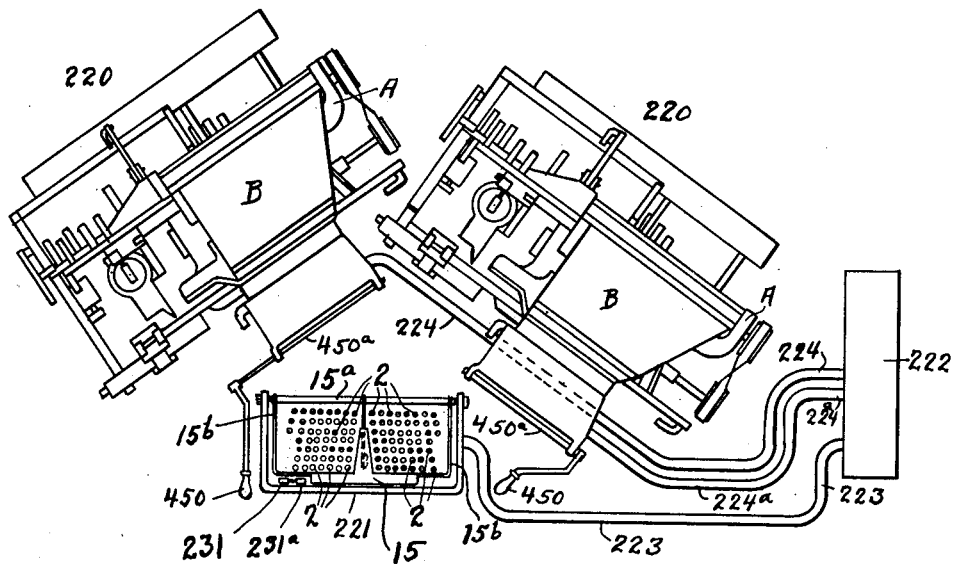

In Figs. 34$^A$, 34$^B$, 34$^C$ and 34$^D$, the case-shifting switches, 249, 249, with the associated switch-members, 249$^c$ and 249$^d$, etc., are shown diagrammatically, in such a form as to make it easy to follow the course of the electric circuits; the switches 249, 249, being shown as pivoted switches, and the associated switch-members, 249$^c$ and 249$^d$, as contact-buttons. But in Fig. 34$^E$, which is a geometrical rather than a merely diagrammatic drawing, the switches 249 and the associated switch-members 249$^c$ and 249$^d$, are shown in their preferred form as spring-switches, arranged as shown;

Fig. 35 is a plan view, in general similar to Fig. 11, but illustrating another form of linotype key-board, namely, the usual linotype key-board, in general use, which may be used in practicing my invention (or at least an important portion of my invention) instead of my improved key-boards, illustrated in Figs. 11, 18, 27 and 39;

In the apparatus illustrated in Fig. 21, the power pneumatics 304, 304, act on the matrix-releasing escapements, $f$, $f'$, $f^2$ directly, just as the electro-magnets, 101, 101, do in the apparatus illustrated in Fig. 3. But in the modification illustrated by Fig. 36, said power pneumatics act on the matrix-releasing escapements, through the intervention of the cam-action, which is generally used, very much as the electro-magnets 101, 101, do in the constructions illustrated in Figs. 4, 5 and 5$^A$;

Fig. 37 is a detail view, a front elevation, partly diagrammatic, illustrating a form of linotype which is provided with two sets of matrices in the same magazine (matrices of the same face) namely, a quick-acting set of matrices, disposed in proximity to the assembling device and a slow-acting set (or a slower-acting set) disposed more remote from the assembling-device;

Fig. 38 is a diagrammatic view, in general similar to Fig. 19B, but showing my apparatus provided with two sets of matrix-releasing electro-magnets for each linotype, namely, a quick-acting set of electro-magnets, 101, 101, and a slow-acting set, 101ª, 101ª, instead of a single set of magnets in each linotype, each magnet of which is quick-acting or slow-acting (with respect to the time of the depressing of the key which controls it) according as the quick-acting or the slow-acting key, corresponding to it, is depressed;

Fig. 39 is a plan view, in general like Fig. 27, and Fig. 40 is a view partly in sectional elevation and partly diagrammatic, in general like Fig. 28, but Figs. 39 and 40 differ from Figs. 27 and 28, in this, that whereas the apparatus illustrated in Figs. 27 and 28 has two sets of keys, connected to control two linotypes, on which the lines of type are set and cast alternately, the apparatus illustrated in Figs. 39 and 40 has three sets of keys, connected to control three linotypes, so that the first line of type will be set on the first linotype machine, by operating on the first set of keys; the second line of type will be set on the second linotype machine, by operating on the second set of keys; and the third line of type will be set on the third linotype machine, by operating on the third set of keys; and so on, thereafter, the first, fourth, seventh, etcetera, lines of type being set and cast on the first linotype machine; the second, fifth, eighth, etcetera, lines of type being set and cast on the second linotype machine; and the third, sixth, ninth, etcetera, lines of type being set and cast on the third linotype machine;

Fig. 40A is a diagrammatic view, in great part similar to Figs. 10, 41 and 42, showing one convenient arrangement of parts for controlling from a key-board of the kind illustrated in Figs. 39 and 40, the motor devices which operate the line-elevators, I, I (otherwise styled assembling-elevators or assembling-blocks) of the linotype machines, which are controlled from said key-board;

Fig. 40B is a diagrammatic view, in general similar to Fig. 9, but it differs from Fig. 9 in that while the apparatus of Fig. 9 has two linotype machines operated from the keys, 2, 2, of my key-board, the apparatus of Fig. 40B has three such machines, operated from said keys, 2, 2;

Fig. 40C is a detail;

Fig. 41 is a diagrammatic view which much resembles Figs. 10 and 19B, but the apparatus illustrated in Fig. 41 differs from that illustrated in Figs. 10 and 19B, as follows, namely: In the apparatus of Figs. 10 and 19B, the keys 2, 2, at the key-board are connected to control two linotypes; and a single set of switches, 225, 225, serves to connect said key-board with one linotype, when said switches are in contact with the switch-members 226, 226, and with the other linotype, when said switches 225, 225, are in contact with the other set of switch-members 226ª, 225ª respectively; but in the apparatus illustrated in Fig. 41, the keys 2, 2, at my key-board control three linotype machines, and for this purpose three parallel-connected sets of the switches 225, 225, are used, which make connection respectively (one set at a time, only) with the switch-members 226, 226, or 226ª, 226ª, or 226ᵇ, 226ᵇ, and so with the matrix-releasing electro-magnets, 101, 101, of the three linotypes, respectively. Thus, facility is afforded for setting successive lines of type on the three linotype machines, in due serial order; the first, fourth, seventh, etcetera, lines being set on the first linotype; the second, fifth, eighth, etcetera lines being set on the second linotype; and the third, sixth, ninth, etcetera, lines being set on the third linotype machine;

Fig. 42 is a detail view, partly in section, partly in elevation, and largely diagrammatic, showing one convenient arrangement of parts for controlling from the key-board, a pair of the switches 229 and 236 (which switches are shown diagrammatically at the upper right-hand corner of Fig. 41); by the switch 229, it will be seen, are controlled the shifting magnet 227 and the gang of shifting switches, 225, 225, by which the matrix-releasing electro-magnets, 101, 101, of the corresponding linotype are connected with my key-board, on which the operator operates, namely, the keys 2, 2, in the diagrammatic view, Fig. 41; Fig. 42 is to be considered in the light of Figs. 41 and 10 and the description of the mechanism of Fig. 10, hereinafter given;

Fig. 43 is a detail view, in plan, showing the keys 231 and 231ª, 231 and 231ª, which are used to shift or change the electrical connections of the key-board 221, so as to connect said key-board with the three linotypes, respectively, each as required; and in this figure said keys, 231 and 231ª, are arranged in proximity to the keys 2, 2, of said key-board, preferably, just back of the keys 2, 2; but the keys 231, 231ª, 231, 231ª, etcetera, may be arranged in any other position whatever that is suitable for the purpose;

Fig. 44 is a schematic view, in plan, showing two linotype machines, 220, 220, and my key-board 221, my switch-box 222, the cable 223 connecting the key-board 221 with the switch-box 222, and the cables 224 and 224ª that connect said switch-box with the matrix-releasing electro-magnets 101, 101, of the linotype machines aforesaid; said linotypes being disposed at an angle to each other so as to bring their key-boards, their assembling-elevators and their sending-up handles 450, 450, into closer proximity to each other, as described more at length below.

Fig. 45 is a front view in elevation, showing two linotypes, 220, 220, and my key-board 221 and other accessories, in general similar to Fig. 2, but with certain differences, which are pointed out below.

In the accompanying drawings, similar reference letters and similar reference numerals, refer to similar parts in all the figures.

A is the main-frame or any part of the main-frame of the linotype machine;

B is the matrix-magazine;

F is the lever, to which the pawls $f'$ and $f^2$ of the matrix-releasing escapement, are connected;

F' is the center-rod, on which the levers, F, F, are mounted; $f'$ and $f^2$ are the escapement pawls of the matrix-releasing device;

G, G, are the guide-plates, which direct the matrices, as they fall, towards the assembling devices, or to the matrix-carrying belt;

H is the matrix-carrying belt, on which the matrices fall, and by which they are conveyed to the matrix-assembling devices;

I is the assembling elevator, also sometimes called the matrix-elevator or the assembling-block;

K is the space-band box, in which the space-bands are stored;

$k$ is the guide or chute, connected with the space-band box and through which the space-bands fall to the assembling elevator, I; see Fig. 6;

$k^8$ is the rock-shaft and $k^{10}$ are the rock-arms to which the slide $k^{11}$ or releasing pawls of the space-band release are connected;

$k^{11}$ is Mergenthaler's slide or space-band release pawl, by the lifting of which a space-band is released;

$k^{12}$ is the link for giving movement to the rock-arms $k^{10}$ and slide or pawls $k^{11}$;

L is the shifting-fingers, for transferring the assembled line of matrices from the assembling elevator I, to the intermediate channeled guide M;

M is the intermediate channeled guide;

N is the first elevator or yoke-piece, as Mergenthaler termed it;

O is the mould wheel;

T is the swinging arm or second elevator, for lifting the matrices, after the line has been cast from them, up to the distributer-bar, X;

X is the distributer-bar;

Y, Y, are the matrices; and

Z, Z, are the space-bands.

Figure 4:
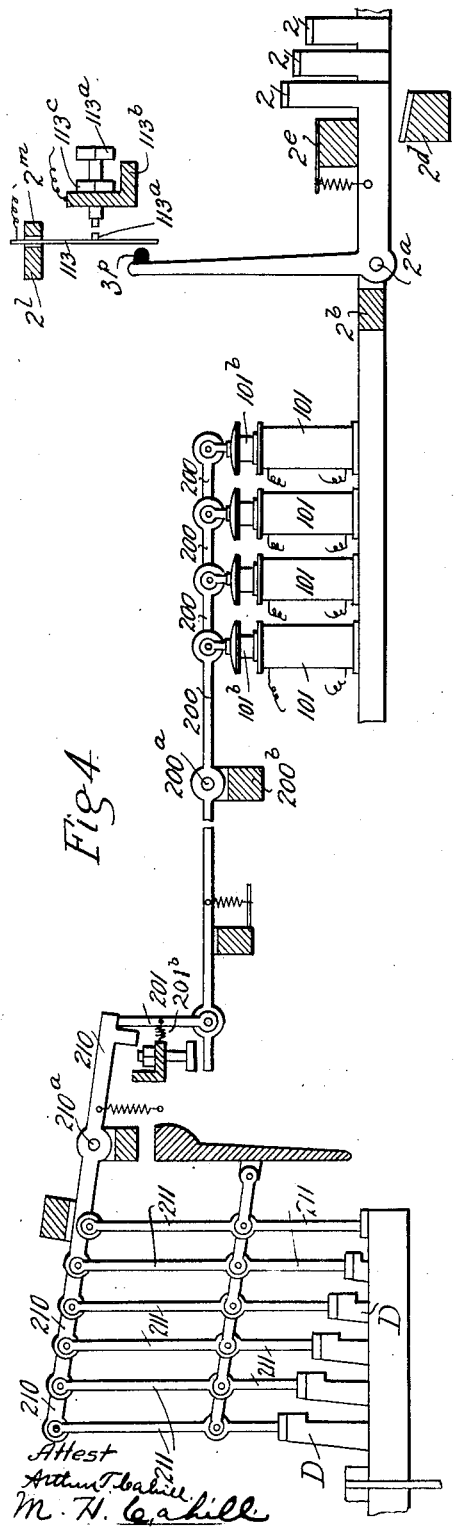
Fig. 4 is a sectional view in elevation and largely diagrammatic, illustrating another mode of connecting my electro-magnets, 101, 101, controlled by my key-board 221, to operate a linotype or other type-casting machine, namely, by connecting said magnets to operate the keys D, D, of said type-casting machine.

The following list of reference numerals, arranged in numerical order, will be of assistance in reading the drawings. This list is as follows:

2, 2, are the keys of my key-board 221;

$2^a$ is the fulcrum rod, on which the keys 2, 2, are set;

$2^b$ is a milled bar, in which the fulcrum-rod $2^a$ and the keys 2, 2 are mounted;

$2^d$ is a bar to limit the downward movement of the keys 2, 2, in Figs. 5, 12 and 28;

$2^e$ is a bar to limit the upward or return movement of the keys, 2, 2;

$2^k$, $2^k$ are pieces of insulating material, which serve to separate the switch-springs 113, 113, from the rail $2^l$ and from the cover-pieces or clamps, $2^m$, $2^m$;

$2^l$ is the supporting-rail for the switch-springs, 113, 113;

$2^m$, $2^m$ are clamping-pieces, for holding the springs 113, 113, in place;

$3^p$ is a piece of insulating material, attached to each of the keys 2, 2, to act on the corresponding switch-spring, 113;

4 is the key-bar, through which the keys 2, 2, act on the cam-action of the linotype, Figs 5, $5^A$ and 35;

15 is the space-bar;

$15^a$ is the center-rod for the space-bar;

$15^b$, $15^b$ are horizontal arms of the space-frame, which are attached fast to the center-rod $15^a$ and serve to support the space-bar 15;

$15^g$ is the upward-extending arm of the space-frame (Figs. 11, 12 and 13) which serves to operate the switch-spring $15^h$;

$15^h$ is the switch-spring, operated by the space-bar 15 (through the arm $15^g$) and which serves to close the circuit of the space-band-release-operating electro-magnet 66;

$15^i$ is the adjustable contact-screw, with which the switch-spring $15^h$ co-acts;

$15^k$ is a lock-nut for the screw $15^i$;

$15^p$ is a piece of hard-rubber, set in the arm $15^g$ of the space-frame, to operate the switch-spring $15^h$;

54, 54, are the case-shifting keys, for changing from lower-case to upper-case, seen at the right and left of the key-board, and in part broken away, in Fig. 18, and seen also in Fig. $34^B$;

$54^a$ is the center-rod, to which the case-shifting keys, 54, 54, are attached, as shown in Figs. 18 and $34^B$;

$54^b$ is an arm, attached to the shaft $54^a$, and to the shift-keys, 54, 54, and which serves when either of said keys 54, 54, is depressed, to act on the switch, 252, bringing it into contact and electrical connection with the contact-srew $252^a$ (Figs. 18 and $34^B$) so as to close the circuit of the case-shifting electro-magnet, 248;

$54^c$ is a returning-spring, which serves for the shift-keys, 54, 54 and the switch-operating arm, $54^b$, attached to them;

$54^d$ is a stop (Fig. $34^B$) against which the stem of the case-shifting key 54 is normally held, by the returning-spring, $54^c$;

66 is an electro-magnet, for operating the space-band releasing device; this numeral (66) refers both to the magnet, considered as a whole, and also to the iron-core of the same; best seen in Figs. 6, 7 and 8;

66$^a$ is the iron yoke-piece, for connecting the cores of the magnet 66;

66$^b$ is the armature, for the magnet 66;

66$^c$ is the center-rod, on which the armature, 66$^b$, is mounted;

66$^d$ is a bushing of phosphor-bronze or other suitable material, which is set fast in the armature 66$^b$, to bear on the center-rod 66$^c$;

66$^e$ is a yoke-piece of brass, or other material, which is driven tight over the free-ends of the cores 66, 66, just below the armature 66$^b$; this brass yoke-piece, with the iron yoke-piece 66$^a$ before mentioned serves to bind the two cores, 66, 66, together and also to firmly support the rod 66$^c$, on which the armature 66$^b$ is mounted;

100, 100, are wires, seen in Figs. 9, 10, 19, 19$^A$, 19$^B$, controlled by the key-operated switches (or keys) 2, 2, and leading from these to the shifting-switches, 225, 225, by which the keyboard 221 is connected with the one or the other of the two linotypes, 220, 220;

101, 101, are electro-magnets, for operating the matrix-releasing devices of the linotype;

101$^b$, 101$^b$ are the armatures of the magnets, 101, 101;

101$^d$, 101$^d$ are links for connecting the armatures, 101$^b$, 101$^b$, with the levers 402, 402, Figs. 29 and 30;

104 is a low-voltage, direct-current generator or battery, for feeding the magnets, 101, 101, etc;

104$^a$ is a bus-bar or feed-wire for the quick-acting keys 2, 2, of the duplex mechanism, Figs. 19, 19$^A$ and 19$^B$;

104$^d$ is a bus-bar or feed-wire for the slow-acting keys 2, 2, of the duplex mechanism;

113, 113 are switch-springs, operated by the keys 2, 2, of the key-board 221; these switches serve to control the matrix-releasing electro-magnets, 101, 101 respectively;

113$^a$, 113$^a$ are contact-screws, with which the switch-springs, 113, 113, co-act, to close the circuits of the matrix-releasing magnets, 101, 101;

113$^{aa}$ is a silver contact-piece, attached to the switch-spring 113;

113$^b$ is a bar of iron, brass or other conducting material, in which the contact-screws 113$^a$, 113$^a$ are set;

113$^c$, 113$^c$ are lock-nuts for the screws 113$^a$, 113$^a$;

190, 190 are links, connecting the armatures 101$^b$, 101$^b$, with the levers 191, 191, Fig. 3;

191, 191 are levers, through which the magnets 101, 101, act on the matrix-releasing escapements, Fig. 3;

191$^a$, 191$^a$ are fulcrum-rods for the levers 191, 191;

191$^b$, 191$^b$ are milled bars, in which the fulcrum-rods 191 and levers 190 are mounted;

192, 192, are links, through which the levers 191, 191 each transmits motion to the corresponding escapement-lever F, and pawls $f'$, $f^2$;

200, 200, are levers, operated by the magnets 101, 101, Figs. 4 and 5;

200$^a$ is the fulcrum-rod, for the levers 200, 200;

200$^b$ is a milled-bar, in which the rod 200$^a$ and levers 200, 200 are mounted;

201 is a push-piece, connected to the lever 200, to act on the corresponding one of the levers 210;

201$^a$ is the pivot for the push-piece 201;

201$^b$ is a spring for the push-piece 201, to hold it in contact with the lever 210;

210, 210, are levers, operated by the magnets, 101, 101, Fig. 4, and serving to operate the keys of the linotype key-board;

210$^a$ is the fulcrum-rod, on which the levers 210, 210 are set;

220, 220, are the two linotypes, controlled from my key-board, 221;

221, is the key-board, for operating the two linotypes, 220, 220;

222, is the switch-box, containing the shifting-switches, 225;

223 is a cable, connecting the key-board 221 with the switch-board box 222;

224, 224$^a$ are cables connecting the switch-board box 222 with the two linotypes, 220, 220, respectively;

225, 225, are shifting-switches, seen in Figs. 9, 10, 18, 19, 19$^A$, 19$^B$ and by which the keys 2, 2, of the key-board 221, are connected with the matrix-releasing magnets, 101, 101, belonging to the one linotype 220 or the other of said linotypes;

225$^a$ is a bar of insulating material, to which the switches 225, 225, are connected; and by which they are thrown, as a set or gang;

225$^b$ is a stop, against which the shifting-bar 225$^a$ is normally held by the spring 225$^c$;

225$^c$ is the returning-spring for the bar 225$^a$ and switches 225, 225;

226, 226, are switch members, connected respectively with the matrix-releasing electro-magnets, 101, 101, belonging to one of the two linotypes 220, 220;

226$^a$, 226$^a$, are similar switch-members, connected respectively with the matrix-releasing magnets, 101, 101, belonging to the other one of the two linotypes 220, 220;

227 is a shifting magnet, for operating the switches 225, 225, in Figs. 9, 10, 12, 19, 19$^A$, 19$^B$, 34$^B$ and 38; or the sliders 308 and 308$^a$ of the pneumatic shifting-mechanism, Figs. 23 and 24; or the mechanical shifting devices illustrated in Figs. 30 to 32$^A$—by which the key-board 221 is connected with the one linotype 220 or the other, as required;

227ᵃ is the armature of the shifting-magnet 227;

227ᵇ is a link, for connecting the armature 227ᵃ with the parts which it operates;

228ᵃ is a bell-crank-lever, through which the shifting-magnet 227 is connected with the shifting-bar 225ᵃ;

228ᵃ is the center or pivot of the bell-crank-lever 228;

229 is a switch for opening and closing the circuit of the shifting-magnet, 227;

229ᵃ is a switch-button or contact-screw, with which the switch 229 co-acts, to close the circuit of the shifting-magnet 227;

230 is a frictional-brake segment, Fig. 10, for holding the shift-keys 231 and 231ᵃ in whatever position they may be placed in;

230ᵃ is the pivot or center of motion of the segment 230;

230ᵇ, 230ᵇ are links, connecting the shift-keys 231 and 231ᵃ with the segment 230;

230ᶜ, 230ᶜ, are pieces of insulating material, which are set in the opposite arms of the segment 230, to operate the switch-springs, 236, 236 and 229;

231 and 231ᵃ are the shift-keys, through which the operator, as soon as he has set a line, sends up the line carriage or matrix-elevator and shifts the connections of his key-board from one linotype to another; Fig. 10;

232 is the friction-lever or brake-lever, for holding or locking the segment 230;

232ᵃ is the pivot or center for the brake-lever 232;

232ᵇ is a contractile spring, for pressing the brake-lever 232, against the segment 230;

232ᵈ is a returning spring for the segment 230 and key 231ᵃ; seen in Fig. 40ᴬ;

233 is a stop-bar, Fig. 10, which serves to limit the downward movement of the shift-keys, 231 and 231ᵃ;

235 is a large magnet for operating the assembling-elevator, I;

235ᵃ is the armature of the electro-magnet 235;

235ᵇ is a link, which connects the armature 235ᵃ with the lever i³, link i⁴ and assembling-elevator I;

236, 236, are switch-springs, for closing the circuits of the electro-magnets, 235, 235;

237, 237 are switch-springs, Fig. 10;

237ᵃ, 237ᵃ, are contact-screws, with which the switch-springs 237, 237, co-act;

238, 238, are magnets, for breaking the circuits of the magnets 235, 235;

238ᵃ is the armature of the magnet 238;

239 is the armature lever for the armature 238ᵃ;

239ᵃ is the pivot or center for the lever 239;

239ᵇ is the returning spring for the lever 239;

239ᶜ is a stop-screw for the lever 239;

240 is a slowing-up lever, Fig. 10, which retards the action of the magnet 238, in breaking the circuit of the magnet 235, which operates the matrix-elevator, to send up the line;

240ᵃ is the pivot or center of motion of the lever 240;

240ᵇ is a contractile returning-spring for the slowing-up lever, 240;

240ᶜ and 240ᵈ are adjustable stop-screws for the lever 240;

248 is an electro-magnet, for operating the case-shifting switches, 249, 249;

248ᵃ is the armature of the magnet, 248;

248ᵇ is a bell-crank, through which the armature, 248ᵃ, is connected with the insulating bar, 249ᵇ, and the switches 249, 249;

248ᶜ is the center of motion of the bell-crank 248ᵇ;

249, 249, are the case-shifting switches, by which the keys 2, 2, at the key-board are connected either with the matrix-releasing electro-magnets, 101, 101 which control the matrices that serve for lower-case letters, or with the similar electro-magnets, 101, 101, which serve for the upper-case letters;

249ᵇ is a bar of insulating material, shown in the diagrammatic views, Figs. 34ᴬ, 34ᴮ, 34ᶜ and 34ᴱ, for giving movement to the case-shifting switches, 249, 249;

249ᶜ, 249ᶜ, are switch-members (contact-buttons, in the diagrammatic views, Figs. 34ᴬ, 34ᴮ, 34ᶜ and 34ᴰ, contact-strips or contact-springs, in the geometric view, Fig. 34ᴱ) with which the switches, 249, 249, make connection, in order to operate the electro-magnets, 101, 101, which release the lower-case matrices; and, 249ᵈ, 249ᵈ, are the similar switch-members, with which the switches 249, 249, make connection, in order to operate the similar electro-magnets 101, 101, which release the upper-case matrices;

251 is a pivoted bar, for mounting the switch-springs, 225, 225, in Figs. 12, 13 and 17; or the switch-springs 249, 249, in Figs. 34ᴱ;

251ᵃ is the center or pivot, for the bar 251;

251ᵇ, 251ᵇ are clamping-pieces for the switch-springs, 225, 225, Figs. 12, 13, 17;

251ᶜ, 251ᶜ are pieces of insulating material, which serve to insulate the switches 225, 225, from the bar 251 and the clamping-piece 251ᵇ;

251ᵈ is an arm, attached to the bar, 251, to which arm the armature 227ᵃ of the shifting-magnet 227, is connected;

251ᵉ is the returning-spring for the bar 251 and switches, 225, 225, Figs. 12, 13 and 17;

251ᶠ is a stop-rail, against which the switches 225, 225, are normally held, by the spring 251ᵉ;

252, 252, are switches, for controlling the circuit of the case-shifting magnet, 248;

252ᵃ, 252ᵃ, are switch-members, with which the switches 252, 252, make connection, to close the circuit of the case-shifting magnet 248;

252$^b$ is a returning-spring for one of the switches, 252;

251 is a pivoted bar, for mounting the switch-springs 225, 225, Figs. 12, 13 and 17;

251$^a$ is the center or pivot for the bar 251;

251$^b$, 251$^b$, are clamping-pieces for the switch-springs 225, 225, Figs. 12, 13 and 17;

251$^c$, 251$^c$ are pieces of insulating material, which serve to insulate the switches 225, 225, from the bar 251 and the clamping-pieces 251$^b$;

251$^d$ is an arm, attached to the bar 251, to which arm the armature 227$^a$ of the shifting-magnet 227, is connected;

251$^e$ is the returing-spring for the bar 251 and switches 225, 225; Figs. 12, 13 and 17;

251$^f$ is a stop-rail, against which the switches 225, 225, are normally held by the spring 251$^e$;

281 is a switch, operated by the quick-acting keys, 2, 2, (Figs. 19 and 19$^B$) and which serves to close the circuit of the magnet 282, by the action of which the electric current is thrown on to the bus-bar 104$^d$, which feeds the slow-acting keys 2, 2, and the magnets, 101, 101, controlled by them;

281$^a$ is a switch-member, with which the switch 281 co-acts, to close the circuit of the magnet 282;

281$^e$ is a piece of insulating material, which is attached fast to the rail 113$^b$ and serves to support the contact-screw 281$^a$, Fig. 20$^A$;

282 is an electro-magnet, controlled by the quick-acting keys, 2, 2, and serving, when energized, to bring the electric-current on to the feed-wire, 104$^d$, through which the slow-acting keys, 2, 2, and the magnets, 101, 101, connected with them, are fed;

282$^a$ is the armature of the magnet, 282;

283 is a frame or bar, operated by the quick-acting keys, 2, 2, Figs. 19 and 19$^B$, and serving to operate the switch 281;

283$^a$, 283$^a$, are pins in the bar 283, on which the keys, 2, 2, Figs. 19 and 19$^B$, act to operate the switch 281;

283$^b$ is the returning-spring for the frame 283;

284 is the armature-lever, for the armature 282$^a$;

284$^a$ is the center of the armature-lever 284;

284$^b$ is a contact-screw, Fig. 19, connected with the feed-wire 104$^d$ and with which the armature-lever 284, makes connection, when the magnet 282 is energized;

284$^c$ is a stop-screw for the armature-lever, 284;

284$^d$ is the returning-spring for the armature-lever, 284;

300 is the valve-chest, considered as a whole, of the pneumatic mechanism; Figs. 21 to 26;

300$^a$, 300$^a$, are wind-grooves, channels or valve-chambers in the valve-chest, 300, one for each of the matrix-releasing devices; these valve-chambers are formed between the bottom-board 300$^b$ of the valve-chest, the top-board, 300$^c$ and the partitions, 300$^f$, 300$^f$;

300$^b$ is the bottom-board of the valve-chest, 300;

300$^c$ is the top-board of the valve-chest, 300;

300$^d$ is the front-bar of the valve-chest, 300;

300$^e$ is the back-bar of the valve-chest, 300;

300$^f$, 300$^f$, are partitions in the valve-chest, 300, which serve to separate the valve-chambers, 300$^a$, 300$^a$, from one another;

300$^g$, 300$^g$, are holes in the top-board and in the bottom-board of the valve-chest 300, by which the valve-chambers, 300$^a$, 300$^a$, respectively, communicate with the corresponding tubes, 302 and 303;

300$^h$, 300$^h$, are similar holes in the modified construction, Fig. 24;

301 is the valve-stem of the valve 301$^a$;

301$^a$, 301$^a$, are valves, controlled by the keys at the key-board and corresponding respectively to the power-pneumatics, 304, 304, by which the matrix-releasing devices of the linotypes are operated, in Fig. 21;

301$^b$ is a port, controlled by the valve, 301$^a$; and opening into the vacuum-chamber 305;

301$^c$ is another port, also controlled by the valve 301$^a$, and opening from the valve-chamber 301 to the external atmosphere;

301$^d$ is an expansive spring, for holding the valve 301 in a poistion in which it covers the port, 301$^b$;

302, 302, are tubes, connecting the valve-chest, 300, with the power-pneumatics of one linotype;

303, 303, are similar tubes, connecting said valve-chest 300, with the power-pneumatics, 304, of the other linotype;

304, 304, are pneumatic power-devices, controlled by the valves 301$^a$, 301$^a$, respectively and serving to operate the power-pneumatics 304, 304, of the linotypes; Fig. 21;

305 is the wind-chest or vacuum-chamber, connected to the valve-chest 300;

306 is a pipe, connecting the wind-chest 305 with an exhaust-bellows or exhaust pump;

307 is the armature-lever, Fig. 22, for operating the valve 301$^a$;

307$^a$ is the center or pivot for the lever 307;

308 and 308$^a$, are sliders or slide-valves, by the action of which the valve-chest 300 and the key-board controlling it, are connected with one of the two linotypes, 220, 220, or the other, as required;

309, 309, are the upper and lower cover-boards, which cover the sliders 308 and 308$^a$;

309$^a$, 309$^a$, are holes or ports, in the cover-boards, 309, 309, with which the pipes 302 and 303 connect;

309$^b$ and 309$^c$ are holes in the lower cover-board, 309, Fig. 24, with which the pipes 302 and 303, respectively connect;

310 is a rock-shaft, for communicating motion to the sliders, 308 and 308$^a$, Fig. 23;

$310^a$, $310^b$, $310^c$ are arms of the rock-shaft 310;

$310^d$ is a stop for limiting the play of the rock-arm $310^c$, the armature $227^a$ and the sliders 308 and $308^a$;

311, 311, are links connecting the arms $310^a$ and $310^b$ of the rock-shaft 310, with the sliders 308 and $308^a$;

313 is a returning-spring for the armature 227 and sliders 308 and $308^a$, Fig. 23;

340 is a frame, operated by the quick-acting keys, 2, 2, Figs. 18, 20, $20^A$, $20^B$ and 28, and serving to operate the switch 281, which controls the magnet, 282;

$340^a$ is the center-rod of the frame, 340;

$340^b$ is a cross-bar on the frame 340, on which the quick-acting keys 2, 2, act, to operate the switch, 281;

$340^c$, $340^c$ are arms, connected firmly to the center-rod $340^a$ and serving to support the cross-bar $340^b$;

$340^{dd}$ is an arm of the frame 340, which acts on the switch, 281;

$340^e$ is an insulating-piece, which is set in the arm $340^{dd}$, to act on the switch 281;

402, 402, are levers, corresponding to the rock-shafts, 410, 410, and to the matrix-releasing devices, F, $f'$, $f^2$, with which levers the armatures $101^b$ of the magnets, 101, 101, are connected by the links, $101^d$, $101^d$, Figs. 29 and 30;

$402^a$, $402^a$ are fulcrum-rods for the levers, 402, 402;

$402^b$, $402^b$ are milled-bars, in which the rods $402^a$, $402^a$ and levers, 402, 402, are mounted;

403, 403, are links, connecting the levers 402, 402 (operated by the magnets, 101, 101) with the arms $410^a$, $410^a$, of the rock-shafts, 410, 410;

410, 410, are rock-shafts (Figs. 29, 30, 31, 32 and 33) for connecting the key-board 221 with two linotypes, alternately;

$410^a$ is an arm on each of the rock-shafts, 410, 410, through which movement is transmitted to it, from the corresponding key at the key-board, or from a power-device, controlled by such key;

$410^b$, $410^b$, are two arms, on each of the rock-shafts, 410, 410, for operating the corresponding matrix-releasing escapements, in the two linotypes, 220, 220, which are controlled from the key-board 221;

411, 411, are links, connecting the arms $410^b$, $410^b$, of the rock-shafts, 410, 410, with the levers, 412, 412;

412, 412, are levers, operated from the key-board, through the rock-shafts 410, 410, and which serve to operate the matrix-releasing devices, F, $f'$, $f^2$; Figs. 29, 30, 31 and 32;

$412^a$ is a rod, on which the levers 412, 412, are fulcrumed;

$412^b$ is a milled bar, in which the rod $412^a$ and the levers 412, 412, are mounted;

413, 413, are pins, forming a break-down connection between the levers 412, 412, and the matrix-releasing escapement levers F, F, in Figs. 30 and $30^A$;

$413^a$, $413^a$, are spring-holding disks on the pins, 413, 413;

$413^b$, $413^b$, are returning-springs for the pins 413, 413;

414 is a pivoted frame or shifting-frame, in which the pins 413, 413, are mounted;

$414^a$ is the center-rod for the frame 414;

$414^b$ is a hardened pivot or point, for mounting the rod $414^a$;

$414^c$ is the frame-work or standard, in which the pivots, $414^b$, $414^b$, are set;

415 is the shifting rock-shaft, through the action of which, with other parts, the set of rock-shafts, 410, 410, is connected with the one linotype 220, or with the other linotype, 220;

$415^a$ and $415^b$ are oppositely-placed arms of the rock-shaft, 415, through which and the links, 418, 418, said rock-shaft connects with the break-down connections of the two linotypes, 420, 420;

$415^c$ is the returning-spring for the shifting rock-shaft, 415, Figs. 30, 31 and 32;

416, 416, are pivoted push-pieces or latches, for connecting the levers, 412, 412, with the matrix-releasing escapements, F, F, Figs. 31 and $31^A$;

$416^a$, $416^a$, are links for connecting the latches 416, 416 with the rocking-bar 417;

417 is the rocking-bar, for shifting the latches, 416, 416, Figs. 31 and $31^A$;

418, 418, are the links, by which the oppositely-placed arms, $415^a$ and $415^b$, of the shifting rock-shaft, 415, are connected with the break-down connections between the rock-shafts, 410, 410, and the matrix-releasing devices of the two linotypes, 420, 420;

419, 419, are the rock-shafts, for shifting the fulcrum-rods, $412^b$, $412^b$, and levers 412, 412, Figs. 32 and $32^A$;

$419^a$, $419^a$, are the arms of the rock-shafts, 419, 419, to which the fulcrum-bars, $412^b$, $412^b$, of the levers 412, 412 (Figs. 32 and $32^A$) are attached;

420 is the lever, through which the pneumatic power-device, 304, acts on the corresponding key-bar, 4, and so through the common and well-known cam-action, on the matrix-releasing escapement device, F, $f'$, $f^2$; see Fig. 36;

$420^a$ is the fulcrum-rod, for the levers, 420, 420;

$420^b$ is the milled-bar, in which the rod $420^a$ and levers 420, 420, are mounted;

430 is a handle for manipulating the switches 225, 225; seen in Figs. $40^B$ and $40^C$, so as to connect the keys 2, 2, with the matrix-releasing electro-magnets, 101, 101, of the first, second or third linotype, as required;

431 is a pivoted arm, to which the handle 430 is attached; this arm is itself connected with the insulating-bar 225ª and the switches 225, 225;

432 is an index or scale, over which the lower end (serving as a pointer) of the arm 431 travels; the marks on this scale serve to indicate which one of the linotypes (the first, the second or the third) is connected at the time, with the keys, 2, 2, Fig. 40$^B$;

440, 440, are levers, located below the keys D, D, of the linotype key-board, through which the magnets 101, 101, act each on the corresponding key-bar, and so, through the usual cam-action, on the corresponding matrix-releasing escapement; seen in Fig. 36$^A$;

440$^a$, 440$^a$, are the fulcrum-rods for the several banks or rows of the levers, 440, 440;

440$^b$, 440$^b$, are milled-bars, in each of which one of the fulcrum-rods 440$^a$ and the corresponding bank or row of the levers 440, 440, are set.

*Means for connecting my key-board with the operative parts of a linotype machine*

My key-board, marked 221, in Figs. 1 and 2, may be connected to operate the vital parts of the linotype (that is, of two linotypes) in any suitable manner, of which several are hereinafter described. I prefer, however, in ordinary cases, to connect my key-board, 221, with a plurality of linotypes, through electro-magnets, which are themselves controlled from the key-board 221. And in combining my key-board with the linotype it is only necessary—

(*a*) To connect my electro-magnets, 101, 101, which correspond to and are controlled respectively by, the keys of my key-board 221, each to operate the appropriate matrix-releasing escapement device F, $f'$, $f^2$; see as to these escapements, the specification and drawings of the patent to Mergenthaler before mentioned, No. 436,532, dated September 16, 1890; and see also, Figs. 3, 4, 5, 5$^A$, 9, 10, 11 and 12 of the accompanying drawings; and, (*b*) To connect my electro-magnet 66 (which is operated by the space-key or space-bar 15, of my key-board 221) to operate the space-band-releasing device or the space-wedge releasing device, as Mergenthaler called it, by which a space-band or a space-wedge (words which mean the same thing) is released, to fill in the space at the end of a word; see for this purpose the specification and drawings of Mergenthaler's patent aforesaid, No. 436,532, dated September 16, 1890, particularly Figs. 9, 10, 11, 11$^a$ and 64 of said patent; see also my Figs. 6 and 6$^A$, in the accompanying drawings; and also my Figs. 7, 8, 8$^A$ and 8$^B$, (*c*) Preferably, also, I provide an electrically-operated device (or other power-operated device) controlled by a key or lever at my key-board 221, and serving to operate the assembling elevator I, when the appropriate key at the key-board is touched, so as to set the composed line of matrices and space-bands in a course of motion towards the mould, at which the linotype or slug (or in machines like the Stringertype, the individual type) are cast; see, for example, Fig. 10; also Figs. 41 and 42. And, (*d*) Preferably, also, I provide mechanism by which, when a line is assembled in one linotype, the connections between the key-board 221 and the linotypes are shifted, from the machine in which the line has just been assembled to the other linotype, in which the next line is to be assembled. I consider this very useful, but do not always use it—it is not used in the apparatus illustrated in Figs. 27, 28, 39, 40 and 40$^A$.

Considering first, the form of apparatus illustrated in Fig. 3—

Y, Y, are the matrices, which slide in grooves in the inclined, channeled magazine B, in the manner well known in the art and fully described in Mergenthaler's patents before mentioned.

F is the escapement-lever, centered at F'; and $f'$, $f^2$ are the pawls, connected to the lever F and which serve to engage and release the matrices, Y, Y, releasing one matrix for each to-and-fro movement of the lever F and pawls $f'$, $f^2$. All these details are well known in the art, and are fully described in Mergenthaler's patent aforesaid, No. 436,532, dated September 16, 1890; so I shall not describe them further.

101, 101, are electro-magnets, which correspond respectively to and are controlled respectively by, the keys 2, 2, of my keyboard 221 in the manner clearly illustrated in the drawings and hereinafter described. In the diagrammatic drawing, Fig. 9, these keys, 2, 2, are shown diagrammatically, as pivoted switches merely, but in Figs. 4 and 12, they are shown as key-levers, controlling the switch-springs 113, 113, and thus controlling the electro-magnets 101, 101, which correspond to said keys 2, 2, respectively.

101$^b$, 101$^b$, are the armatures of the electro-magnets 101, 101. Each of these armatures is connected, in Fig. 3, through one of the links, 190, levers 191 and rods 192, to operate the corresponding escapement lever F, with its pawls $f'$, $f^2$. The levers 191 are centered on the rods 191$^a$, set in the milled bars 191$^b$, in a manner common and well known in the mechanical world; or said levers may be mounted in any other suitable manner whatever. Each of the magnets 101, 101, when energized by the closing of its circuit through the corresponding key at the key-board 221 (the pivoted key-switch 2, in the diagrammatic views, Figs. 9 and 19 or the switch-spring 113, in the more nearly mechanical views, Figs. 11, 12, 14, 15, 16, 20, 20$^A$, 28 and 40) attracts its armature 101$^b$, which, through the link 190, lever 191, rod 192, and escapement-lever F, draws down the pawl $f^2$ and pushes up the pawl $f'$, thereby releasing the lowest one of the matrices, in the corresponding groove or channel of the magazine, permitting such matrix to fall; and thus, as the magnets, 101, 101, corresponding to the successive letters of a word, have their circuits closed, in due order and succession, by the appropriate keys, 2, 2, at the key-board 221, the matrices Y, Y, corresponding also to these letters, drop, in due order and succession and are assembled in their proper order, in the assembling elevator or assembling-block, I, by the usual assembling mechanism, which is well known in the art, and is described in the patent to Mergenthaler aforesaid, and illustrated in Figs. 1 and 12 to 20 of the drawings accompanying the Mergenthaler patent aforesaid, No. 436,532, dated September 16, 1890; or any other assembling mechanism whatever that is suitable for the purpose, may be used instead.

To release a space-band, at the end of a word, the magnet 66 (Figs. 6, 9, and 13) is energized, when the switch-spring $15^h$ (Figs. 16 and $20^c$) is brought by the depressing of the space-bar 15 (which is centered on the rod $15^a$, and has an upward-extending circuit-closing arm $15^g$) into electrical contact and connection with the adjustable contact-screw $15^i$ (Fig. 13). For this contact-spring $15^h$, is connected, through the other contact-springs 225 and 226 or $226^a$, and the appropriate one of the two electro-magnets, 66, 66, belonging to the one linotype or the other (according to the position of the switch 225) with the other pole of the low-voltage, direct-current generator or battery, 104, before mentioned, thus completing the electrical circuit. Said magnet 66, being thus energized, acts upon the space-band-releasing device of the linotype (see Figs. 9 to $11^a$, of Mergenthaler's patent aforesaid, No. 436,532, dated September 16, 1890, and see also my Figs. 6 and $6^A$) lifting the connecting-rod $k^{12}$, the rock-arms $k^{10}$ and the slide or pawls $k^{11}$, thereby releasing the space-band Z, so that it drops down through the chute $k$, to the assembling-elevator I, where it is assembled in due order into the line, in the manner well known in the art.

In Fig. 3, the matrix-releasing magnets, 101, 101, which correspond to and are controlled respectively by the keys 2, 2, at the key-board 221 (and which magnets serve to operate, in turn, the matrix-releasing devices, corresponding respectively to the keys 2, 2, by which such magnets are respectively controlled) are located at the rear of the machine and connected directly each to the lever F and pawls $f'$, $f^2$, by which the corresponding matrices are released. But in the arrangement of the parts illustrated by Fig. 4, said magnets, 101, 101, are located in front of the keyboard of the linotype machine; and the armature $101^b$ of each of said magnets is connected, through the lever 200, fulcrumed at $200^a$ and through the link or push-piece 201, the lever 210 (fulcrumed at $210^a$) and the push-rod 211, to act on the corresponding linotype key, D, to depress said key, when required, just as the operator's fingers would do; and the linotype key D, then acts in the usual way and through the usual cam-action, which is described in the patent to Dodge aforesaid, No. 530,931, dated December 18, 1894, to release the corresponding matrix.

The spring $201^b$, Fig. 4, serves to hold the link or push-piece 201 normally in engagement with the lever 210, so that the lever 200, when acted on by the magnet 101, gives movement through the push-piece 201 to the lever 210 and so, through the link 211, to the corresponding linotype key D, and through this key and the usual cam-action, gives movement to the matrix-releasing device that corresponds to and is controlled by said key.

No special importance is attached to the exact means shown in Fig. 4 for connecting the electro-magnets, 101, 101, with the keys D, D, of the linotype machine; and any other means whatever of connecting said electro-magnets 101, 101, to operate said linotype keys D, D, which is suitable for the purpose may be used instead. The particular arrangement shown in Fig. 4 is such, it will be seen, that the supplemental key-board 221 may be placed in such juxta-position to the two linotypes which it controls, that the push-rods 211 will overlay the keys D, D, of the linotype key-boards, so as to operate them, very much as an old-fashioned piano-player stood in juxtaposition to a piano-forte, so as to operate its keys. But, when desired, the electro-magnets 101, 101, which are controlled by the keys 2, 2, of the key-board 221, may be connected directly to the linotype keys, D, D. One arrangement of this sort is illustrated in Figs. 5 and $5^A$, which, after the description before given, will require no further description.

I have now described the preferred mechanism for connecting my key-board 221 with the keys or the matrix-releasing devices of an ordinary linotype and also for connecting my space-bar 15 to operate the space-band-releasing device of the linotype. The connections thus made between my key-board and one linotype are, preferably, duplicated for the other linotype. This having been made clear, I shall now describe the—

*Means for controlling two linotypes from one key-board*

A simple apparatus for this purpose is illustrated in Figs. 27 and 28, in which two sets of keys are used, combined into one keyboard; one of these sets of keys is permanently connected with one linotype and the other set of keys is permanently connected with the other linotype; and the operator changes his hands alternately from the one set of keys to the other, so as to set the lines alternately on the two machines. But I prefer to save the operator the labor of changing his hands from one set of keys to the other, as the successive lines are set; and I shall therefore first describe my mechanism, in which the operator sets the successive lines on the same set of keys and the connections of the key-board are shifted from the one linotype to the other, so as to set alternate lines on the two machines respectively. The matter will be most easily understood by considering first the diagrammatic views, Figs. 1, 2, 9 and 10.

It will be remembered that the magnets, 101, 101, which are seen in Fig. 9, are each controlled by one (by the corresponding one) of the keys 2, 2, at my key-board 221; and that each of these magnets in turn operates the corresponding one of the matrix-releasing devices, F, $f'$, $f^2$; that the magnet 66, which is itself controlled by the space-bar 15 at the key-board 221, operates the space-band-releasing device (Fig. 6). Also, it is to be understood that a similar, but much larger and stronger electro-magnet, 235, which is likewise controlled from the key-board 221, operates the assembling elevator, I, so as to send up the line, after it has been assembled. Also, it will be remembered that there are two sets of the matrix-releasing electro-magnets, 101, 101, one set for one and another set for the other of the two linotypes that are controlled by my key-board 221. In like manner, there are two of the space-band-release-operating electro-magnets, 66, 66, one for each of the two linotypes; and so with the assembling-elevator lifting electro-magnets 235, 235; there is one of these for each of the two linotypes, which my key-board 221 controls.

In Fig. 1, which is quite diagrammatic, the two linotypes, which are roughly indicated in plan, are marked 220, 220. 221 is a key-board of any suitable kind, for example, of the kind illustrated in Figs. 11 and 12 (see also Figs. 13 to 17) which is a simple or non-duplex key-board and which we shall, for simplicity's sake, first describe; or the key-board 221 may be of the kind illustrated in Fig. 18 or in Figs. 27 or 39, all three of which illustrate duplex key-boards; or said key-board 221 may be of any other kind whatever that is suitable for the purpose.

222 is a switch-board box or case, in which, preferably, the shifting switches 225, 225 (by which the key-board 221 is connected with one of the linotypes 220, 220, or the other, as required) the magnets 238, 238, the switch levers 240, 240, and other accessories hereinafter described, are disposed.

2, 2, are the letter-corresponding keys, shown diagrammatically, in Fig. 9, as switches and which are arranged to control the electro-magnets 101, 101, each of said keys controlling the corresponding one of said electro-magnets. But it will be observed that in Fig. 9 (and see also Fig. 12) with the one set of keys 2, 2, two sets of electro-magnets, 101, 101, are shown, one of which sets of electro-magnets serves for one of the linotypes, 220, in Fig. 9 and the other of which sets of electro-magnets serves for the other of said linotypes, to operate the matrix-releasing escapements of said linotypes in any suitable manner, as for example—

(*a*) Through the armatures, 101$^b$, links 190, levers 191 and rods 192, as shown in Fig. 3 and before described; or, (*b*) Through the armatures 101$^b$, acting through any suitable linkage or connections on the keys of the linotype itself and thus, through the usual cam-action, acting on the matrix-releasing escapements of the machine; see, for example, Fig. 4 or Fig. 5; or, (*c*) Said electro-magnets, 101, 101, may be connected to operate the matrix-releasing or type-delivering devices of the controlled linotypes (or other type machines) in any other manner whatever that is suitable for the purpose.

An important feature of the present invention, it will be remembered, consists in the fact, that my apparatus is organized in such a manner that the operator, from his key-board, controls two linotypes or a duplex linotype, setting the first, third, fifth, etcetera, lines on the one linotype, and the second, fourth, sixth, etcetera lines on the other linotype, as before described. For this purpose, the key-board, which is marked 221 in Figs. 1 and 2, may, as before said, either—

(*i*) Have two sets of keys, one connected to control one linotype, 220, and the other to control the other of said linotypes (Figs. 1 and 2) in which case the keys of each of said sets are permanently connected with the linotype corresponding to such set, and the operator sets one line of type on one of said linotypes and the next line of type on the other of said linotypes; and so on alternately; setting the first, third, fifth, etcetera lines by operating on one set of keys and the second, fourth, sixth, etcetera lines by operating on the other set of keys, belonging to the same key-board; see, for example, Figs. 27 and 28; or (*ii*) Preferably, as before said, and in order to make it more convenient for the operator, a single set of keys is used and changeable connections (preferably, changeable electrical connections or changeable pneumatic connections, as hereinafter described) are employed, by which at the end of each line, he shifts his control from the one linotype to the other.

Electrical connections for this purpose are seen in Figs. 9 and 10 (and see, also, Figs. 12 and 13) in which the wires, 100, which are controlled respectively by the keys 2, 2, lead to change switches 225, 225, which serve to make connection alternately with the contact-buttons, 226, 226, which correspond respectively to and are connected respectively with the magnets 101, 101, of the one set, belonging to the one linotype, and the contact-buttons 226ª, which control the electro-magnets, 101, 101 of the other set, belonging to the other linotype. Each of the change-switches 225, then, it will be seen, serves to connect the wire 100 and switch 2, belonging to it, with the corresponding magnet, 101, in the one linotype, or in the other linotype, as required. For convenience of manipulation, I have arranged the details, as follows:

The switches 225, 225, are connected together by an insulating-piece, 225ª, in the diagrammatic views, Figs. 9 and 10, so that they can be easily worked as a set or gang, whereby all the wires 100 can be connected instantly either with the magnets 101, 101, belonging to the one linotype, or with the similar magnets, 101, 101, belonging to the other linotype. The magnet 227, having an armature 227ª, is connected through the link 227ᵇ and the bell-crank lever 228 (which is centered at 228ª) to operate the bar 225ª and switches 225. The bar 225ª is held in its normal position in contact with the stop 225ᵇ, by the contractile spring 225ᶜ, or in any other suitable manner; and in this condition of things, the change-switches 225, make connection with the contact-springs or contact-buttons 226, which connect electrically with the corresponding magnets, 101, which belong to one of the linotypes 220 and serve to operate the matrix-releasing escapements thereof; but when the bar 225ª and switches 225, 225, are thrown to the right (Figs. 9 and 10) by the action of the magnet 227, attracting its armature 227ª, the several switches 225, 225, are brought into electrical connection with the contact-springs or buttons, 226ª, 226ª, which connect respectively with the magnets, 101, 101, of the set belonging to the other linotype 220, Figs. 1 and 2, and which serve to operate the matrix-releasing escapements thereof.

In order to control the magnet 227 and the gang of switches, 225, 225, a switch 229, is seen in Fig. 9, which closes circuit through the magnet 227, when said switch is thrown into contact with the contact-screw or button, 229ª. The switch 229 or its equivalent, may be controlled in any suitable manner. In fact, the gang of switches, 225, 225, might be located in or in proximity to the key-board 221, Figs. 1 and 2, and operated directly by the hand of the key-board operator. But I consider it, on the whole, more convenient to locate the switches 225, 225, in the switch-board box, 222, Figs. 1 and 2, and to operate them through the magnet 227 (located in the switch-board box) by the switch 229, located at the key-board.

When an operator is operating two linotypes, on my system, setting the first, third, fifth, etcetera lines on one linotype, and the second, fourth, sixth, etcetera lines on the other linotype it is desirable that he should operate both linotypes with one key-board, and it is necessary or at least desirable that he should, as soon as he has set a line on one linotype, operate the matrix-elevator of that linotype and change the electrical connections of his key-board from the one linotype to the other, so as to set the next line on the second linotype.

In order to make these tasks as easy for the operator as practicable, I arrange things in such a manner, preferably, that he operates the matrix-elevator for the linotype on which he has just set a line and shifts the electrical connections of his key-board to the other linotype (so that the next line will be set up thereon) with a single action. Apparatus of the kind illustrated in Fig. 10, may be used for this purpose. In this, 225, 225, are the change-switches, before described, by which the key-board 221 is connected with the one or the other of the two linotypes, 220, 220, Figs. 9 and 10, that it controls. 227 is the magnet for operating these switches, as before described; 229 is the switch-spring and 229ª is the contact-screw used for closing the circuit of the magnet 227. 230 is a segment, pivoted at 230ª, opposite sides of which segment are connected by the rods, 230ᵇ, with the keys, 231 and 231ª. 232 is a friction-lever or brake-lever, centered at 232ª, and held by the contractile-spring 232ᵇ, firmly against the curved surface of the segment 230, so as to hold this in whatever position it may be thrown into by the keys 231 and 231ª. The downward movement of each of these keys is limited by a stop-bar 233. Set in the segment 230ª are two pieces 230ᶜ of insulating material. The parts, as illustrated in the drawings, are formed and arranged and adjusted in such a manner that when the key 231 is down and the key 231ª is up (as shown in Fig. 10) the switch 229 stands clear of its contact-screw, 229ª, the circuit of the magnet 227 and battery B' is open, and the bar 225ª and switches 225, 225, are held by the contractile spring 225ᶜ, in such a position that the several switches 225, 225, each makes contact with the switch-button, 226, corresponding to it, the result of which is that the wires 100 (controlled by the switches 2, 2, respectively) in Fig. 9 are connected through the switches 225 and contact-buttons 226, with the magnets 101, 101, belonging to one of the two linotypes aforesaid (the one indicated by the mark First Linotype, Figs. 9 and 10).

But if now, the key 231ª is depressed (Fig. 10) this, through its rod 230ᵇ, acts on the segment 230, and through the insulating piece 230ᶜ, lifts the switch-spring 229 up into contact and electrical connection with the contact-screw 229ᵃ, thereby closing the circuit of the battery B' through the magnet 227; and this magnet, becoming energized, attracts its armature 227ᵇ, and so gives movement to the bar 225ᵃ, and switches 225, 225, bringing each of the latter into electrical connection with the corresponding contact-button 226ᵃ; the result of which is that the key-board 221 and its wires 100 (controlled by the keys 2, 2) Fig. 9, are now brought into connection with the magnets 101, 101, that control the other linotype—indicated by the mark, Second Linotype, in Fig. 10. Thus, the operator, by depressing whichever one of the keys, 231 or 231ᵃ, is high, shifts the electrical connections of the key-board 221, from the one linotype to the other.

Instead of the device shown in Fig. 10 and above described, any other switching or reversing device that is suitable for the purpose may be used, to change the electrical connections of the key-board 221, from the one linotype to the other.

But in addition to changing the connections of the key-board from the one linotype to the other alternately, as each line is set (that is, as the type or matrices for a line are assembled) it is necessary, as before said, that the matrix-elevator I of the appropriate linotype (that is, the linotype on which a line has just been set) should be operated, so as to set the matrices in a course of motion towards the mold, at which the slugs or type are cast. For operating the matrix-elevator I, that is, for lifting the matrix-elevator, I, with its matrices, I provide a large and strong electro-magnet, 235, with an armature 235ᵃ, which is connected by the link, 235ᵇ, with the lever $i^3$ and link $i^4$, which are used by Mergenthaler to lift the assembling-block or assembling-elevator I, in his patent aforesaid, No. 436,532, dated September 16, 1890; see his Figs. 12 and 13 and see my Fig. 10; or said magnet 235 may be connected with one of the rock-arms of the rock-shaft 450ᵃ which is now commonly used to lift the matrix-elevator; or it may be connected to lift said matrix-elevator in any other way that is suitable for the purpose. Two of the magnets 235, 235, are used, one for each of the linotypes, 220, 220.

For controlling the magnets 235, 235, I prefer to use the contact springs, 236, 236 (Fig. 10) which are connected with one pole of the battery B', and the contact-screws 236ᵃ. The contact-springs 236, 236, are operated by the keys 231 and 231ᵃ, through the segment 230, which, when it is in one extreme position, presses one of the contact-springs 236, into electrical connection with the corresponding contact-screw 236ᵃ, thereby closing circuit thru the corresponding magnet 235; and when it is in the other extreme position, it opens the circuit of the first of the switch-springs 236 and closes the circuit of the other of said switch-springs 236, through the other of said contact-screws 236ᵃ, and the corresponding matrix-elevating magnet 235. Thus, whichever one of the keys, 231 or 231ᵃ is depressed, the circuit of the corresponding one of the magnets 235 is closed, so that the matrix-elevator, belonging to the linotype on which a line has just been assembled, is operated, that is, said matrix-elevator and the line of matrices contained in it, are lifted up, so that said matrices are started on their way to the mould, where the slugs or type are cast.

To permit of the matrix-elevator I (or assembling-block, as Mergenthaler calls it) returning to its normal position before the keys 231 or 231ᵃ are again operated, I prefer to provide an automatic circuit-breaking device, by which the circuit of the magnet 235 is broken, after it has lifted the matrices, and without waiting for the keys 231 and 231ᵃ and the segment 230 to be operated. One arrangement of parts for this purpose, is seen in Fig. 10. In this, the contact-screw 236ᵃ, instead of connecting directly with the magnet 235, connects with it through a contact-screw 237ᵃ and contact-spring 237, which are normally in electrical connection; that is, the spring 237 normally presses up against the contact-screw 237ᵃ. A releasing magnet 238, is shunted across, between the contact-screw 236ᵃ and the opposite pole of the battery B', in parallel with the magnet 235, as shown in Fig. 10. When, therefore, by the action of the keys, 231 and 231ᵃ, acting through the segment 230, one of the contact-springs 236 is pressed against the corresponding contact-screw 236ᵃ, the circuit is closed simultaneously through the matrix-elevator-operating magnet 235, which is a large and strong magnet, and through the corresponding releasing magnet 238, which is a much smaller magnet. The armature 238ᵃ of the magnet 238, is connected to the short-arm of a lever 239 (centered at 239ᵃ) and the longer arm of said lever 239 (which is normally held by the contractile spring 239ᵇ against the adjusting-screw 239ᶜ) rises upward and strikes a nearly-balanced and much more massive lever 240, which is centered at 240ᵃ, and held by the contractile spring 240ᵇ against the adjustable stop-screw 240ᶜ; and when the lever 240, which acts to the lever 239 as a slowing-up lever, is thus struck, its rightmost arm moves downward, Fig. 10, and pushes the contact-spring 237, away from the contact-screw 237ᵃ, thereby breaking the circuit of the magnet 235, thus leaving the assembling-elevator or matrix-elevator I free, so far as the magnet 235 is concerned, to return to its normal position, ready to receive another line of matrices.

Instead of making the key-board 221, in

Figs. 1 and 2, separate and distinct from the two linotypes, it may, if desired, be built on to one of them. But in the majority of cases, a keyboard which is located as shown in the drawing, Figs. 1 and 2, about equidistant from the two linotypes, or their assembling elevators, and as close to each linotype, and particularly to its assembling elevator, as practicable, so that the operator can easily watch both machines, will probably be found preferable. This construction, also, makes it practicable to leave each of the two controlled linotypes intact, so to speak, connected, indeed, with the controlling key-board 221, but with its own key-board in condition to be operated at any time. Thus, the two machines can be operated both together, as a duplex machine, by a single operator; or they may be operated separately, each by its own operator, when desired.

I have stated above that I prefer to place my key-board as close to the two linotypes and, particularly, as close to their assembling-elevators, I, I, as practicable. By this I mean to place the key-boards and the two linotypes in such a position with relation to each other that the key-board shall be as close to the two linotypes and particularly to the assembling-elevators I, I, thereof, as practicable. For this facilitates the operator's task of watching his machines and makes it easier for him to effect hand justification, when that is needed, and to correct transpositions and other errors, when there are any.

With the exact details of arrangement, illustrated in Figs. 1 and 2, the two linotypes, 220, 220, are placed in line with each other and in proximity to each other and to the key-board 221; one linotype being located at the right and the other at the left of the key-board; and the key-board itself is placed just in front of the two linotypes, as close to them and especially to their assembling elevators, I, I, as practicable. But instead of placing the two linotypes in line with each other, and just behind the key-board, said linotypes may be placed in any other position whatever with relation to each other and to the key-board, that is suitable for the purpose; but preferably, in such a position of proximity to each other and to the key-board, that the operator, while seated at the key-board, is as close as practicable to the assembling-elevators of the two machines, so that he can watch his two machines to the best advantage; watching, naturally, most that assembling-elevator in which he is, at the moment, setting a line. And thus, he is enabled to make corrections and to effect hand justification, when that is needed, in each machine, without leaving his key-board.

In the diagramatic views, Figs. 9 and 10, the keys, 2, 2, belonging to the key-board 221 (Figs. 1 and 2) for the sake of simplicity and in order to make the arrangement of the electrical circuits clearer, are illustrated as pivoted switches merely, each of which serves, when acted on by the operator, to close circuit through the corresponding one of the matrix-releasing electro-magnets, 101, 101, in the one linotype or the other, according to the position in which the gang of shifting switches, 225, 225, is set. But, practically, I prefer to use finger-keys of the usual kind (or of any suitable kind) at the key-board, each of which controls its magnet 101, through an appropriate switch, which is operated by such key. Any convenient arrangement of parts for this purpose may be used. One convenient arrangement of parts that may be used for this purpose (one out of many possible arrangements) is illustrated in Figs. 11, 12, 13, 14, 15, 16 and 17, which have been before briefly described.

In these figures, 2, 2, are the keys, which are centered on the rod $2^a$, which rod is set in the milled-bar $2^b$. The rearward, upward-extending portion of the key 2, acts, through an insulating or non-conducting piece $3^p$, attached to it, on a switch-spring 113, which is firmly clamped at its upper end between pieces of vulcanite or other suitable, non-conducting material, $2^k$, $2^k$, which are themselves clamped between the rail $2^l$ and the clamp-pieces $2^m$; see particularly, Figs. 12, 14, 15 and 16; or said switch-springs, 113, 113, may be mounted in any other suitable manner whatever.

A contact-point, $113^{aa}$, of silver or other suitable material, serves when the corresponding key, 2, is depressed, to come into contact with and to make electrical connection with, a similar contact point, which is soldered, let into, or otherwise suitably attached to, the end of the adjustable contact-screw $113^a$, which is set in the bar $113^b$ and adjustably secured therein, by the action of the lock-nut $113^c$. Preferably, on account of limitations of space, the contact-screws, $113^a$, $113^a$, are set in two rows alternately, the first, third, fifth, etcetera, of said contact-screws being set in one row, and the second, fourth, sixth, etcetera, of said screws, being set in the other row; this is best seen in Figs. 12 and 14; but any other arrangement of the switches, 113, 113, that is suitable for the purpose may be used, instead of that illustrated in the drawings.

Whenever, then, any of the keys, 2, 2, at the key-board 221, (Figs. 1, 2, 9, 11 and 12) is depressed, it presses the corresponding spring-switch, 113, into contact and electrical connection with its contact-screw $113^a$, which is set in the bar $113^b$. This bar is connected with one pole—for convenience sake (though it makes no practical difference) let us say with the positive pole of the battery or low-voltage, direct-current generator, 104. And when said contact-spring 113, is, by the depressing of the corresponding key 2, at the key-board 221, thus brought into contact with the battery-connected contact-screws, 113$^a$, the electric-current (with the exact details of arrangement illustrated in Fig. 12, which may, of course, be altered or reversed, if desired, without in any way varying from the principle of my invention) flows from the low-voltage direct-current generator or battery 104, to the bar 113$^b$, screw 113$^a$ and switch-spring 113; and so to the change-switch 225 (shown in the partly diagrammatic view, Fig. 12, as a pivoted switch spring) and from this switch-spring 225, the current flows, as before described, either to the contact-spring 226 and from that to the corresponding matrix-releasing magnet 101, belonging to the one linotype; or, if the position of said switch-spring 225 (and, indeed, of the whole gang of switch-springs, 225, 225) is altered, by the action of the magnet 227, as before described in connection with Figs. 1, 9 and 10, the current flows to the switch-spring 226$^a$ and so to the corresponding magnet 101, belonging to the other one of the two linotypes, which are simultaneously controlled from the key-board 221. All this is so clear from Fig. 12, and from the description before given in connection with Figs. 1, 9 and 10, that nothing further need be said here.

The shifting-switches, 225, 225, are also shown, for the sake of convenience and the easier understanding of the arrangement of the circuits, as pivoted switches, in the diagrammatic views, Figs. 9 and 10, which normally make connection with the contact-buttons, 226, 226, when the magnet 227 is inactive and the gang of said switches, 225, 225, occupies its normal position, but which, when said magnet is energized and the position of said switches 225, 225, is shifted, makes connection each with the corresponding one of the contact-buttons, 226$^a$, 226$^a$. This arrangement has the advantage of clarity, in the diagrammatic view; and when the parts are arranged, adjusted and cared for with skill, may be satisfactory. But for ordinary use, I much prefer to make the switch members 226, 226, and 226$^a$, 226$^a$, in the form of springs, rather than as contact-buttons, and to make the switches 225, 225, in the form of pivoted flat springs, strips or rods, mounted as a gang, to play to and fro, under the influence of the magnet 227, so as to make connection either with the switch-springs 226, 226, which are connected with the matrix-releasing electro-magnets, 101, 101, of the one linotype, or else with the other switch-springs, 226$^a$, 226$^a$, which are similarly connected with the matrix-releasing electro-magnets 101, 101, of the other linotype.

One convenient arrangement of parts for this purpose, is clearly illustrated in Fig. 12 (and see also Figs. 12$^A$ and 17) in which the switches, 225, 225, arranged as flat-springs or strips, substantially stiffer than the springs 226 and 226$^a$, are mounted, as a gang, by means of the bar 251, to which said switch-springs 225, 225, are clamped, by the clamping-pieces, 251$^b$; pieces of insulating material, 251$^c$, 251$^c$, being inserted between said switch-springs 225 and the bar 251, on the one hand, and the clamping-pieces 251$^b$, on the other. Said switch-carrying bar, 251, is pivoted at 251$^a$, and is normally held by the contractile spring 251$^e$, in such a position that the switches, 225, 225, rest normally down upon the insulation-covered top of the rail 251$^f$; and in this position each of the said switch-springs, 225, 225, makes good electrical connection with the corresponding contact-spring 226, 226. But the armature 227$^a$ of the electro-magnet 227 before mentioned, is connected with the extension or arm, 251$^d$ of the rail 251; and when said magnet 227 is energized, by the closing of the switch 229, said armature draws down upon the arm 251$^d$, thereby rocking the switch-carrying bar 251 and throwing up the free ends of the switch-springs 225, 225, so that each will make good electrical connection with the corresponding contact-spring, 226$^a$, 226$^a$. And thus the electrical connections of the key-board 221 are changed, so that, instead of being connected with the one linotype, with which it was first connected, it is now connected with the other linotype. All this is so plain, from Figs. 12 and 17, in view of Figs. 1, 9 and 10 and the description before given that further description, it is thought is quite unnecessary.

15 is the space-bar, which is mounted on the arms 15$^b$, 15$^b$, of the rock-shaft 15$^a$, whose upward-extending arm, 15$^g$, acts, when said space-bar 15 is depressed by the operator, to press (through the insulating-piece 15$^p$, of hard-rubber or other suitable insulating material) the switch-spring 15$^h$, into electrical connection with the adjustable contact-screw 15$^i$, which is set in the rail 113$^b$, before described, and adjustable therein by means of a lock-nut, 15$^k$, thereby closing the circuit of the magnet 66, which operates the space-band-releasing escapement before described; see Fig. 6 and also Figs. 11, 12 and 13. Thus, the space-bar 15, when acted on by the operator, serves to release a space-band, so as to make the interverbal space, in the usual way.

My duplex key-board

In Figs. 9 and 11 of the drawings and in the description relating to them, I have described my invention, as applied to an ordinary or single-acting key-board, by which I mean a key-board with which the operator selects or sets the letters of a word, one letter at a time only (excepting the usual ligatures, as fi, fl, ff, ffi, ffl, æ and œ) which is the invariable mode of operating, now practiced. But I prefer to use, in the carrying out of my invention, a duplex key-board and so to arrange the dependent parts, that the operator is enabled, in general, to select the letters of a word, two letters at a time, excepting, of course, an odd letter, in words having an odd number of letters.

One arrangement of parts that is suitable for this purpose, is illustrated in Figs. 18, 19 and 20, of which Fig. 18 is a plan view of the key-board, in general similar to Fig. 11, but showing a duplex set of keys for the lower-case characters, or at least for a fair portion of them. Fig. 19 is a diagrammatic view, in general similar to Fig. 9, but showing electrical connections whereby, when the operator depresses two letter-keys simultaneously, one with the left hand and the other with the right hand, in order to make two consecutive letters of a word with a single action on his part, the operating of the magnet 101 that actuates the matrix-releasing device belonging to one of these simultaneously-depressed keys (preferably, though this is not a matter of any great importance, the right-hand-operated one) is delayed a fraction of a second, so as to enable the matrix which corresponds to the first, in order, in the line of the two simultaneously-selected letters, to get into position in the assembling elevator or into position on the matrix-conveying belt H, on the way to the assembling elevator, a sufficient fraction of a second or a sufficient distance in advance of the other matrix, released by the other key at the key-board, which is simultaneously depressed, so that these two matrices will stand in due order and position in the assembled line of matrices. Fig. 20, as before said, is a cross section through the mechanism of Fig. 18, to illustrate the operating of the frame 283, by the keys of the key-board.

The apparatus illustrated in Fig. 19 is in general similar to that illustrated in Fig. 9 and before described, but it differs from it in this, that while, with the apparatus of Fig. 9, if two of the keys, 2, 2, one belonging to the right-hand half and the other to the left-hand half of the key-board, should be depressed simultaneously, they would both close the circuits of their respective matrix-releasing magnets, 101, 101, simultaneously, and this would result in the releasing and assembling of the two matrices, corresponding to the keys thus simultaneously depressed, in an irregular, uncertain and improper manner. But the apparatus of Fig. 19 is contrived in such a manner that if two of the letter-keys 2, 2, one belonging to the left-hand half and the other to the right-hand half of the key-board, be depressed simultaneously, the mechanism controlled by one of these keys will act first, and then that controlled by the other will act, so that without conflict or uncertainty, the two matrices, corresponding to the two letter-keys thus simultaneously depressed, will be released and assembled in due order and succession. The particular details of construction for this purpose, as shown in Fig. 19 (but which may be varied within wide limits, without departing from the essentials of my invention) include the following:

(a) A bus-bar or connection 104$^a$, for the keys 2, 2, of one hand (the left-hand, in Fig. 19) which is normally in connection with the low-voltage direct-current source 104; this source may be a generator or a primary battery or a storage battery, or any other suitable source of direct current, but in most cases, I consider a low-voltage, direct-current dynamo to be preferable.

(b) A bus-bar or connection, 104$^d$, for the keys 2, 2, of the other hand (the right-hand, in Fig. 19) which is normally not in connection with the generator, 104;

(c) A device controlled by the keys of the left-hand, in Fig. 19 (though the arrangement may be reversed, if desired) which serves, when any of these keys is depressed to close the electrical connection from the keys of the other hand (through the bus-bar, 104$^d$, or otherwise) to the generator 104, a short fraction of a second after the depressing of the left-hand key (say, about one-tenth of a second, or a little more or less, as the operator may require); thus the two keys simultaneously depressed are made to act in due order and succession, first the left-hand key depressed, and then the right-hand key that is simultaneously depressed; but this particular order of acting may, of course, be reversed, if desired; that is, the right-hand-controlled matrix-releasing escapement may be arranged to act first, and the left-hand controlled matrix-releasing escapement thereafter, if so desired.

To insure the acting of the left-hand controlled and the right-hand controlled parts in due order, with the details of construction illustrated in Fig. 19, there is a switch 281, which is normally connected through the bus-bar 104$^a$ or otherwise, with one pole of the generator 104; and this switch serves, when brought into connection with its contact-screw or contact-button 281$^a$, to make connection through the exciting winding of the magnet 282 with the other pole of said generator 104, so that the magnet 282 becomes energized. Now with the details illustrated in Fig. 19, each of the keys or switches 2, 2, belonging to the left-hand set (that is, to the left-hand-controlled section of the key-board, Fig. 18) serves, when acted on by the operator, to give movement through the corresponding pin, 283$^a$, to the bar or frame 283 (a bar of insulating material, in the diagrammatic view, Fig. 19) and thus to give movement to the switch 281, so as to close circuit through the magnet 282. The magnet 282 thus becomes energized, attracts its armature 282ª, and gives movement to the armature-lever 284 (which is centered at 284ª, and is connected electrically, as shown in the drawing, with one pole of the generator 104, through the bus-bar 104ª) bringing said lever into contact with the contact-screw 284ᵇ, which is connected through the bus-bar or lead, 104ᵈ, with the keys or switches 2, 2, that belong to the right-hand set, Fig. 1; and see also, Fig. 18.

Thus, it will be seen, when two of the keys, 2, 2, one belonging to the right-hand set and the other belonging to the left-hand set (Figs. 18 and 19) are acted on simultaneously by the operator, one of these keys (the left-hand one in Fig. 19) instantly closes circuit from the positive pole of the generator 104, to the switch key, 2, that is acted on, and thence to the corresponding wire, 100, so energizing the corresponding magnet 101, and operating the corresponding matrix-releasing escapement; and after a sufficient time has elapsed for this action, the magnet 282, through the armature 282ª and the lever 284, closes circuit with the contact-screw 284ᵇ and bus-bar or lead wire 104ᵈ, and so excites the switch or key 2, that is acted on by the right-hand key depressed, closing circuit through that one of the wires 100 and magnets 101, which corresponds to such right-hand key, so that this magnet operates the corresponding matrix-releasing escapement, to release the appropriate matrix.

Thus, it will be seen, although two of the keys, 2, 2, one belonging to the right-hand set of keys and the other to the left-hand set of keys, Figs. 18 and 19, are depressed simultaneously, the matrices which these keys respectively control, are released in due order, the left-hand-controlled matrix first, and the right-hand controlled one in due order thereafter. But this order of acting, as before said, may be reversed, if desired, so that when two keys, 2, 2, are depressed simultaneously, one by the right hand and the other by the left hand, the matrix controlled by the right-hand key that is depressed will be released first, and the matrix controlled by the left-hand key that is simultaneously depressed, will be released in due order thereafter. This will be obvious.

284ᶜ is an adjusting screw, which serves to regulate the position of the armature 282ª, with relation to the magnet 282, and by adjusting this screw 284ᶜ and the stop-screw 284ᵇ, the magnitude of the movement of the armature-lever 284, the strength of the field in which it lies, before it begins to move, and the length of time which will elapse, between the closing of the circuit of the magnet 282, and the closing of circuit by the armature lever 284 with the contact-screw 284ᵇ and the bus-bar 104ᵈ, which feeds the right-hand controlled switches 2, 2, and matrix-releasing magnets 101, can be regulated, within certain limits. 284ᵈ is a contractile spring, for holding the armature-lever 284 in its normal position or returning it thereto, so soon as the magnet 282 loses its magnetism, on the breaking of the circuit between the switch 281 and the contact-screw 281ª, when the frame 283 is released, by the releasing of the keys depressed.

In the diagrammatic view, Fig. 19, the keys 2, 2, in order to illustrate the arrangement of the circuits more clearly and easly, are shown simply as pivoted switches. But, as already explained in connection with Figs. 12 to 17, and as illustrated, also, in Figs. 18, 20, 20ᴬ and 20ᴮ, I prefer to use key-levers 2, 2, to operate the spring-switches 113, 113. With the exact details of arrangement shown in the drawings, the key-levers 2, 2, have upward-extending arms, which act on the switch-springs, 113, 113, to close the circuits of the corresponding matrix-releasing magnets, 101, 101, whenever the corresponding key-levers 2, 2, are depressed by the operator. So, also, in the diagrammatic view, Fig. 19 (which has pivoted switches or keys 2, 2) the frame 283, which is itself controlled by the left-hand-operated keys, 2, 2, and which serves to close the circuit of the magnet 282, is shown in the form of a bar, 283, of insulating material, mounted to play back and forth and carrying a set of pins, 283ª, 283ª, one for each of the pivoted switches 2, 2, of the left-hand-operated set, by which pins (283ª, 283ª) the switches 2, 2, give movement to the frame 283. This arrangement of the parts in the drawing makes the arrangement of the circuits clear and easy to be understood, but for practical purposes, I prefer to use a frame 340, which has a fulcrum-rod or a center rod, 340ª, a cross-bar or cross-piece 340ᵇ, lying across and in the path of motion of the upward-extending arms of the key-levers 2, 2, of the left-hand-operated section of the key-board; arms 340ᶜ, 340ᶜ, by which the cross-bar 340ᵇ and the center-rod 340ª are connected; and an upward-extending arm 340ᵈᵈ which acts, when any of the left-hand operated keys 2, 2, is depressed, to press (through an insulating-piece, 340ᵉ) on the switch-spring 281, pressing this into contact and electrical connection with the adjustable contact-screw 281ª, which is set in the insulating-piece 281ᵉ, which is screwed fast to the rail 113ᵇ, in which the contact-screws 113ª, 113ª, before described, are set. The switch-spring 281 and its contact-screw, 281ª in Figs. 20 and 20ᴮ, are connected electrically in the manner fully and clearly shown in the diagrammatic view, Fig. 19 and before described.

When, therefore, any of the letter-keys 2, 2, of the left-hand-operated set (Figs. 18, 20, 20ᴬ and 20ᴮ) is depressed, its upward-extending arm acts on the cross-piece 340ᵇ of the frame 340, rocking said frame and through the extension 340$^{dd}$ of said frame acts on the switch 281, bringing it into contact and electrical connection with the adjustable contact-screw 281$^a$ and thereby closing the circuit of the magnet 282, which thereupon, by the means illustrated in Fig. 19 and before described (and see also Fig. 20$^A$) brings the electrical current on to the bus-bar 104$^d$, by which the switches (2. 2, in Fig. 19; 113, 113, in Figs. 20 and 20$^A$) that close the circuits of the right-hand-controlled matrix-releasing electromagnets, 101, 101, are fed.

From the description before given, it has been made clear that with the apparatus illustrated in Figs. 18 to 20$^B$, if two of the letter-keys, 2, 2, one belonging to the left-hand-operated portion of the key-board and the other belonging to the right-hand-operated portion of said key-board, are depressed simultaneously, the two matrices, which these two letter-keys respectively control, will be released in due order and succession; the matrix controlled by the left-hand-operated key, will be first released and then that controlled by the right-hand-operated key, and this will be so, even though the right-hand-operated key, which corresponds to the second matrix to be released, should be depressed a little earlier or a little later than the left-hand-controlled key, corresponding to the first of the two matrices. In any case, the two matrices will be released in due order and succession; excepting, always, double-letters, as ee, ll, ss, etc. These should be made singly, or else the depressing of the right-hand-operated key, corresponding to the second letter of the pair of double letters, should be delayed a little (say, about one-fifth of a second) so that time will elapse, sufficient for the matrix-releasing device to execute one complete cycle of its operations, before it is required to execute a second cycle, to free the second matrix.

Instead of using the frame 283 and the switch 281, 281$^a$, to control the circuit of the magnet 282, said frame 283 and the switch 281, 281$^a$, may be omitted and the magnet 282 be connected in series with the bus-bar 104$^a$, so that when any of the switches 2, 2, which is fed from said bus-bar, closes circuit through one of the matrix-releasing magnets, 101, 101, the current will also flow at the same time through the magnet 282. This modification is illustrated in Fig. 19$^A$, which is so clear and plain that no further description is necessary.

In Fig. 18, I show a full alphabet, lower-case, for the right-hand and also a full alphabet for the left-hand; and this I consider to be on the whole preferable, at least in a majority of cases; but a large amount of duplexing (that is, the setting of two letters, with a single impulse, on the part of the operator) can be effected with a fractional alphabet. If, for instance, we have a complete alphabet in either hand (say, for example, with Fig. 18, in the left hand) and a fractional alphabet of say fifteen, sixteen or seventeen letters in the other hand (say, for example, the vowels, a, e, i, o, u and y, and the frequently-occurring consonants b, c, d, h, l, m, n, p, r, s and t) it will be found that comparatively little has been lost; and with even half as many letters of the more-frequently-occurring sort (as, a, e, i, o, l, n, r, s and t) in the fractional set, a great gain in speed is effected. And even without duplicating or repeating any of the keys (by which I mean having a key for the same letter, both in the right-hand set and in the left-hand set) but using the principle before described, by which, when keys are put down by the two hands simultaneously, that put down with the one hand is made before that put down with the other hand (the idea of a leading-hand and a following-hand, in the effect produced, even though the two hands act simultaneously) and by assigning, for instance, the consonants to the leading-hand and the vowels to the following-hand, two letters can be made in a great many cases, with a single impulse. But while these and other similar variations are possible, and, indeed, quite practicable, yet I consider it, as before said, in general, preferable to furnish the key-board with a complete or nearly complete alphabet, lower-case for each hand.

Considering my duplex key-boards, Fig. 18 (in the light of Figs. 19, 19$^A$ and 19$^B$) and Fig. 27 (in the light of Figs. 28, 19, 19$^A$ and 19$^B$) it will be observed—

First. That in the apparatus of Fig. 18, one alphabet of keys is used in each hand only; and this alphabet of keys serves normally for lower-case letters, unless the shift-key 54 be depressed, in order to change the connections to the upper-case, as described hereinafter in detail, in connection with Figs. 34$^A$ to 34$^E$; and, Secondly, while it is, of course, possible, by the means before described, to duplicate in the two hands, the keys of an entire set (whether that be a single set, with a shifting connection for upper and lower-case, as illustrated, for example, in Fig. 18; or a double set, with individual keys, for the upper-case and the lower-case, as illustrated, for example, in Fig. 27) including in such entire set, with the letter-keys, the keys for the figures and the marks; yet for most practical purposes, I consider it sufficient to duplicate or repeat the letter-keys only, with, if desired, a few of the more-frequently occurring marks of punctuation (as, for example, the comma, period, apostrophe and hyphen, see Fig. 18) but without duplicating all the other marks and ordinarily, without duplicating the figure-keys, since the duplicating of these keys is of very little consequence, in setting ordinary reading matter. But for a machine which is to be used much in setting tabular matter, such, for example, as railroad time-tables, the keys for the figures might well be duplicated in the two hands. And with a double key-board (that is, keys for the lower-case and other keys for the upper-case) as illustrated, for example, in Fig. 27, I consider it ordinarily sufficient for practical purposes, to duplicate the keys for the lower-case letters, having one set of these for the left-hand and another set for the right-hand, without unduly increasing the size of the key-board, by duplicating, also, the keys for the upper-case letters so as to provide one alphabet of upper-case letters for the one hand, and another alphabet of such upper-case letters, for the other hand, also. This will be understood, on considering the drawings.

Also, it is to be understood, when considering Figs. 18 or 27 in connection with Figs. 19, 19$^A$ and 19$^B$, that, generally, speaking, it is only those keys which belong to the second or supplemental set—the keys which make up the slightly-delayed or slow-acting set, whose switches are connected with the bus-bar 104$^d$; and that the keys which are not thus repeated, including, in Fig. 18, the keys which serve for figures and marks (other than and excepting the duplicated punctuation marks, which are seen at the left of the key-board, in Fig. 18, serving for comma, period, and apostrophe) and in Fig. 27 these which serve, also, for the capital letters and for the ligatures—are connected with the bus-bar 104$^a$ (Figs. 19, 19$^A$ and 19$^B$) and not with the bus-bar 104$^d$.

Pneumatic connecting mechanism

Instead of using electro-magnetic mechanism to connect the key-board with one linotype or the other, so as to set the lines of type alternately, first on one linotype and then on the other (the first, third, fifth, etcetera, lines being set on one machine, and the second, fourth, sixth, etcetera, lines being set on the other machine) we may use pneumatic connections for this purpose. This construction is illustrated in Figs. 21 to 26; see also Fig. 36.

There is a valve-chest, referred to generally or in its entirety (as distinguished from its parts, which are severally marked) by the reference numeral 300. This valve-chest is provided with valves, 301$^a$, Fig. 22, which correspond to the matrices and matrix-releasing devices of the linotype; these valves are operated by the key-controlled electro-magnets, 101, 101, in Fig. 22; but they may be operated by the keys, 2, 2, directly, as illustrated, for example, in Fig. 22$^A$; or they may be operated by the keys 2, 2, in any other suitable manner.

Each of the valves, 301$^a$, controls a groove or channel, 300$^a$, in the valve-chest or wind-board 300; and all these grooves are connected, through ports 309$^g$, 309$^g$, that are controlled by a slider mechanism, and through pipes, 302 or 303, with pneumatic power-devices (which are hereinafter more shortly termed pneumatics) 304, each of the channels 300$^a$, with the pneumatic 304, corresponding to it; and these pneumatics, through the rods 192, operate the matrix-releasing escapements, F, f', f$^2$ of the one linotype machine or the other. The valve-mechanism is best seen in Fig. 22; the connections to the linotype are best seen in Fig. 21. One form of the slider mechanism, in which two sliders are used, is seen in Figs. 22 and 23; and another form, in which a single slider only is used, is seen in Fig. 24;

First considering the valve-chest 300 (for which see particularly Figs. 21, 22 and 26) this contains, preferably, a valve 301$^a$ for each of the matrix-releasing escapements of the linotype, of which there are usually ninety in a set. And for each of these valves, there is a valve-chamber or wind-groove 300$^a$, and the valve 301$^a$, serves to put the corresponding valve-chamber 300$^a$, into communication either with the wind-chest 305 or with the external air. The wind-chest 305 is connected by the pipe 306, with a bellows or pump, preferably, an exhaust bellows. The bottom of the wind-chest is marked 300$^b$, the top is marked 300$^c$, the front-bar 300$^d$, the back-bar 300$^e$. The partitions which separate one valve from another are marked 300$^f$. The valve-stem is marked 301 and the disk or valve 301$^a$. In its normal position, in which it is held by the expansive spring 301$^d$, the valve 301$^a$ closes the part 301$^b$, by which the valve-chamber 300$^a$ communicates with the wind-chest 305 and leaves the port 301$^c$ that communicates with the external air, open. With the details of construction illustrated in Fig. 22, a small electro-magnet, 101, controlled by the appropriate key 2 at the key-board, as before described, controls the valve-stem 301 and valve 301$^a$. Or the keys 2, 2, at the key-board may operate the corresponding-valve-stems 301, 301, and valves 301$^a$, 301$^a$, in any other manner whatever that is suitable for the purpose.

The magnet 101, Fig. 22, when energized, by the closing of its circuit, by the depressing of the corresponding one of the keys 2, 2, at the key-board, attracts its armature 101$^b$; and this through the armature-lever 307, which is centered at 307$^a$, gives movement to the valve-stem 301 and to the valve 301$^a$, thereby opening the port 301$^b$, by which the valve-chamber or wind-groove 300$^a$ communicates with the wind-chest 305 and at the same time closing the port 301$^c$, by which the valve-chamber 300$^a$ communicates with the external atmosphere.

Each of the valve-chambers 300$^a$ communicates with one of the tubes 302 leading to the one linotype, and with one of the tubes 303, leading to the other linotype; see Figs. 21 and 22; also Fig. 22^A; but in the proper operation of the device it communicates with only one of these tubes (302 and 303) at any one time; and it communicates with the one or the other, according to the position of the slider 308 (Fig. 24) or of the two sliders, 308 and 308$^a$; Figs. 22 and 23.

Describing first the two-slider construction of Figs. 22, 23 and 25, there is a row of ports 300$^g$, in the top of the valve-chest 300$^c$ and a row of similar ports in the bottom of the valve-chest 300$^b$. The row of ports in the bottom of the valve-chest is controlled by the slider 308 and the similar row of ports in the top of the valve-chest is controlled by the similar slider 308$^a$. Below the slider 308 is a cover-board 309, having ports 309$^a$ which register with the ports 300$^g$ in the lower board 300$^b$ of the wind-chest; and above the upper slider 308$^a$ is a similar cover-board 309, containing ports 309$^a$, which also register with the similar ports 300$^g$ in the upper board 300$^c$ of the valve-chest. The pipes 302 are connected, at one end, with the ports 309$^a$, in the upper cover-board 309; and at the other end, said pipes 302 connect with the power pneumatics 304, Fig. 21, that operate the matrix-releasing escapements F, $f'$, $f^2$ of the one linotype. But the pipes 303 are connected at one end, with the ports 309$^a$ in the lower cover-board 309; and at their other ends, said pipes are connected with the power pneumatics, 304, that operate the matrix-releasing escapements of the other linotype, Fig. 21. The slider 308 contains a set of holes, 308$^b$, to register with the ports 300$^g$ in the lower board 300$^b$ of the wind-chest and with the ports 309$^a$ in the lower cover-board 309, so that when said slider 308 is in the right position, each of the ports 300$^g$ in the lower board 300$^b$ of the wind-chest registers and makes connection pneumatically with the corresponding ports 309$^a$ in the lower cover-board and with the pipe 303 that connects with such port. And in like manner, the slider 308$^a$ contains a similar set of holes 308$^b$, which, when said slider is in the right position, register with the corresponding ports 300$^g$ in the upper board of the wind-chest and with the similar ports 309$^a$ in the upper cover-board 309, so that each of the ports 300$^g$ in the upper board of the wind-chest, communicates pneumatically with the corresponding ports 309$^a$ in the upper cover-board and with the pipe 302 that connects with said port; and through said pipe with the corresponding power bellows 304. Thus, by putting one of the sliders, 308 and 308$^a$, into a correct position, so that its holes (308$^b$, in Fig. 25) register with the corresponding ports, 300$^g$ and 309$^a$, Figs. 22 and 23 and placing the other slider at the same time in a position in which its ports do not register with the corresponding ports 300$^g$ and 309$^a$, the valve-chest 300 is put into operative connection with one or the other of the two linotypes, shown in Fig. 21; so that when one of the valves 301$^a$ is operated by the electro-magnet 101 (in Fig. 22) or by the key-board key 2, directly (as in Fig. 22$^A$) the corresponding power pneumatic 304 is, by the action of the valve 301$^a$, brought into communication with the vacuum chest 305; the air escapes from said power pneumatic into the vacuous wind-chest 305, and said power pneumatic 304 closes under the influence of the superior pressure of the external air on its movable walls; and thus, as it closes it gives movement through the rod 192, to the corresponding matrix-releasing escapement F, $f'$, $f^2$. And so with the other valves 301$^a$, 301$^a$ corresponding to the other keys at the key-board and to the other letters of the alphabet; each of these serves, when operated by the appropriate key 2, at the key-board (whether so operated directly, Fig. 22$^A$, or through an electro-magnet, as in Fig. 22) to operate the corresponding one of the power pneumatics 304, rods 192 and matrix-releasing escapements, F, $f'$, $f^2$.

But if, now, the positions of the sliders 308 and 308$^a$ be changed, then the valve-chambers 300$^a$ are cut off from communication with the pipes (303 or 302) the power-bellows 304, and the linotype with which they were connected and are brought into operative relation with the other set of pipes (302 or 303) and the power bellows 304 and linotype connected therewith.

The sliders 308 and 308$^a$ may be controlled in any suitable manner, as for instance, by the hand directly, or by power; but with the details of construction illustrated in Fig. 23, there is a rock-shaft 310, to opposite arms of which, 310$^a$ and 310$^b$, the sliders 308 and 308$^a$ are connected, by the rods, 311, 311; and there is an electro-magnet 227, having an armature 227$^a$, which is connected by a link 227$^b$, with another arm 310$^c$ of the rock-shaft 310 aforesaid. A contractile spring 313 holds the rock-arm 310$^c$ normally in contact with the stop-rod 310$^d$, in such a position that the slider 308 registers with the corresponding ports 300$^g$ and 309$^a$, while the slider 308$^a$ closes the ports 300$^g$ and 309$^a$, controlled by it. But when the circuit of the magnet 227 and battery B′ is closed, by the switch or key 229 (which is preferably located at the key-board) coming into contact with the other switch-member 229$^a$, the magnet 227, becoming energized, attracts its armature 227$^a$; and this gives movement through the rock-arm 310$^c$, to the rock-shaft 310; and this, in turn, through the rock-arms 310$^a$ and 310$^b$ and the links 311, 311, gives movement to the sliders 308 and 308$^a$, closing the ports 300$^g$ and 309$^a$, that are controlled by the slider 308 and bringing the similar ports 300$^g$ and 309$^a$ that are controlled by the slider 308$^a$ into communication with the valve-chambers 300ᵃ, 300ᵃ, of the valve-chest 300.

Thus, by manipulating the key or switch 229 at the key-board or by throwing the rock-shaft 310, by giving movement to it through a handle thereon, or in any other suitable manner, the position of the sliders 308 and 308ᵃ can be reversed, so that the one registers with the ports 300ᵍ and 309ᵃ, controlled by it and the other does not so register; and by changing this relation, from time to time, as required, the key-board that controls the valves 301ᵃ, 301ᵃ (directly, as in Fig. 22ᴬ, or through electro-magnets, as in Fig. 22, or in any other suitable manner) is connected with the two linotypes before mentioned alternately, so that alternate slugs are set on the two linotypes, the first, third, fifth, etcetera slugs being set on the one linotype, and the second, fourth, sixth, etcetera, slugs being set on the other linotype, and so on, alternating between the two machines;

In Fig. 24, only one slider 308 is used, and each of the wind-grooves or valve-chambers 300ᵃ, 300ᵃ, communicates through a port 300ʰ, which is of small diameter, where it connects with the wind-groove 300ᵃ and of larger diameter, where it opens on the slider 308 (or where it is covered by said slider) with some one of the two ports 309ᵇ and 309ᶜ, in the cover-board 309 of the wind-chest, according to the position of the slider 308; and each of the holes 308ᵇ in the slider 308, serves, while in communication with the port 300ʰ, to communicate with the one or the other of the ports 309ᵇ and 309ᶜ, according to the position in which said slider is set. Now, the ports 309ᵇ, Fig. 24, communicate by the pipes 302, with the power pneumatics 304 that control the one linotype and the ports 309, communicate by the similar pipes 303, with the power pneumatics, 304, which control the other linotype. And by changing the position of the slider 308, either by manipulating it mechanically or by manipulating it through the switch 229 and electro-magnet 227, the wind-grooves 300ᵃ, 300ᵃ, Fig. 24, controlled by the valves 301ᵃ, 301ᵃ (Fig. 22 or 22ᴬ) respectively, are made to control the one linotype or the other; and the connection of the valves 301ᵃ, 301ᵃ, with the one linotype or the other is changed alternately, as successive lines are set, so as to set the first, third, fifth, etcetera lines on the one linotype, and the second, fourth, sixth, etcetera lines on the other, as before explained.

The apparatus shown in Fig. 10 for controlling conveniently from the key-board, the switch 229, by which the keys of the key-board are connected with the matrix-releasing devices of the one linotype or the other, as required, and for controlling at the same time, the matrix-elevator, I, I (or assembling-elevator, or assembling-block, as it is variously termed) of the linotype on which a line has just been set, may be used also, and, if desired, without substantial change, with the apparatus illustrated in Figs. 21 to 26. Or a power-bellows or other pneumatic power-device may be used, in place of the magnet 235, Fig. 10, to operate the matrix-elevator or assembling elevator I, that is, to lift said assembling elevator I and the line of matrices assembled therein, at the end of the line, so as to put said matrices in a course of transmission to the mould, in which the slug is cast; or movement may be given to the assembling elevator, I, of each of the two linotypes (which are controlled from the same key-board) by two large keys or handles, one for each of the linotypes; said keys or handles being preferably located at, or in proximity to the key-board and connected each mechanically through a rock-shaft, rock-arms and links (as is commonly done now) or in any other suitable manner whatever with the assembling elevator of the appropriate linotype, so that the key-board operator, by acting on the appropriate handle at his key-board, lifts the assembling elevator of the appropriate linotype, so soon as a line of matrices is assembled therein, thereby to set said matrices in a course of motion towards the mould, at which the slug is to be cast.

*Key-board for operating two linotypes, having two sets of keys, each set of keys being permanently connected with the corresponding one of the two linotypes aforesaid*

I have stated above that for the purpose of enabling the operator to operate two linotypes (making, in effect, a duplex linotype) setting the first, third, fifth, etcetera lines on the one linotype and the second, fourth, sixth, etcetera lines on the other linotype, the key-board 221 (which is seen in Figs. 1 and 2) may either—

(*i*) Have two sets of keys, one connected to control one linotype 220, and the other to control the other of said linotypes (Figs. 1 and 2) in which case the keys of each of said sets are permanently connected with the linotype corresponding to such set, and the operator sets one line of type on one of said linotypes and the next line of type on the other of said linotypes; and so on alternately; setting the first, third, fifth, etcetera lines by operating on one set of keys and the second, fourth, sixth, etcetera lines by operating on the other set of keys, belonging to the same key-board; see, for example, Figs. 27 and 28; or (*ii*) Preferably, as before stated, and in order to make it more convenient for the operator, a single set of keys is used and changeable connections (preferably, changeable electrical connections or changeable pneumatic connections, as hereinafter described) are employed, by which, at the end of each line he shifts his control from the one linotype to the other.

The arrangement mentioned in (ii) above, with shifting connections or changeable connections, is illustrated in the drawings and has been fully described, and it is the one that I consider to be, on the whole, the most satisfactory. But the other arrangement above mentioned, in which the key-board, 221, has two sets of keys and in which the keys of each of said sets are permanently connected with a linotype corresponding to such set, is also simple and practicable. The two sets of keys, controlling the two linotypes, may be arranged in any convenient manner. One arrangement that is suitable for the purpose is illustrated in Figs. 27 and 28. In this apparatus, the keys of the one set are placed above and inside the keys of the other set. The keys of the upper or inner set are conveniently formed with the rear portion turned upwards, back of their fulcrums, as in Fig. 12, before described, to operate the switches 113, 113 (Fig. 28) while the keys of the lower or outer set are extended backward, to operate their similar switches, 113. Thus the key-controlled switches 113, 113, belonging to the two sets of keys, are located a convenient distance apart, leaving more room for the spring switches, 113, 113, the contact-screws $113^a$, $113^a$, etcetera. The key-operated circuit-closing frame 283, which is operated by the keys of the quick-acting sub-set in each of these two complete sets of keys and which serves, in turn, to close the circuit of the timing magnet 282 (see particularly Figs. 19 and 20) is preferably, in the form of apparatus illustrated by Figs. 27 and 28, arranged vertically for one of the two sets of keys (controlling the one linotype) and horizontally for the other set of keys, which controls the other linotype.

With the arrangement of parts illustrated in Figs. 27 and 28, the keys control the magnets 101, 101, and these in turn control the matrix-releasing escapements of the two linotypes. The space-bar 15, in each set of keys (Figs. 27 and 28) controls the circuit of the magnet 66 (Fig. 6) as before described, so operating the space-band releasing device of the linotype to which it belongs. Finally, the assembling elevator I (or matrix-elevator or assembling-block, as Mergenthaler termed it) on each of the two linotypes, controlled by the one key-board, may be controlled by the keys 231 and $231^a$, as illustrated and before fully described in connection with Fig. 10; or said assembling elevators may be controlled from the key-board of Figs. 27 and 28 through a pneumatic power-device, as before described; or the assembling elevator of each of the two linotypes may be operated by an appropriate handle at the key-board in the fashion which is now common and well known, and, indeed, universally used in the art; or said assembling elevator may be controlled in any other manner whatever that is suitable for the purpose.

With the exact details of construction which are illustrated in Figs. 27 and 28, the two sets of keys for controlling two linotypes, are placed one above and behind the other, which is the construction that I consider to be, on the whole, the most satisfactory to the operator. But the two sets of keys may be placed in any other relative position that is satisfactory, for example, they may be placed upon the same level and arranged side by side, as shown in Fig. $28^A$. Each of the two sets of keys belonging to the apparatus of Fig. $28^A$, as shown in the drawing, is like the set shown in Fig. 11 and before described, whose preferred details of construction are illustrated by Figs. 12 to 17 inclusive. But so far as the feature of arranging the two sets of keys belonging to one key-board, side by side of one another, as shown in Fig. $28^A$ the duplex set of keys illustrated in Fig. 18, or that illustrated in Figs. 27 or 39, may be used; or any other arrangement of keys whatever that is suitable for the purpose, may be used in each set— whether the two sets of keys be disposed as in Fig. 27 or as in Fig. $28^A$.

*Shiftable mechanical connections, whereby the keys of the key-board are connected with the matrix-releasing devices of two linotypes, alternately*

Instead of the electrical connections before described, or the pneumatic connections before described, by which the key-board 221 is connected with the two linotypes, 220, 200, alternately, mechanical connections may be used for this purpose. But I consider the electrical connections to be, on the whole, preferable, in the majority of cases. And where electricity is lacking there, I consider pneumatic connections to be, on the whole, more satisfactory. Mechanical connections, however, may be used, as before said, for example, a set of rock-shafts, corresponding to the matrix-releasing escapements of the linotype, and each having three rock-arms, one operated by the appropriate key at the key-board (through the key-controlled magnet 101, or by the key mechanically; the other two arms of such rock-shaft being connected, one to operate the appropriate matrix-releasing escapement F, $f'$, $f^2$ of one of the linotypes, and the other of said arms being connected to operate the corresponding matrix-releasing escapement F, $f'$, $f^2$ of the other linotype; the connection from the rock-arms to the matrix-releasing escapements being effected in each case through a break-down connection, as, for example—

(a) A gang of pins for each linotype, one of such gangs of pins only being in operative relation at any given time to its linotype and the one gang being thrown out of operative relation as the other is thrown into operative relation; and this reversing operation being made at the end of each line, so that alternate lines of type will be set on the two linotypes respectively; or (b) A gang of latches or connecting pieces, pivoted at one end to the rock-arms or to levers actuated by the rock-arms of the rock-shafts aforesaid, and said connecting-pieces being thrown into or out of engagement with the matrix-releasing escapements F, $f'$, $f^2$, as required; those for one linotype being in operative relation when those for the other linotype are out of operative relation, and the one being thrown into operative relation as the other is thrown out; or (c) A set of levers, interposed between the rock-arms of the rock-shafts before mentioned and the matrix-releasing escapements with connections to each (that is, each such lever having a connection to the rock-arm of the appropriate rock-shaft, and another connection to the appropriate one of the matrix-releasing escapements) the two gangs of such levers, one gang for each linotype, being mounted with movable fulcrums, by movement of which (fulcrums) the levers are brought into operative or inoperative relation to the matrix-releasing escapements, so as to transmit movement from the rock-shafts to the escapements; the levers of one set, serving for one linotype, being thrown into operative relation, while the levers of the other set, serving for the other linotype, are thrown out of operative relation; and so on alternately, at the end of each line, so that the two linotypes are connected alternately with the rock-shafts and the controlling key-board; so that the first, third, fifth, etcetera lines of type are set on the one linotype and the second, fourth, sixth, etcetera lines are set on the other linotype.

These modifications are illustrated in Figs. 29, 30, 30$^A$, 31 31$^A$, 32, 32$^A$ and 33, of which—

Fig. 29 is a rear elevation, showing the rock-shafts before mentioned, placed at the rear of the two linotypes. This view is, in part, diagrammatic; by reason of the smallness of the sheet, a portion only of the rock-shafts are shown, but it is to be understood that with the usual machines, now in general use, about ninety rock-shafts would be required, to operate the ninety matrix-releasing devices of the machine, corresponding to the ninety keys at the key-board; and the magnets 101 each occupies, in the diagrammatic view, Fig. 29, a larger space with relation to the other parts, than would be practicable, in a working machine;

Fig. 30 is a sectional view in elevation, in part broken away and somewhat diagrammatic, in a plane at a right angle to the plane of Fig. 29, showing the rock-shafts, connected to operate the matrix-releasing devices, through shifting-pins;

Fig. 30$^A$ is a detail, an elevation, largely broken away, showing the shifting pins and the frame in which they are mounted, belonging to the device illustrated in Fig. 30;

Fig. 31 is a view in general similar to Fig. 30, but with the lower portion of the figure broken away, showing a modified construction, in which latches or pivoted push-pieces are used, instead of the shifting pins, belonging to the construction, illustrated in Fig. 30;

Fig. 31$^A$ is a detail view in elevation, at a right-angle to the plane of Fig. 31, showing the milled rocking-bar 417, to which the links 416$^a$, 416$^a$, are connected, by which the latches 416, 416, seen in Fig. 31, are shifted, as a set or gang, when required;

Fig. 32 is also a view, in general similar to Fig. 30, but with the lower portion of the figure broken away, showing another modified construction, in which a shiftable-fulcrum arrangement of the levers 412, 412, is used instead of the shifting-pins 413, 413, of Figs. 30 and 30$^A$, or the shifting latches 416 belonging to Figs. 31 and 31$^A$;

Fig. 32$^A$ is a detail view, in plan, and largely broken away, showing a portion of the frames, by which the fulcrums of the levers 412, 412, Fig. 32, are shifted, so as to bring them into operative relation to, or take them away from operative relation with, the corresponding matrix-releasing escapement-levers F, F; and, Fig. 33 is a detail, a plan view, of one of the rock-shafts, 410, which are seen in Figs. 29, 30, 31 and 32 and of which ninety would be used, in an ordinary linotype, to operate its ninety matrix-releasing escapements.

410, 410, are the rock-shafts, each having an arm 410$^a$, through which it receives movement from the corresponding magnet, 101, controlled by the key, at the key-board, for which such rock-shaft serves. Or said rock-shaft may receive movement from the key itself, transmitted mechanically, and without the aid of any sort of magnet or power device.

410$^b$, 410$^b$, are the other arms on said rock-shaft, through which it communicates movement to the matrix-releasing escapements respectively of the two linotypes, with which it is connected.

The armature 101$^a$ of the magnet 101, is connected by a link, 101$^d$ with a lever 402, corresponding to such magnet; and this lever 402, is fulcrumed on the rod 402$^a$, which is set in the milled bar 402$^b$. There are two of these milled bars, as the drawing shows. The levers 402, 402, are connected each by a link 403 with the arm 410$^a$ of the corresponding rock-shaft 410; and the arms, 410$^b$, 410$^b$ of said rock-shaft (corresponding to the two linotypes, respectively) are connected each by a link 411, with the corresponding lever 412.

These levers, 412, are each controlled by one of the keys at the key-board, through the corresponding rock-shaft 410 and serve, in turn, each to operate the matrix-releasing escapement F, $f'$, $f^2$, corresponding to such key. The levers 412, 412, are fulcrumed or centered on the rod $412^a$, which is set in the milled-bar $412^b$.

When any of the keys 2, 2, at the key-board is depressed, it closes the circuit of the corresponding magnet 101, as before described, and this magnet gives movement through the parts before described, to the two levers 412, 412, one belonging to the one linotype and the other belonging to the other linotype, throwing up the inner end of said lever 412, 412, in Figs. 30, 31 and 32; and this lever thereupon gives movement through one of the pins 413, 413 (Figs. 30 and $30^A$) to the corresponding matrix-releasing lever F and to the pawls $f'$ and $f^2$, thus releasing a matrix.

The pins 413, 413, are mounted in the frame 414, which is itself mounted on the rod $414^a$; and this rod is mounted by means of hardened points or pointed screws $414^b$, set in the standard or frame-work $414^c$, and made adjustable therein by the lock-nut $414^d$ (Fig. $30^A$). Each of the pins 413 has a small disk or collar $413^a$ attached fast to it, and a light expansive spring $413^b$ presses this disk down upon the lower wall or member of the frame 414, as clearly illustrated in Fig. $30^A$.

Each of the two pin-carrying frames 414, 414, (one belonging to the one linotype and the other to the other linotype and of which frames only one is seen in the drawing, Figs. 30 and $30^A$) is connected to one of the arms $415^a$ or $415^b$ of the shifting rock-shaft 415, by the link 418; and these connections are made in opposite senses; that is, the arms $415^a$ and $415^b$ respectively, are on opposite sides of the shifting rock-shaft 415 so that when said rock-shaft rocks, it moves the pin-carrying frames 414, 414, aforesaid, belonging to the two linotypes respectively, in opposite directions, and the arrangement of the parts is such that when the pins 413, 413, in the one frame 414, lie over the ends of the corresponding levers 412, 412, so as to receive movement from them, the similar pins 413, 413, in the other one of the frames 414, lie away from (that is, not directly over) the ends of their levers 412, 412; the result of which is that when a key is depressed at the key-board and the corresponding rock-shaft 410 and lever 412 are vibrated, one of the levers 412, corresponding to one of the two linotypes, gives movement through the corresponding pin 413, to the corresponding matrix-releasing escapement F, $f'$, $f^2$; but the other one of said levers 412, corresponding to the other one of the two linotypes, does not give movement to the matrix-releasing device F, $f'$, $f^2$ corresponding to it.

The shifting-rod 415 is held in the one position, so as to connect the rock-shafts 410 and levers 412, through the pins 413, 413, with the one linotype, and with that linotype only, by the contractile spring $415^c$. But when said shifting-rod 415 is shifted, by the action of the shifting magnet 227 (controlled by the switch 229, as before described) or in any other suitable manner, it throws the pins 413, 413, of the one set, which were in operative relation to the levers 412, 412, out of such operative relation; and at the same time throws the similar pins 413, 413 of the other set (carried by the other one of the two frames 414) and which were formerly not in operative relation with the matrix-releasing levers, F, F, into operative relation with them. And so, each time the circuit of the shifting magnet 227 is made or broken, that linotype which was in operative relation to the key-board, is disconnected therefrom; and the other linotype which was not in operative relation to the key-board, is brought into operative relation to it.

In the modified construction, which is illustrated by Figs. 31 and $31^A$, the pins 413, 413, are dispensed with and latches 416, 416, are used, which are pivoted to the levers 412, 412, and controlled through the links $416^a$, $416^a$, which are each pin-jointed at $416^b$ to the corresponding latch 416, and are connected, through the rod $417^a$, with the milled rocking-bar 417, which is mounted to oscillate, on hardened pins, or pointed screws, $414^b$, as before described in connection with the pin-carrying frames, 414, 414; and the milled rocking-bar 417 is connected through a link 418, with one of the arms ($415^a$ or $415^b$) of the shifting rock-shaft 415, as before described in connection with the pin-carrying frames 414, 414; in this case, also, as will be obvious from the description before given, when one set of the latches 416, corresponding to one of the two linotypes and controlled by one of the two milled rocking-bars 417, is in operative relation to the corresponding matrix-releasing devices, F, $f'$, $f^2$, the other set of said latches, corresponding to the other one of said two linotypes, is not in operative relation with the matrix-releasing devices F, $f'$, $f^2$, of such second linotype; but when the shifting-rod 415 is shifted (by making or breaking the circuit of the shifting magnet, 227, or in any other suitable manner) that one of the two sets of latches, 416, 416, which was in operative relation to the matrix-releasing devices of its linotype, goes out of operative relation with them; and the other one of said two sets of latches, 416, 416, which was not in operative relation with the matrix-releasing devices of its linotype, comes into operative relation with them.

In the other modification, illustrated by Figs. 32 and $32^A$, the milled-bar 417 is dispensed with, as well as the shifting-pins 413, 413; but the milled-bar $412^b$ and the fulcrum rod 412$^a$, by which the levers 412, 412, are mounted, are made to be vertically-movable; and for this purpose, said milled bar 412$^b$ is attached to the arms 419$^a$, 419$^a$, of the rock-shaft 419; and the two rock-shafts 419, 419, corresponding to the two linotypes, respectively, are connected in opposite senses to the arms 415$^a$ and 415$^b$ of the shifting rock-shaft 415, as before described, in connection with the pin-carrying frames 414, 414; the result of which is that the levers 412, 412, of the one set, corresponding to the one linotype, are in operative relation to the matrix-releasing devices of such linotype (the levers F and pawls $f'$, $f^2$) and at the same time, the similar levers 412, 412, of the other set, corresponding to the other one of the two linotypes, are not in operative relation to the matrix-releasing devices to which they correspond; and when the rocking-lever 415 is rocked from one of its positions to the other (by making or breaking the circuit of the shifting magnet 227, or in any other suitable manner) that one of the two sets of push-rods, 416, 416, (Figs. 32 and 32$^A$) which stood up, in operative relation, ready to act on the corresponding matrix-releasing levers F, F, is moved down out of and away from, such operative relation; and the other set of said push-rods 416, 416, corresponding to the other one of the two linotypes, which was not in operative relation to the corresponding matrix-releasing levers F, F (standing down, too low to act upon them) comes up into operative relation with them. And so, each time the shifting-rock-shaft 415 changes its position, the connection between the key-board and the linotypes is shifted from the one linotype to the other, as already described in connection with the devices illustrated in Figs. 1 and 10, 30 and 30$^A$ and 31 and 31$^A$.

*Case-shifting mechanism for the linotype*

In linotype machines and other type-setting machines, it is usual to employ a large key-board, having a key for each character, whether upper-case or lower-case, usually ninety keys, in the linotypes in common use. And in Figs. 11 and 35, I show such a key-board; and also in my duplex key-board, as illustrated in Figs. 27 and 39, there is a key for each character, upper-case and lower-case, in the principal or quick-acting set of keys and also a key for each of the lower-case characters, in the supplemental or slow-acting set of keys. But while it is usual to have independent upper-case and lower-case sets of keys, it is not necessary to have such independent keys, for a single set of keys may be made to serve both for the upper-case and for the lower-case letters, if a suitable case-shifting mechanism be provided. This is commonly done in type-writing machines and it may be done in linotype machines, but in a different manner. In a non-duplex key-board, I prefer to have distinct keys for the upper-case and the lower-case letters, but in a duplex key-board, there are advantages in using the same keys for upper-case and lower-case, with a suitable case-shifting mechanism. One form of apparatus for this purpose is illustrated in Figs. 18, 34$^A$, 34$^B$, 34$^C$, 34$^D$ and 34$^E$, which, in the light of the description of these figures before given and of the description before given of the various parts which are seen in these figures, needs little or no verbal description here. It will be sufficient to say that a set of case-shifting switches, 249, 249 is provided and these switches, 249, 249, are inserted between the switches 2, 2 (or 113, 113) and the matrix-releasing electro-magnets 101, 101; and these switches 249, 249, when in one position, make contact and electrical connection with the switch-members 249$^c$, 249$^c$, which are connected with the matrix-releasing electro-magnets 101, 101, that operate the escapements, F, $f'$, $f^2$, which release the lower-case matrices; but when the switches 249, 249 are thrown into contact with the other switch-members 249$^d$, 249$^d$, said switches then connect with the electro-magnets 101, 101, which operate the escapements F, $f'$, $f^2$, that release upper-case matrices.

Preferably, a magnet 248 is provided to operate the case-shifting switches 249, 249, before mentioned. This case-shifting magnet 248, is itself operated from the key-board by one of the shift-keys 54, 54 (Figs. 18 and 34$^c$) when it is desired to set a single upper-case matrix only, as at the commencement of a sentence or of a proper noun; but when it is desired to set a heading or a sentence in capital letters, then the key 231$^a$, is depressed (Fig. 34$^D$) to close the circuit of the case-shifting magnet 248; and in this case, the frictional brake 232, acting on the segment 230, holds the circuit closed (that is, keeps the switch 252 in contact and electrical connection with its adjustable contact-screw 252$^a$) until the operator wishes to change back to lower-case, whereupon he depresses the key 231, which restores the segment 230 to its normal position, thereby releasing the spring-switch 252 and opening the circuit of the case-shifting magnet 248, whereupon the case-shifting switches 249, 249, return to their normal or lower-case positions.

In the diagrammatic views, Figs. 34$^A$, 34$^B$, 34$^C$ and 34$^D$, the case-shifting switches 249, 249, are shown as pivoted switches, playing between the contact-buttons 249$^c$ and 249$^d$; for thus the arrangement of the electrical circuits is more clearly shown. But practically, I prefer to use switch-springs, or metal strips, for the switches 249, 249, and for the switch-members 249$^c$, 249$^d$, as shown in Fig. 34$^E$. This is the same arrangement of parts already described for the switches 225, 225, and their co-operating switch-members, 226 and 226ª, and which is illustrated in Figs. 12 and 17.

*On the manner of applying my invention to other type-setting machines than the linotype*

I have described my invention hereinbefore with reference to the linotype machine, which, in its various forms and under various trade names (as Mergenthaler linotype, intertype, linograph, Stringertype, Grantype, etcetera) is in very general use in the printing world. My preferred means for connecting my key-board with the linotype, it will be remembered, is by electro-magnets, as 101, 101, which are controlled by the keys of my key-board and are connected to operate the matrix-releasing devices of the linotype, either directly, as in Fig. 3, or preferably, through the keys of the linotype and the usual cam-action, as illustrated, for example, in Figs. 4, 5 and 5ᴬ; or through the levers 440, the key bars 4, and the cam-action, as illustrated in Fig. 36ᴬ; and by connecting the space-key 15 through an electro-magnet (as 66) to operate the space-band-releasing device of the linotype; and also, preferably, by using a larger electro-magnet 235 or other suitable power-device, controlled from the key-board, to operate the assembling-elevator I, so as to send up the line of matrices, after it has been assembled; and with the modified apparatus, illustrated in Figs. 21 to 26, inclusive, and 36, before described, pneumatic power-devices (marked 304) are used instead of the electro-magnets 101, 101, 66 and 235 of the preferred construction; and with the forms of mechanism illustrated in Figs. 29 to 33 inclusive and before described, direct mechanical connections may be used; although I consider the electro-magnets, or in the second place, the pneumatic power devices 304, 304, preferable, on the whole, to the direct mechanical connections.

Now, my invention may be applied, in substantially the same manner, to any other type-setting machine which is of such a character that it is desirable to operate two of them (or more than two) from the same key-board (as 221). In any such case, my electro magnets 101, 101 (or my power-pneumatics, 304, 304) may be connected to operate the type-delivering devices or other essential parts of the machine which the keys at its key-board control, either—

(*a*) Directly, after the general plan shown for the linotype, in Figs. 3, 21, 36 and 36ᴬ; or (*b*) The electro-magnets 101, 101 (or the power pneumatics, 304, 304) may be connected to operate the keys of the key-board of the type-setting machine, of which two or more are to be controlled from my key-board 221, after the general fashion which is illustrated for the linotype, in Figs. 4, 5 and 5ᴬ; or (*c*) The connections from the keys of my key-board 221, to the type-delivering devices of the type-setting machines, which are controlled from said key-board 221, may be made in any other way whatever that is suitable for the purpose.

And so, the space-delivering devices of the type-setting machines which are controlled from my key-board 221, may be operated by my electro-magnets 66; or, with the pneumatic mechanism, illustrated in Figs. 21 to 26 and Fig. 36, by the power-pneumatics, 304; or in any other suitable manner; and, finally, the line-delivering devices of the type-setting machines, which are controlled from my key-board 221, may be operated by the electro-magnets, 235, 235, or by the power-pneumatics 304, 304; or they may be operated in any other way whatever that is suitable for the purpose.

*Part two*

The keys of my key-board 221 may be arranged, if desired, in the same order in which linotype keys are now arranged, in the linotype machines in common use, as illustrated in Fig. 35; and this would save the operator from having to learn a new key-board. But I prefer, in most cases, to use a better key-board than the present linotype key-board, as, for example, that illustrated in Fig. 11, or preferably still a duplex key-board, as illustrated, for example, in Figs. 18 and 27, but any other duplex key-board that is suitable for the purpose may be used, instead of those illustrated in the drawings. And here I may say that the linotype key-board, as the same exists in the Mergenthaler machine, the intertype machine, the linograph and all the other linotypes with which I am acquainted, is emphatically a bad key-board in this, that the frequently-occuring characters are severely congested at the extreme left of the key-board, so much so that the left-most keys in each of the six rows of keys (namely, the keys for the letters, e t a o i and n, in Fig. 35) the operating of which would naturally fall on the little finger or on the ring-finger of the left hand, constitute one-half of all the lower-case characters, in frequency of occurrence; that is, of a thousand lower-case characters, as these would occur on an ordinary printed page, more than 500 would be made by depressing the extreme left-most keys in each of the six rows of keys, Fig. 35. Add to this the space-key, which is also at the extreme left of the key-board and counting the space at the end of the word (for which a motion must be made by the operator) as if it were a letter, this, with the first row of keys at the extreme left of the key-board (the keys, e t a o i and n) makes a considerable majority of all the actions of the operator, done upon the space key and the left-most one-fifteenth (1/15th) part of the key-board. And more than ninety percent (about ninety-three (93)

percent) of all the work is done upon the left-most one-fifth of the key-board and the space-key. The result of this extreme congestion of the frequently-occurring characters at the left of the key-board is that the operator must either perform the bulk of the work with the outside fingers of the left hand, that is, with his least strong, lithe and useful fingers, or else he must use the two hands at the extreme left of the key-board, with the hands bent in at the wrist, in a somewhat cramped position (and that is what he does) so as to bring the fingers and the thumbs of both hands to bear upon the keys at the left of the key-board, with the bulk of the work falling, even so, on the left-hand, so far as the lower-case letters are concerned, which make about ninety-seven percent of the whole, in average work; and with a large amount of travelling over the keys for the right hand, in order to pass from its usual position at the left of the key-board, to the upper-case keys, at the right of the key-board. The key-board illustrated in Fig. 11, which resembles the key-board ordinarily used on type-writers that have separate keys for the upper-case and the lower-case alphabets, is a very much better key-board than the linotype key-board, in the following particulars:

(a) The frequently-occurring letters are pretty fairly divided between the two hands, and, indeed, between the several fingers of the two hands;

(b) The most-frequently-occurring keys (except, perhaps, the a-key) are disposed in positions to be reached with a very small movement by the strongest and most active fingers of the two hands, and this with the hands in a fairly natural, easy position at the key-board; and (c) The work of making the spaces, at the ends of the words, falls upon the thumbs, and the fingers are relieved of it.

And the key-boards illustrated in Figs. 18 and 28 have the great additional advantage of being suitable for duplex action, as hereinbefore described, so that the operator is enabled to set the letters of his words, two letters at a time, that is, to set two letters with a single impulse. But while I prefer to use a duplex key-board, yet, so far as my invention of operating two linotypes from one key-board is concerned, any key-board whatever that is suitable for the purpose may be used.

In the devices illustrated in Figs. 29 to 33, the keys 2, 2, of the key-board 221 act on the rock-shafts 410, 410, through the electro-magnets 101, 101, as before described. Obviously, said keys might act on said rock-shafts through the power-pneumatics, 304, 304, before described. Or said keys may act on said rock-shafts directly, as illustrated, for example, in Fig. 34, in which the inner ends of the keys 2, 2, are seen, arranged to act on the levers 402, 402, which, through the links 403, 403, give movement to the arms 410$^a$, 410$^a$, of the rock-shafts 410, 410, to which, in Figs. 29 and 30, the magnets 101, 101, are connected—and so give movement to the matrix-releasing devices as before described.

In Fig. 3, the electro-magnets 101, 101, are connected to act on the matrix-releasing levers F, F, independently of the cam-action of the linotype; and so, in Fig. 21, the pneumatic power-devices, 304, 304, act on the matrix-releasing devices, independently of the cam-action; and so in Figs. 29 to 32, the rock-shafts 410, 410 act on the matrix-releasing devices, F, $f'$, $f^2$, independently of the cam-action. But in Fig. 4, the electro-magnets 101, 101, act on the matrix-releasing devices, through the keys D, D, of the linotype key-board, and so through the usual cam-action; and so in Fig. 5; and in Fig. 36, the pneumatic power-devices each acts on the matrix-releasing device, through the lever 420 and the key-bar 4; and so, through the cam-action. And in like manner, the levers 412, 412, which are operated by the rock-shafts 410, 410, in Figs. 30 and 31 may, if desired, be arranged to act (through the pins 413, 413, Fig. 30, or through the latches 416, 416, Fig. 31) on a lever which acts on the key-bar 4, just as the lever 420, in Fig. 36, acts on the key-bar 4; or said levers 412, 412, may be connected to act on their respective matrix-releasing devices, through the usual cam-action, in any other manner whatever that is suitable for the purpose.

Instead of operating the cam-action and the matrix-releasing devices of the linotype through the keys D, D, of the key-board and the key-bars, 4, as is the case with the details of construction illustrated in Figs. 4, 5, and 5$^A$, the matrix-releasing electro-magnets 101, 101, may act through any other suitable levers (instead of the key-levers D, D) on the key-bars, 4, 4, so that each of said electro-magnets, when magnetized, will give movement to the corresponding key-bar 4, and so, through the cam-action, to the corresponding matrix-releasing devise, F, $f'$, $f^2$. A convenient arrangement of this sort is illustrated in Fig. 36$^A$. This is a sectional view in elevation, in general similar to Fig. 5, but in which the key-bars 4, 4, are lengthened downwards somewhat, and the magnets 101, 101, are located below the keys, D, D, of the linotype key-board, some in front and some behind the key-bars 4, 4; and said magnets are connected each through a lever 440, corresponding to it, to act on the corresponding key-bar 4, and so, through the cam-action, on the corresponding matrix-releasing escapement F, $f'$, $f^2$. The levers 440 are centered on the fulcrum-rods 440$^a$, 440$^a$; and these fulcrum-rods are set in the milled bars 440$^b$, 440$^b$; or said levers 440, 440, may be mounted in any other suitable manner whatever.

Obviously, the power-pneumatics, 304, 304

(Figs. 21 and 36) may, in like manner, be placed below the keys D, D, of the linotype key-board; the key-bars 4, 4, being lengthened downwards sufficiently for the purpose.

*My invention applied to linotype machines, which are provided with two sets of matrices of the same face, one set disposed close to the assembling-device and the other set disposed more remote therefrom*

In linotype machines, as ordinarily constructed, there is, in the magazine, one set of matrices which consists, ordinarily, of the twenty-six lower-case letters of the alphabet, the twenty-six upper-case letters of the alphabet, the figures, the usual marks of punctuation and some ligatures—usually fi, fl, ff, ffi, ffl, æ and œ. And I apply my duplex key-board to this single set of matrices, as before described, by using quick-acting connections for the one hand (say, the left hand, though this order may be reversed, if desired) and slow-acting connections for the other hand (say, the right hand) so that when, in order to set two letters, with a single impulse, on the part of the operator, two keys are depressed by him simultaneously, one with the left hand and the other with the right hand, the matrix which corresponds to the key that is depressed with one of these two hands, is released as rapidly as practicable, but the matrix which corresponds to the key which is depressed at the same time, with the other hand, is delayed a little, in its releasing, so as to let the other matrix which was first released, get into position ahead of it, in the line of matrices which is being assembled, or into position in the path of matrices, towards the assembling-device, in advance of the second matrix, as before described in connection with Figs. 18, 19 and 20; a delaying device being used for this purpose, to hold back, for a fraction of a second, the releasing of the second matrix, such, for example, as the magnet 282 before described; but any other delaying-device that is suitable for the purpose may be used. And with this construction, two similar keys, (as, for example, a a or b b) one belonging to the left-hand section of the key-board and the other to the right-hand section of the key-board, control the very same matrix-releasing device, F, $f'$, $f^2$; one of said keys controls said matrix-releasing device directly and as speedily as practicable and the other controls it through the delaying device before described.

More specifically, with the exact details of construction illustrated in Figs. 19 and 19$^B$ (which may, indeed, be varied within wide limits, if desired) two of the keys 2, 2, one belonging to the left-hand set of keys and the other belonging to the right-hand set of keys and which stand for the same letter (as, for example, a a or b b) control the very same matrix-releasing device, preferably, through the same power-device (as the electro-magnet 101, or the power pneumatic, 304) but not necessarily through the same power-device, for, obviously, two electro-magnets 101, 101, or two power-pneumatics 304, 304, one controlled by the appropriate key (as, for example, a or b) in the quick-acting set of keys and the other power-device controlled by the same key (that is, by the key of the same letter) in the slow-acting set of keys, may be used to operate the same matrix-releasing lever, F, or its equivalent. But by reason of limitations of space, and also for the sake of economy of construction, I prefer to use a single power-device for each of the matrix-releasing devices, as before said, and to control this power-device by the appropriate key, in each of the two sets of keys. And things are arranged in such a manner, as before described, that one of the two keys which controls the same power-device (the electro-magnet 101 or the power-pneumatic 304, or whatever other power-device may be used) acts on that power-device so soon as such key is depressed, while the action of the other key, which acts on the same power-device, is delayed a little, as before described.

But in a special form of linotype machine, which was invented by me, and which is illustrated and described in the United States Letters Patent to me, No. 605,777, dated June 14, 1898, there are two sets of matrices, namely, a quick-acting set, which lies to the extreme left of the magazine (as viewed from in front of the machine) in proximity to the assembling device, and a slow-acting set of matrices which is disposed in the magazine, somewhat to the right of the quick-acting set of matrices before mentioned and more remote from the assembling device, as illustrated in Figs. 1 and 5 of the Letters Patent aforesaid and as illustrated diagrammatically, also, in Fig. 37 of the accompanying drawings, so that when two matrices are released simultaneously, one from the quick-acting set of matrices (which are controlled by the keys of the one hand, at the key-board) and one from the slow-acting set of matrices (which are controlled by the keys of the other hand at the key-board) the matrix released from the quick-acting set of matrices, falls down into the assembling-device, or on to the conveying belt H (by which the matrices are carried to the assembling device) in close proximity to the said assembling device; but a matrix which is released at the same instant from the slow-acting set of matrices, falls upon the said conveying belt H, in a position somewhat more remote from the assembling device, so that when two matrices are thus simultaneously released, one from the quick-acting set of matrices (which lies close to the assembling device) and the other from the slow-acting set of matrices (which lies more remote from the assembling device) the matrix so released from the quick-acting set, will be assembled in the line of matrices, in front of (that is, to the left of) the matrix from the slow-acting set, which was simultaneously released; and this although the matrices are released at the same instant of time. Or, my two principles—

(a) Of using two sets of matrices, namely, a quick-acting set and a slow-acting set, and disposing the matrices of the quick-acting set closer to the assembling device and the matrices of the slow-acting set more remote from said assembling device; and, (b) Of using quick-acting connections between the keys at the key-board, which serve for the first letter of a pair and the matrix-releasing devices that are controlled by said keys, and using slow-acting (that is, slower-acting) connections between the keys, at the key-board which serve for the second letter of a pair and the matrix-releasing devices controlled by such latter keys—may both be used together, as described in detail, in the Letters Patent to me aforesaid, No. 605,777, dated June 14, 1898. And it will be understood, also, by considering Fig. 37 and the diagrammatic circuit-drawing, Fig. 38, which shows one set of electro-magnets 101, 101, for the keys 2, 2, of the quick-acting set (which are seen at the left of the figure) and another set of similar electro-magnets, 101$^a$, 101$^a$, for the keys of the slow-acting set (which are seen at the right of the quick-acting keys, in Fig. 38) instead of one set of magnets, 101, 101, controlled by the two sets of keys, that these two sets of electro-magnets, 101, 101 and 101$^a$, 101$^a$, the one quick-acting and the other slow-acting, may be used, whether a single set of matrices be used, in a magazine, as in the linotypes in common use, or whether two sets of matrices, of similar face, one quick-acting and the other slow-acting, be used, as described in the Letters Patent aforesaid, No. 605,777, dated June 14, 1898, and illustrated also, in Fig. 37 of the accompanying drawings. The supplemental set of electro-magnets, 101$^a$, 101$^a$, shown in Fig. 38 would, in the ordinary linotype (which has only one set of matrices, in the magazine) be connected to operate the same matrix-releasing devices, which the corresponding magnets, 101, 101, in the quick-acting set operate; but with the special construction illustrated in my Letters Patent aforesaid, No. 605,777, dated June 14, 1898, and in Fig. 37 hereof, the magnets 101$^a$, 101$^a$ of the slow-acting set, would be connected to operate the matrix-releasing devices of the slow-acting set of matrices, which are seen at the left in Fig. 37.

My invention, then, it will be understood, may be applied to either the ordinary linotype, with its single set of matrices, or to the special form of linotype, which is described in detail in the Letters Patent aforesaid to me, No. 605,777, dated June 14, 1898, which is provided with two sets of matrices, namely, a quick-acting set and a slow-acting set—illustrated, also, diagrammatically in Fig. 37 of the accompanying drawings; or it may be applied to any other form of linotype or to any other type-setting machine that is suitable for the purpose.

The quick-acting set of matrices, as described in the Letters Patent aforesaid, No. 605,777, consists, preferably, only of the lower-case letters with, it may be, a few of the more-frequently-occurring marks of punctuation, as for example, the apostrophe and the hyphen; but the slow-acting set of matrices is preferably, a complete set of matrices including, with the lower-case letters and the necessary punctuations, the upper-case letters and figures. But these details may be altered, if desired.

Referring again to Fig. 37, while, from the standpoint of the operator, a complete alphabet of lower-case matrices is desirable in the quick-acting set of matrices, it is, on the other hand, desirable to make only so much increase in the size of matrix magazine as is necessary. Now, some of the letters of the alphabet are of very infrequent occurrence, for example, z, x, k and q. These may be omitted from the quick-acting set with very little loss, and yet other letters may be omitted, with no great loss. for example, j, v, w and p. In a word, while a complete alphabet of lower-case matrices in the quick-acting set is desirable in some aspects of the matter, in other aspects, and with a view to avoiding increase in the size of the magazine, a fractional alphabet having the more-frequently-occurring letters, but omitting the less-frequently-occurring letters, is useful and may well be used instead of a complete alphabet.

By the words, "slow-acting set of matrices", in the preceding paragraph, I mean the set of matrices which lies more remote from the assembling elevator, in Fig. 37; but in so far as the electrical connections of the switches (2, 2, Fig. 38) which close the circuits of the electro-magnets 101, 101, that operate the devices for releasing the matrices, are concerned, in this case, as in those before described, it is only those of said switches 2, 2, which correspond to and are operated by those keys of the supplemental set which serve for duplicated letters (in Fig. 38, the lower-case part of the so-called slow-acting set of matrices) that are connected with the bus-bar 104$^d$; all the other keys (all save those which serve for duplicated letters in the supplemental set) are preferably connected with the bus-bar 104$^a$. Stated otherwise, those of the switches 2, 2, Figs. 19, 19$^A$, 19$^B$ and 38, which serve for keys that occur only once in the key-board, are connected with the bus-bar 104$^a$; but the switches 2, 2, which are controlled by keys that are duplicated in the two hands are connected, some with the bus-bar 104$^a$ and some with the bus-bar 104$^d$—the quick-acting ones with the bus-bar 104$^a$, the slow-acting ones or supplemental ones, with the bus-bar 104$^d$.

*My invention applied in such a manner as to enable one operator to operate three, four or more linotypes or other typesetting machines simultaneously*

I have spoken in various places in this specification, of operating two linotypes from one key-board, so as to set alternate lines of type on each; the first, third, fifth, etcetera lines being set on the one linotype and the second, fourth, sixth, etcetera lines being set on the other linotype. Two machines, thus controlled at the same time, by the same operator, I consider sufficient for most purposes. But in the cases of some expert operators, it may be desirable to enable them to operate three or possibly in rare cases, even four machines, at the same time. This is easily done with my invention, as will be understood from the following:

Considering first the form of apparatus which is illustrated in Figs. 27 and 28 and which has been before described, in which a plurality of sets of keys are used, combined into a single key-board, each such set of keys being connected to operate its own linotype; in Figs. 27 and 28, two such sets of keys only are shown in the key-board, but, a greater number of such sets of keys may be used, each set being connected to operate its own linotype. In Figs. 39, 40 and 40$^A$, three such sets of keys are seen, each connected, preferably, by electro-magnets 101, 101, to operate the matrix-releasing escapements of the corresponding linotype, and connected, also, by the magnets 66, 66, or otherwise to operate the space-band-delivery devices and by the magnets 235, 235, or otherwise to operate the matrix-elevator of the appropriate linotype, so as to send up the line, when it has been set or otherwise to start it on its course of motion towards the mould, at which the slugs (in the case of a Mergenthaler machine) or the individual type (in the case of a Stringertype or Grantype machine) are cast. Figs. 39 and 40 are so plain and clear, in the light of Figs. 27 and 28 and the description before given, that any further detailed description of them is unnecessary. And it will be obvious that, consistently with the principle of the invention, four such sets of keys or even more, might be used, if desired, in one key-board; each such set of keys being connected, in the manner before described, or in any other suitable manner, to operate the linotype machine, corresponding to such set of keys.

I prefer to connect my key-board, shown in Figs. 27 and 28 and 28$^A$ and in Figs. 39 and 40, with the matrix-releasing devices, by the electro-magnets 101, 101; but obviously, in this case, as in other cases, the pneumatic power-devices, 304, 304, controlled by the keys at the key-board, may be used to operate the matrix-releasing devices, F, $f'$, $f^2$ as already described, in connection with Figs. 21 to 26 and Fig. 36; or any other power mechanism whatever that is suitable for the purpose may be used. And, secondly, while I prefer to use electro-magnets, or pneumatic power devices or other power mechanism, controlled from the key-board, to operate the matrix-releasing devices, F, $f'$, $f^2$ of the several linotypes, yet direct mechanical connections, through rock-shafts or other merely mechanical devices may be used for this purpose, after the general fashion illustrated, for example, in Figs. 29 to 34 and before described. But, of course, it will be understood that with the kinds of key-boards illustrated in Figs. 27 and 28 and 39 and 40, the shiftable connections which are shown in Figs. 29 to 32$^A$, would not be required and that each set of keys at the key-board would be connected by its own set of rock-shafts 410, 410, with the matrix-releasing devices, F, $f'$, $f^2$, of the linotype corresponding to such set of keys.

Considering, next, the other type of my apparatus, in which a single set of keys (whether having a duplex alphabet, as in Fig. 18, or a single alphabet, as in Figs. 11 and 35) is used at the key-board to control a plurality of linotypes, shiftable connections being provided for this purpose, by which the keys at the key-board are connected first with one linotype and then with another (as before fully described in connection with two linotypes) three, four or more linotypes may be operated, if desired, at the same time, from the same key-board, by the same operator, the lines of type being set on these machines in series, say, for example, with three linotypes, the first, fourth, seventh, etcetera lines on the first linotype; the second, fifth, eighth, etcetera lines on the second linotype; and the third, sixth, ninth, etcetera lines on the third linotype. It is only necessary, for this purpose, to add the third linotype and to alter slightly, but without any change in the principle, the arrangement of the shiftable connections, before described. Thus, in the apparatus illustrated in Fig. 40$^B$, which closely resembles that illustrated in Fig. 9 and before described, a third set of switch-members, 226$^b$, 226$^b$, is added and these switch-members are connected with the matrix-releasing electro-magnets 101, 101, of the third linotype, just as the switch-members 226$^a$, 226$^a$, are connected with the matrix-releasing electro-magnets 101, 101, of the second linotype and the switch-members 226, 226, with the matrix-releasing electro-magnets 101, 101, of the first linotype.

But as the gang or set of switches, 225, 225, now has three operative positions, instead of two (namely, the position of contact with the switch-members 226, 226, which connect with the matrix-releasing electro-magnets 101, 101, of the first linotype; and the position of contact with the switch-members 226$^a$, 226$^a$, which connect with the matrix-releasing electro-magnets, 101, 101, of the second linotype; and the position of contact with the switch-members 226$^b$, 226$^b$, which connect with the matrix-releasing electro-magnets 101, 101, of the third linotype) the magnet 227 is omitted and the gang of switches, 225, 225, is operated by the handle 430 (see Figs. 40$^B$ and 40$^C$) which handle is attached to the arm 431, which, in turn, is connected with the bar 225$^a$, and so with all of the switches, 225, 225. The lower end of the arm 431 is, preferably, brought to a point and travels over an index or scale 432, on which the marks, 1, 2, 3, are placed, which, with the pointer 431 indicate which one of the linotypes (the first, the second or the third) the keys 2, 2, at the key-board are connected with, according to the position of the handle 430, arm 431 and switches, 225, 225.

But instead of manipulating the arm 431, switch-bar 225$^a$, and switches, 225, 225, by the handle 430, they may be positioned in any other manner whatever that is suitable for the purpose.

The simple arrangement of parts, seen in Fig. 40$^B$, illustrates well the principle of my invention, in this regard, whether my key-board be connected with two, three or more linotypes. But Figs. 41, 42 and 43 illustrate a more convenient arrangement of parts for this purpose. Here, it will be seen, instead of using a single set of switches, 225, 225, which make connection with the switch-members 226, 226, or 226$^a$, 226$^a$, or 226$^b$, 226$^b$, and so with the one linotype or the other, in the apparatus of Fig. 41, three parallel-connected sets of the switches 225, 225, are used for the three linotypes respectively; one of these sets of switches 225, 225, makes connection, through the corresponding switch-members, 226, 226, with the matrix-releasing electro-magnets 101, 101, of the first linotype; another of the sets of switches, 225, 225, makes connection through the switch-members 226$^a$, 226$^a$, corresponding to it, with the matrix-releasing electro-magnets 101, 101, of the second linotype; and the third set of said parallel-connected switches, 225, 225, makes connection, through the switch-members 226$^b$, 226$^b$, corresponding to it, with the matrix-releasing electro-magnets 101, 101, belonging to the third linotype. All this will be clear from Figs. 41, 42 and 43. And with this apparatus, I preferably use three of the pairs of shifting keys, 231, 231$^a$, as shown diagrammatically (through the switches 229 and 236) at the upper right-hand corner of Fig. 41 and in plan in Fig. 43; and each of these pairs of keys, 231 and 231$^a$, controls the corresponding shifting magnet 227 and switches 225, 225, and also the motor device (marked 235, in Figs. 41 and 42) for operating the matrix-elevator (or assembling elevator) I, so as to send up the line, when it has been assembled therein.

The switches 229 and 236, operated by one of the pairs of keys 231 and 231$^a$ (see Figs. 41, 42 and 43—especially Fig. 42) act, it will be remembered, when the key 231$^a$ is depressed, to close the circuit of one of the magnets 227, which operates the corresponding set of shifting switches, 225, 225, and also to close the circuit of the magnet 235, which sends up the line—but in different machines; that is, the same action of the operator on one of the keys 231$^a$, which closes the circuit of the magnets 227, and so closes the switches 225, 225, controlled by it and belonging to a particular one of the three linotype machines which are controlled from the keyboard, so bringing that machine into action or, more shortly, bringing it on, so that a line may be set with it, closes the circuit also of the matrix-elevator-operating electro-magnet 235, but on a different machine, namely, on that machine on which a line has just been set. This has already been described, for two linotype machines, in connection with Fig. 10. But for the case of three machines, a further brief description may be helpful. Assuming that the three linotype machines, which are controlled from the same keyboard (with the apparatus illustrated in Figs. 41, 42 and 43) are called, for distinction's sake, the first linotype, the second linotype and the third linotype, respectively, and that they are operated, so as to set a line on each, in the order, first linotype, second linotype, third linotype; first linotype, second linotype, third linotype; and so on continually, then the pairs of switches 229 and 236 (controlling respectively the magnet 227, which operates the corresponding set of shifting switches 225, 225, and the magnet 235, which operates the assembling-elevator I, so as to send up the line) which are operated respectively by the keys 231$^a$, which are marked first linotype, second linotype and third linotype, in Fig. 43, are connected, as Fig. 41 shows, in such a manner that—

(a) The parts operated by the depressing of the key 231$^a$, marked, "First linotype", in Fig. 43, bring on the first linotype so as to set the next line therewith, and send up the line on the third linotype—in which a line has just been set; and for this purpose, the switch 229, closes the circuit of the magnet 227, corresponding to the first linotype and the switch 236, at the same time closes the circuit of the matrix-elevator-operating magnet 235, belonging to the third linotype;

(b) The parts operated by the depressing of the key 231ª, marked "Second linotype", in Fig. 43, bring on the second linotype and send up the line on the first linotype; and for this purpose they close the circuits of the shifting magnet 227, corresponding to the first linotype and of the matrix-elevator-operating magnet 235, belonging to the first linotype; and, (c) The parts operated by the depressing of the key 231ª, marked "Third linotype", in Fig. 43, bring on the third linotype and send up the line on the second linotype; and for this purpose, they close the circuits of the shifting magnet, 227, corresponding to the third linotype and of the matrix-elevator-operating electro-magnet, 235, belonging to the second linotype.

And the operator operates the keys, marked "First linotype", "Second linotype", and "Third linotype", in Fig. 43, in due serial order; and at the end of each line, he depresses that one of the keys 231 which stands high and puts down (preferably with the same movement of the hand) the next in order of the keys 231ª, as before explained. That is, if he puts down the elevated key 231, of the first linotype (on which a line has just been set) he depresses, at the same time, the key 231ª, marked "Second linotype", so as to bring that linotype into action to set a line; then, after setting a line on this second linotype, he puts down the elevated key 231 (belonging to the second linotype) and also puts down the key 231ª marked "Third linotype", so as to bring the third linotype into action; and after setting a line on this, he puts down the elevated key 231 (belonging now to the third linotype) and at the same time, puts down the key 231ª, marked "First linotype", so as to bring the first linotype into action, to set a line, again; and so on, repeating the cycle of operations above described.

Instead of controlling the shiftable connections from my key-board 221, to the matrix-releasing devices of the several linotypes and to the several matrix-elevator-operating devices, in the way above described, they may be controlled in any other way whatever that is suitable for the purpose.

*Of the means for operating, from the key-board, the matrix-elevators or assembling-elevators of the several linotypes, with the forms of apparatus which are illustrated in Figs. 27 and 28 and Figs. 39, 40 and 40ᴬ*

With the form of apparatus illustrated in Figs. 27 and 28, in which two sets of keys are provided at the key-board, each of which sets is connected to control the matrix-releasing devices of its own linotype, and the operator sets alternate lines of type on the two machines, by operating, for one line, on the one set of keys and for the next line on the other set of keys; and so on, changing continually from the one set of keys to the other, I prefer to use the keys 231 and 231ª, controlling the switches 236, 236, and the assembling-elevator-operating electro-magnets 235, 235, after the fashion illustrated, for example, in Fig. 10 and before described; and see also Fig. 42. And in this apparatus, it will be remembered, the friction-lever 232, acts as a brake on the segment 230 and holds said segment in whatever position it may be thrown into, by the operating of the keys 231 and 231ª; and the operator, by pressing down whichever one of these two keys may stand above the other, reverses at the end of each line, the position of the segment 230, and thereby brings the appropriate one of the matrix-elevator-operating electro-magnets, 235, 235, into action, to send up the line which has just been set. Thus, the one pair of shifting-keys 231 and 231ª, serves for the two sets of matrix-releasing keys 2, 2, at the key-board and for the two linotypes.

But with the exact form of key-board apparatus which is illustrated in Figs. 39, 40 and 40ᴬ, I prefer to use three of the keys, 231ª, each operating its own magnets 235 and 238, belonging to the linotype corresponding to it, as shown in Fig. 40ᴬ; and in this case, the friction lever 232 is omitted; and the operator, after setting a line, by operating on the keys of one of the three sets, seen in Figs. 39 and 40, depresses, for an instant, the key 231ª, belonging to such set of keys (see Figs. 39 and 40ᴬ) so as to send up the line of matrices which he has just assembled; and so on, with each succeeding line.

Instead of using the electro-magnet 235, as the power-device to operate the matrix-elevator, I, so as to send up the line, when it has been assembled, one of the pneumatic power-devices 304, before described may be used for the purpose; or any other power-device whatever that is suitable for the purpose, may be used. And, indeed, any other device whatever that is suitable for the purpose, whether it be a power-device or not, may be used to operate the matrix-elevator I, so as to send up the line, when it has been assembled. Thus, for example, the usual handle or lever, which is located at the key-board (seen, in great part broken away, at the extreme right of Fig. 35) and is mechanically connected, in the usual manner, well known in the art (through a rock-shaft, rock-arm and link) with the matrix-elevator I, may be used, if desired. What I have shown in my drawings and described for this purpose, is by way of illustration only; it is quicker and easier for the operator to use, than the mechanical devices now in common use; but the details of construction, in this respect as in others, may be varied within wide limits, if desired.

Modern linotypes, as is well known, are frequently furnished with three or even four sets of matrices, of different faces. When I speak in this specification and particularly in the statement of claim at the end hereof, of a plurality of type-setting machines, having type of substantially the same face, or use other words of similar import, I mean that each of these machines has one set of letters or matrices, which are of substantially the same face with a similar set of letters or matrices in the other of said machines, where two machines are used in a group, or in each of the others, where more than two such machines are used in a group; and consistently with this, the several machines may also have matrices which are not of the same face; that is, there being one set of matrices of substantially the same face in each of the machines, said machines may also each have one or more other sets of matrices, whose faces are peculiar to that machine, not being supplied to the other machines of the pair or group, that are controlled from the same key-board.

By the words above referred to, type-setting machines "having type of substantially the same face", or by other words of similar import, I mean that the type of substantially the same face, on two or more machines, which is used in setting successive lines of the same matter, shall either be of the same face, or if not that, shall be so nearly of the same face that it is practicable to set successive lines with it, on the several machines, so as to make substantially homogeneous matter (as in the columns of a newspaper, magazine or book) as distinguished from the obviously-different faces which are used in advertising and display work—that the differences, if any, in the type of the several machines are not so great as to prevent setting the successive lines with the several machines, one line with one machine and another line with another machine, etcetera, as before described.

Type, as is well known, may either be male type, formed in relief, that is, with the face raised above the surface of the type-body, or female type, with the face sunk into, or cut into the body of the type, that is, formed in intaglio; and these female types are frequently termed matrices. But whether formed in the one way or in the other (in relief or in intaglio) they may be used in linotype machines and in other type-setting machines, to which may invention is applicable. So far as my invention is concerned, the raised type and the sunken-in characters or matrices are equivalents of each other, and might be interchanged, in many cases, one for the other; and my invention is applicable equally to each; and whether I use the one word or the other in the statement of claim at the end hereof, I wish it to be very distinctly understood that I include, under whichever word may be used, both things—the raised type and also the sunken-in or intaglio type or matrix. The latter are in more common use in type-composing machines; but it is well known and, indeed, obvious that male type or typedies might, if desired, be substituted for the matrices in common use, suitable changes being made in the other processes which precede the actual printing.

In the statement of claim at the end hereof, I use the word "type-setting machine" as a broad, general term which includes, among other things, the linotype, in its several varieties (the Mergenthaler linotype, the intertype, the linograph, the Stringertype, the Grantype, etcetera, etcetera) and also, all other machines for setting or forming type or matrices, to which my invention is applicable—all other machines which can be used as substitutes for hand-composition and to which my invention is applicable.

*My invention enables an operator to operate, from his key-board, a plurality of type-setting machines, having type of different faces, or having different lengths of line, etcetera, so as to set different faces, or different lengths or heights of lines, without changing the adjustments of the magazine or of the moulds*

I have remarked above on the fact that the modern linotype machine is commonly provided with three magazines or even four, having type of different faces. So also, as is well known, the modern linotype is commonly furnished with a plurality of moulds, attached to the same mould-wheel, and also with mould-adjusting and mould-changing devices. Thus, the same machine, by bringing different magazines into use, or by bringing different moulds into use, or by adjusting or in some cases changing the moulds, can set, equally well, several different faces of type, and also can set each of these faces in different lengths of line or in different heights of line, measured transversely to the length of the line, and in the same direction as the length of the printed column, in which said line occurs. By my invention, as before described, two or more linotype machines or other type-setting machines, are combined with a single key-board and operated therefrom. One use of this invention, of combining two or more machine with one keyboard (and the most important use of it, according to my present opinion) is to enable the operator to set the successive lines on the several machines in a serial order, as before described, whereby, although each machine can run, to the best advantage, only at the rate, say, of about seven and a half lines per minute, yet with two or three of them operated at the same time from the key-board, twice that many lines can be set, by a skillful operator and cast and distributed by the machines.

But my invention of operating a plurality of machines from one key-board has other uses than this; and I do not limit myself, in all cases, to operating the machines in serial order, as before described (so that, with two machines, preferably, the first, third, fifth, etcetera lines are set on the one machine and the second, fourth, sixth, etcetera lines are set on the other machine; but with three machines, preferably, the first, fourth, seventh, etcetera lines are set on the one machine; the second, fifth, eighth, etcetera lines are set on another machine; and the third, sixth, ninth, etcetera lines are set on the third machine). One other use of my invention, which does not necessarily involve the operating the machines in a serial order, will be understood from the following: assuming modern linotypes to be used, or any other machines, having similar powers of adjustment, to produce different faces, different lengths and heights of line, etcetera, namely—

One of the linotypes may be arranged in the usual and well known manner, to set type of a certain face and a certain length and height of line; another machine may be arranged to set type of a different face, or of a different length or height of line; and a third machine may be arranged to set yet a different line, either in respect of the face used, or of the length or height of the line; or it may be different from one or both of the other machines, in two or more of these particulars.

With this arrangement of the machines, controlled from one key-board, which would be most useful in connection with advertising work and display work, the operator, without leaving his key-board, and without altering the adjustments of the machine, either in respect of the magazines or the moulds, would yet be able to set different faces of type, or different kinds of line (in respect of length, height, etcetera) or both.

Also the leading use of my invention, above explained, (of setting the successive lines of type on different machines, so as to increase the speed of working) may be combined with the other use, above referred to. Thus, for example, two of the machines which are connected with one key-board, may be arranged to set type of the same face and with the same length and the same height of line; and these two machines may be operated (when used together) in a serial order, the first, third, fifth, etcetera lines being set on the one machine and the second, fourth, sixth, etcetera lines being set on the other machine; and with these two machines and the key-board which controls them, yet another machine may be combined, which sets a different face of type, or a different length of line, or a different height of line. And with these three machines and the key-board by which they are operated, may be combined, if desired, yet a fourth machine, which is adjusted to set a line, say, of yet larger type, with a longer line, say, a line long enough for matter which is two columns wide. Thus, the operator, for the most of his work, will set his alternate lines of type on the two machines first mentioned, setting the first, third, fifth, etcetera lines on the one machine, and the second, fourth, sixth, etcetera, lines on the other machine; but when he requires other faces of type, or a longer line or a higher line (measured lengthwise of the column) he has but to touch a key at the key-board (or with the apparatus of Figs. 39, 40 and 40^A, has but to change his hands from one set of keys to another similar set at the same key-board) in order to set his altered line, without having to change his magazine or to adjust his mould.

It will be understood, then, that while for some purposes (probably for most purposes) I not only combine a plurality of machines with the same key-board, but also set the successive lines of type on the several machines (preferably in a serial order, as before described yet for some other purposes, this need not be done; and also this mode of working two or more machines, in serial order, so as to set the successive lines of type, ordinarily, on the several machines in succession, may be combined with the other use of my invention above described, in which an additional machine, controlled from the same key-board, serves not to set the alternate lines (or every third line, with three machines, or every fourth line with four machines) but serves to set a different face of type; or a different length of line; or a different height of line; or a line with two or more of these differences.

*The best serial order of operating the machines, which are controlled from the same key-board*

Where two machines are operated from the same key-board, to set type of substantially the same face, the most natural serial order for operating these machines, is to set the first, third, fifth, and other odd-numbered lines on the one machine, and the second, fourth, sixth and other even-numbered lines on the other machine. But instead of using this exact order, which insures a constant alternation from the one machine to the other, it may be departed from, at times, or any other serial order that is preferred may be used instead, as for example, the first and second lines may be set on the first machine and the third and fourth lines on the second machine; and so on, setting two successive lines on each machine, and then changing to the other machine; or one line may be set on one machine and then two lines on the other machine; and so on; or there may be several successive alternations from the one machine to the other, and then a repeat, that is, the setting of two successive lines on the same machine; and with a larger number of machines operated from the key-board, there is a larger field for variety, in the serial order chosen. To give one example, out of many possible ones, with three machines, controlled from the key-board, the following order might be used, in setting the successive lines of type, namely;

The first line is set on the first machine;
The second line is set on the second machine;
The third line is set on the first machine;
The fourth line is set on the third machine;
and so on, repeating this cycle, or varying it, or using any other cycle or series whatever that is desired. But while many variations of this sort are possible, there are none better, for two machines, than the order before repeatedly mentioned, of setting the first, third, fifth, etcetera lines on the one machine and the second, fourth, sixth, etcetera lines on the other machine. And for three machines, there is none better than that before given, of setting the first, fourth, seventh, etcetera lines on the one machine; the second, fifth, eighth, etcetera lines on another machine, and the third, sixth, ninth, etcetera lines on the third machine. But any other order of changing from one machine to another, or of using the several machines, may be used, that is desired. Any alternating or changing from one machine to the other, increases the possible output of the operator; and a constant alternating or changing from the one machine to the other, greatly increases the possible output of the operator.

*The practical advantages of my invention*

Having described in detail the mechanical and electrical devices, for use in carrying out my invention, a few lines as to the practical advantages of the same, may not be out of place.

First. The key-board of the linotype, as the same is now in common use, is quite defective, as before pointed out, by reason of the severe congestion of the frequently-occurring characters at the extreme left of the key-board. And this defect has come into the machine by reason of the two following facts, namely:

(a) The matrices in the magazine are arranged for practical reasons, in the order of their frequency, commencing at the left, near the assembling device, with the most frequently-occurring matrices; and, (b) The keys, at the key-board, are connected by direct mechanical devices (that is, the usual cams) with the matrix-releasing devices above them, and follow the order of the matrices, with the most-frequently-occurring keys at the extreme left of the key-board.

But by using the electro-magnets 101, 101, as before described, to connect the keys at my key-board with the keys or with the matrix-releasing devices of the linotype, or by using my power pneumatics 304, 304, before described for this purpose (see Figs. 21 to 27 and 36) or by using the rock-shafts 410, 410, before described (Figs. 29 to 34) I make it practicable, even without altering the order of arrangement of the matrices in the magazine, to use a greatly improved key-board; for example, that illustrated in Fig. 11, or any other that is suitable for the purpose; for the order of arrangement of the keys is made to be entirely independent of the order of arrangement of the matrices in the magazine; and with an improved key-board (either that illustrated in Fig. 11, or any other that is suitable) I make it practicable to increase the speed of the operator's work on the key-board even apart from my other important principle of duplex working.

Second. By using a duplex key-board, as illustrated, for example, in Fig. 18 or 27 or 39, with means for retarding a little, the action in releasing its matrix, of the key which serves for the second letter of a pair of letters which are set with a single impulse, on the part of the operator; or by using a quick-acting and slow-acting set of matrices (as illustrated, for example, in Fig. 37 and before described) with my duplex keyboard; or by using both of these principles of working, I effect a further great increase in the speed of working of the operator, on his key-board.

Third. And by bring two linotypes or even more under the operator's control from his key-board, so that successive lines of type are set in proper serial order on the several machines, thus controlled from the one key-board, I enable the machines to keep up with the operator. By this third feature of working and the combination of it with the other two features above referred to, I effect a great increase in the speed and output of the operator, heretofore considered impossible.

Fourth. In linotype machines, as they are now built, the operator, when he has set a line, exerts a substantial amount of energy to send it up; and to effect this operation, his right-hand must leave its usual position at the left of the key-board and travel a foot or more to reach the handle (seen, broken off, at the right in Fig. 35) on which he acts, to send up the line. And after he has set a line and sent it up, he must wait an appreciable interval of time until the line so sent up has been removed from the matrix-elevator I, and this has returned to its normal position, near the assembling device, ready to receive another line, before he can put the keys down again, to set the next line. All this involves a substantial expenditure of energy, a substantial disturbance of the operator's right hand from its normal position at the key-board and a substantial loss of time, for each line that is set. But by my principle of operating the matrix-elevator I, by a power-device, controlled from the key-board, a light touch on a key at the key-board (231 or 231ª) involving a very small expenditure of energy and a very small movement of the hand from its normal position, at the key-board, to reach this key, is substituted for the relatively large expenditure of energy by the operator and the relatively large movement of his hand, now required to send up the line. And by my other principle of working two or more machines from one key-board, the loss of time which the operator now suffers, at the end of each line, in having to wait for the matrix-elevator, I, to go up, to be relieved of its line of matrices and to return to its normal position, before he can put down another key, to set another type, is entirely eliminated.

Fifth. By placing my key-board and the two linotypes controlled by it, close together, as before described, preferably, one linotype to the right and the other to the left of the key-board, the operator is enabled, while operating the key-board, to watch the two machines, especially the assembling-device of the machine, on which at that moment, he is setting a line and to do what is necessary in the way of correcting transpositions and mistakes, effecting hand justification, etcetera; also, he can attend to the distributers of the two machines, when either of them needs attention. Thus, one single operator is enabled to operate, unaided by any other person, two machines, even as he now operates one.

Sixth. Another practical advantage of my invention, of operating a plurality of linotypes or other type-setting machines from the same key-board, changing from one machine to the other, with such an apparatus as that illustrated in Figs. 27 and 28, or Figs. 39, 40 and 40ᴬ, by changing the hands from one set of keys, connected with one type-setting machine, to another set of keys at the same key-board, which is connected with another type-setting machine; or changing from one machine to another, with such an apparatus as that illustrated in the other Figs. (see particularly Figs. 9 and 10, also 11 to 20ᶜ inclusive; or Figs. 21 to 26; or Figs. 29 to 34; or Figs. 40ᴮ, 41, 42 and 43) by touching a key at the key-board, which key, through suitable mechanism, shifts the connections of the key-board from one type-setting machine to another, is that the operator, by suitably adjusting or changing, before he sits down to the key-board, the magazines or the moulds of one or more of these machines, can set one face of type and one sort of line on one or more of the machines controlled from his key-board, and another face of type or another kind of line (or greater or less length or of greater or less height) on one or more others of the machines, controlled from his key-board, and can change the face of the type which he is setting or the character of the line (as to length, height, etcetera) while seated at his key-board, and without having to change the adjustment of any of the magazines or moulds.

The features of my invention above stated are all of them, to the best of my information, new with me. But the features of improvement above mentioned, of connecting the keys at the key-board with the matrix-releasing devices, through electro-magnets, and also of using quick-acting and slow-acting connections from the key-board to the matrices, or of using quick-acting and slow-acting sets of matrices, although original with me, are not new in this present application, having been disclosed in the Letters Patent aforesaid, to me, No. 605,777, dated June 14, 1898, and in the Letters Patent of the United States to me, No. 566,442, dated August 25, 1896. But the feature of controlling two or more linotypes or other type-setting machines from the same key-board and the combination with this, of the other features of improvement before mentioned, enables the machines, as before said, to keep up with the increased speed of the operator, on an improved key-board, and enables the operator, without working any harder, to do a great deal more work. For practical purposes, the speed of the linotype is, in general, limited to seven and a half or eight lines per minute, even though the operator be himself a perfect machine, working without ceasing, at the top speed of the machine, and without mistakes. However greatly the speed of the key-board may be increased, this does not increase the speed of the casting-mechanism and the distributing mechanism, which are limited, as before stated. But by combining an improved key-board (one of my key-boards before described, or any other key-board that is suitable for the purpose) with a plurality of machines, as before described, so that successive lines of type are set in due serial order on the several machines, and these are kept working, casting and distributing, at the same time, the amount of work which an average operator can do, is greatly increased.

In this specification and in the statement of claim at the end hereof, I sometimes use the term "type-setting machine" and sometimes the term "type-composing machine", but both are used with the same meaning, namely, to refer to any kind of type-setting or composing apparatus which is suitable for the purpose and with which my invention may be used. The machines now in use, with which it is most likely to be useful, are line-casting machines, such, for example, as the linotype, intertype, linograph, Grantype, etcetera, and circulation machines, not being line-casting machines, such, for example, as the Stringertype machine before mentioned. But my invention may be used with any other type-composing machine whatever that is suitable for the purpose.

In the type-composing machines which are in most general use, such as the linotype, intertype and linograph, the act or operation of putting or starting the assembled line of matrices into a course of motion towards the mould, as which the casting operations are performed, is commonly termed "sending up the line". And I use the words, "sending up the line", or "to send up the line" or other similar expressions, in this specification and particularly in the statement of claim at the end hereof, as brief expressions for putting or starting the line of assembled type or matrices (after they have been assembled) into a course of motion towards the mould, at which the casting operations are performed. Whether the movement of the assembled line of type or matrices be upwards or in some other direction is not vital; it is usually an upward movement, in the machines in common use; but obviously, it might, by alterations in the mechanism, be a motion sideways or downwards or in some other direction than upwards, as well.

By a "line-delivering device", as that term is used in this specification and particularly in the statement of claim at the end hereof, I mean a device or part which moves or carries or delivers the assembled line of matrices from one place or point in the machine, to another. In the machines in most common use, the line-delivering device, in the sense in which I use that expression most frequently in the statement of claim at the end hereof, is the assembling-elevator I, or assembling-block as Mergenthaler called it. But any other device which serves a similar function and which is suitable for the purpose may, of course, be used instead.

Modern composing machines are commonly supplied with several sets or fonts of matrices. And when I speak in this specification and particularly in the statement of claim at the end hereof of a plurality of type-setting machines or type-composing machines having type of substantially the same face, or use other similar expressions, I do not mean that all the fonts of matrices in the one machine are necessarily duplicated in the other, but only that there is in each machine a set or font of type or matrices which is so nearly like a set or font of type or matrices in the other machine that these similar fonts can be used together, so as to set alternate lines of type on the two machines, alternately.

The essential features of my invention before described, may be practiced in more or less different ways and with widely differing forms of apparatus. Thus, for example, we may use two or more sets of keys, combined into one-key-board (that is, placed in such convenient proximity that the operator can play upon either set, without leaving his place or seat) each of these sets of keys being connected to operate the matrix-releasing devices or type-delivering devices of a machine corresponding to such set of keys, as illustrated, for example, in Figs. 27 and 28 for two linotypes, and in Figs. 39, 40 and 40^A for three linotypes. Or we may use a single set of keys at the keyboard (whether this be of the single-letter kind, illustrated, for example, in Figs. 11 and 35, or of the duplex kind, illustrated, for example, in Fig. 18) and connect these keys by shiftable connections, first with one linotype and then with another, so as to set the succeeding lines of type on different machines and to keep a plurality of machines working, casting and distributing, under the control of a single operator. This has been illustrated in Figs. 1 to 26 and in other figures before described.

So also we may connect the keys at our keyboard with the matrix-releasing devices of two or more linotypes or other type-setting machines, by rock-shafts or other direct mechanical connections, as illustrated, for example, in Figs. 29, to 34; or through power-pneumatics, as illustrated, for example, in Figs. 21 to 27 and 36; or through electro-magnets, 101, 101, as illustrated in most of the other figures, and before described. This last mode of connecting the keys at the keyboard with the matrix-releasing devices, I consider to be preferable, in most cases, if not in all.

So also, with our duplex key-board, we may use quick-acting and slow-acting connections from the two sets of keys, which are controlled by the two hands respectively, to the matrix-releasing devices; or we may use two sets of matrices, one a quick-acting set and the other a slow-acting set, as illustrated, for example, in Fig. 37 and before described; or we may use both these things—the quick-acting and slow-acting connections, from the keys to the matrices, and the two sets of matrices, one quick-acting and the other slow-acting, as before described.

*Part three*

For cushioning the arresting of the assembling-elevator I, in its highest or its lowest position, or in both positions, a dash-pot, may be provided, which is a thing well known in the mechanical world for such purposes; or felted stops, that is, stops covered with thick felt, may be used, or any other means whatever that is suitable for the purpose may be used to cushion the shock of arresting the assembling-elevator.

I have before pointed out the fact that I consider it preferable to operate the assembling-elevator by means of a motor device, for example, a large electro-magnet 235, of the type shown in Fig. 10, and shown, also, for a magnet of the same type but serving a different function, and differently marked, in Figs. 6 to 8ᴮ; but also, I have pointed out that the assembling-elevator may be operated directly by the operator, substantially as is now done, by linotype operators. To facilitate this mode of working, it is desirable to locate the sending-up handle 450 at the right of the left-most machine and at the left of the right-most machine, and to extend one or more of these handles towards the key-board, so as to bring them within more convenient reach of the operator. Such an arrangement of the parts is illustrated in the patent to Bancroft No. 925,073, dated June 15, 1909, and also in my Fig. 44, in which 450, 450, are the sending-up handles of the two linotype machines, and 450ª, 450ª, are the rock-shafts to which these handles are attached, and which in turn are connected each to operate its assembling elevator by another rock-arm, on the shaft 450ª and by a link. The sending-up handle 450 and the rock-shaft 450ª, to which it is attached, are shown in my drawings, Figs. 35 and 44. But the other rock-arm and the other link aforesaid, for connecting the shaft 450ª with the assembling-elevator I, both of which are well known and in common use in the art, are not shown.

I have before explained the fact that it is desirable to locate the two linotypes in proximity to each other, and to my key-board, or to locate the key-board as close to each linotype, and particularly to its assembling elevator, as practicable, thereby to facilitate the operator's task of watching his machines and to make it easier for him to effect hand justification, when that is needed, and to correct transpositions and other errors, when there are any. One arrangement of the parts for this purpose is shown in Figs. 1, 2 and 45. in which the two linotypes are placed in line or nearly in line with each other (preferably, with one a little in front of the other) and as close together as practicable, and with my key-board 221 in front of the two machines, and about equi-distant from their assembling elevators.

But instead of placing the two linotypes in line, or nearly in line, with each other and just behind my key-board 221, said linotypes, as I have before explained, may be placed in any other position whatever with relation to each other and to the key-board 221, that is suitable for the purpose, but, preferably, in such a position of proximity to each other and to the key-board that the operator, while seated at the key-board, is as close as practicable to the assembling elevators, I, I, of the two machines, so that he can watch his machines to the best advantage and can make corrections and effect hand justification, when that is needed, in each machine, without leaving his key-board.

And an arrangement of this sort of the two linotypes, in proximity to each other and to my key-board, is shown in Fig. 44, in which, as I have before briefly explained, the two linotypes are disposed at an angle to each other, such that the sending-up handles 450, 450, are brought into proximity to my key-board 221 on opposite sides thereof, and such, also, that the assembling elevators, I, I, of the two machines are also brought into proximity to each other and to the key-board 221. A similar arrangement of the two linotypes (but in an apparatus of a different character) is illustrated in the patent to Bancroft aforesaid, No. 925,073, dated June 15, 1909.

The slugs or type-bars of the two linotypes, operated by my key-board, may be assembled in separate piles, as shown in Fig. 2, and these may afterwards be assembled in a common galley or in column-fashion, either—

(a) By hand, taking the slugs from the two piles alternately, and arranging them in order in the galley; or (b) They may be assembled by an automatic device into a common column or galley; or (c) Instead of assembling them in the first instance in separate piles and then subsequently assembling them in a common galley, they may be carried, in the first instance, by a conveying belt, to a common galley, much after the same fashion as that in which the matrices Y, Y, are assembled by Mergenthaler's matrix-carrying belt H, and his device for tapping them into position in the line. Apparatus of this sort is shown in the patent to Drewell 1,145,359, dated June 15, 1915, and also in my Fig. 45, in which 451, 451, are chutes attached each to one of the linotypes, at the place at which its type-bars or slugs are ejected, so that said type-bars are ejected into said chute. These chutes curve somewhat outward from the machine and run downward, and at their lower parts they curve, also, preferably, towards the right, so as to drop the matrices on to the assembling belt 452, which is moved in the direction of the arrow by the belt-wheel or pulley 453, which is keyed to the shaft 453ª. At its other end, the belt 452 passes over another pulley 454, which is supported by the shaft 454ª. Also, said belt may be supported by pulleys 455, 455, which are carried on shafts 455ª. Metal guides 456 and 457 direct the matrix into its place in the galley 458. 459 is the tapper or striker, centered at 459ª, which serves to tap the slugs or type-bars into place in the galley 458. To give movement to this tapper 459, a small cam 460 is attached fast to the shaft 453ª that gives movement to the matrix-carrying belt 452. And a cam-wheel 461, mounted at the outer end of the cam lever 462, whose other end, in turn, is attached fast to the same shaft 459ª, to which the tapper 459 is attached, oscillates said tapper, which in turn, propels the slugs or type-bars Y, Y, forward in the galley 458. And 462 is a casing, covering or frame-work which encloses the slug-assembling mechanism. The shaft 453ª, pulley 453, and slug-assembling belt 452, may be driven from the shafting of the linotype or by an electrical motor, or in any other suitable manner.

Assembling the slugs or the type-bars Y, Y, in separate piles or galleys in the two composing machines, as shown in Fig. 2, has this advantage, that it leaves each machine self-contained and operatable by itself, when required; that is, the two machines can be operated from the common key-board 221, or each can be operated, when so desired, by its own key-board in the usual way. The apparatus of Fig. 45, with the chutes 451, 451, attached to the several machines and feeding the slugs on to the assembling belt 452, has this advantage, that by it the slugs from the two machines are assembled in a common galley, in the first instance. On the other hand, until they are in some way disconnected from this common slug-assembling mechanism, the two machines are not susceptible of separate and independent use, each at the same time, as they are with the apparatus of Fig. 2.

The most of the subject matter disclosed in the present application was disclosed and claimed in my prior pending application aforesaid, No. 441,425, dated January 31, 1921. More specifically, all of the figures of the drawing herein, excepting Figs. 44 and 45, belong to the prior application aforesaid, and almost the whole, if not the whole, of this specification, preceding part three hereof, has been copied into this specification, but with some emendations and corrections, from the specification of the prior application aforesaid. And all of the claims herein, Nos. 1 to 79 inclusive, either were submitted in the prior application aforesaid, or might, consistently with the law and the practice of the Patent Office, have been submitted in said prior application. And this application, in so far as its subject matter was disclosed in said prior application, is a continuation of said prior application, No. 441,425, filed January 31, 1921. And that application was itself a continuation in part, of an earlier and then pending application of mine, No. 248,595, filed August 6, 1918, all as more fully stated in the specification and in the oath of the application aforesaid, No. 441,425, filed January 31, 1921.

While I have pointed out herein some of the many modifications and alternative constructions which may be used in practicing my invention, all this is by way of illustration and by way of giving to the public as full, clear and complete a description of the subject matter, as practicable. But it is to be understood that other engineers and designers, having a competent knowledge of the mechanical arts and particularly of the linotype and type-setting machine art, can make (and naturally will make) other variations in the mechanism for practicing my invention, without thereby departing from the essentials, or at least from certain of the essential features of my invention which have been before described and which are hereinafter claimed. And I wish it to be understood that I desire just and adequate protection for my invention and for all that is new with me and patentable herein; and that I do not desire or intend to dedicate or abandon any part of my invention to the public, but wish, on the contrary, to obtain full and adequate protection for the same, during the time provided by law.

With this end in view, what I claim and desire to secure by Letters Patent hereunder is:—

1. A type-composing apparatus including, in combination, (a) a key-board, normally fixed in its position in the machine; (b) a plurality of type-composing machines, connected with said key-board and normally operated therefrom successively, one machine at a time, each machine as required, so as to set successive lines of the same column or page on the machines aforesaid successively; and (c) means, operatable by the operator, while seated at the key-board aforesaid for giving movement to the line-delivering devices of the type-composing machines aforesaid, each line-delivering device as required; whereby a single operator is enabled to operate a plurality of type-composing machines, setting successive lines of type on the machines aforesaid successively.

2. A type-composing apparatus including, in combination, (a) a key-board, normally fixed in its position in the machine; (b) a plurality of type-composing machines, normally set to substantially the same measure and having type of substantially the same face, connected with said key-board and operated therefrom successively, one machine at a time, each machine as required; whereby facility is afforded for setting successive lines of type on the several composing machines aforesaid, in due serial order; the first line of type being set on one of the machines aforesaid; the second line of type being set on another of said machines; and so on, successively, substantially as before described; and (c) means connected with the key-board aforesaid, for giving movement to the line-delivering devices of the type-composing machines aforesaid, each line-delivering device as required; whereby a single operator is enabled to operate a plurality of type-composing machines, setting successive lines of type of the same column or page on the composing machines aforesaid successively.

3. A type-composing apparatus including, in combination, (*a*) a key-board, normally fixed in its position in the machine; (*b*) a plurality of type-composing machines; (*c*) power-devices at each of these type-composing machines, connected to operate the type-delivering devices of said machines; the power-devices before mentioned of the type-composing machines aforesaid being normally operated from the key-board aforesaid successively, one machine at a time, each machine as required; and (*d*) means, operatable by the operator, while seated at the key-board aforesaid, for giving movement to the line-delivering devices of the type-composing machines aforesaid, each line-delivering device as required; whereby a single operator is enabled to operate a plurality of type-composing machines, normally setting successive lines of the same column or page on the machines aforesaid successively.

4. A type-composing apparatus including, in combination, (*a*) a keyboard, normally fixed in its position in the machine; (*b*) a plurality of type-composing machines, normally set to substantially the same measure and having type of substantially the same face; (*c*) power devices at each of these composing machines, connected to operate the type-delivering devices of such machine; the power devices of the type-composing machines aforesaid being operated from the key-board aforesaid successively, one machine at a time, each machine as required; whereby facility is afforded for setting the successive lines of type on the machines aforesaid, in due serial order, substantially as before described; and (*d*) means connected with the key-board aforesaid, for giving movement to the line-delivering devices of the type-composing machines aforesaid, each line-delivering device as required; whereby a single operator is enabled to operate a plurality of composing machines, normally setting successive lines of the same column or page on the machines aforesaid successively.

5. A type-composing apparatus including, in combination, (*a*) a key board; (*b*) a plurality of type-composing machines; (*c*) electrically-operated connections from the key-board aforesaid to the type-composing machines aforesaid; said electrically-operated connections serving to control the type-delivering devices of said type-composing machines each machine as required; whereby facility is afforded to the operator for setting sucessive lines of type, on the type-composing machines aforesaid, in due serial order, substantially as before described; and (*d*) means, operatable by the operator, while seated at the key-board aforesaid, for giving movement to the line-delivering devices of the type-composing machines aforesaid, each line-delivering device as required; whereby a single operator is enabled to operate a plurality of type-composing machines, normally setting successive lines of the same column or page on the machines aforesaid successively.

6. A type-composing apparatus including, in combination (*a*) a key-board; (*b*) a plurality of type-composing machines; (*c*) electro magnets, connected with each of these type-composing machines, to operate the type-delivering devices thereof; (*d*) switches, for controlling the circuits of said electro-magnets; the keys at the key-board aforesaid serving to operate said switches; whereby the type-composing machines aforesaid are operated from the key-board aforesaid and facility is afforded to the operator to set successive lines of type on the type-composing machines aforesaid, in due serial order, substantially as before described; and (*e*) means, connected with the key-board aforesaid, for giving movement to the line-delivering devices of the type-composing machines aforesaid, each line-delivering device as required; whereby a single operator is enabled to operate a plurality of type-composing machines.

7. A type-composing apparatus including, in combination, (*a*), a key-board, normally fixed in its position in the machine; (*b*) a plurality of type-composing machines, connected with said key-board and operated therefrom successively, one machine at a time, each machine as required, said type-composing machines operating normally to set successive lines of type; one line with one machine and the next line with another machine; said type-composing machines being each furnished with type-delivering devices for the individual type, to be assembled into a line, and with a line-delivering device for the assembled line of type; and (*c*) means, operatable by the operator while seated at the key-board aforesaid, for giving movement to the line-delivering devices of the type-composing machines aforesaid, each line-delivering device as required; whereby a single operator is enabled to operate a plurality of type-composing machines normally setting successive lines of type on said composing machines successively.

8. A type-composing apparatus, including, in combination, (*a*) a key-board, normally fixed in its position in the machine; (*b*) a plurality of type-composing machines; (*c*) shiftable connections, whereby said type-composing machines are connected with the key-board aforesaid successively, one machine at a time, each machine as required; said type-composing machines operating normally to set successive lines of type, one line with one machine and the next line with another machine; said type-composing machines being each furnished with the type-delivering devices for the individual type to be assembled into a line, and with a line-delivering device for the assembled line of type; and (*d*) means, operatable by the operator while seated at the key-board aforesaid, for giving movement to the line-delivering devices of the type-composing machines aforesaid, each line-delivering device as required; whereby a single operator is enable to operate a plurality of type-composing machines, normally setting successive lines of type on said composing machines successively.

9. A type-composing apparatus including, in combination (*a*) a key-board; (*b*) a plurality of type-composing machines, connected with said key-board and operated therefrom successively, one machine at a time, each machine as required; said type-composing machines operating normally to set successive lines of type, one line with one machine and the next line with another machine; said type-composing machines each having a magazine of type, arranged to fall by gravitation, when released, and escapement devices for releasing said type, each type as required; said composing machines being each furnished with a line-delivering device for the assembled line of type; and (*c*) means, operatable by the operator while seated at the key-board aforesaid, for giving movement to the line-delivering devices of the type-composing machines aforesaid, each line-delivering device as required; whereby a single operator is enabled to operate a plurality of the type-composing machines aforesaid, normally setting successive lines of type on said composing mechanisms successively.

10. A type-composing apparatus, including in combination (*a*) a key-board; (*b*) two type-composing machines, connected with said keyboard and normally operated therefrom alternately, one machine at a time, each machine in its turn, so that alternate lines of type are normally set on the two machines aforesaid alternately; said type-composing machines each having gravitationally-acting type-delivering devices, and a line-delivering device for delivering the assembled line of type; and (*c*) means, operatable by the operator while seated at the key-board aforesaid, for giving movement to the line-delivering devices of the type-composing machines aforesaid, each line-delivering device as required; whereby a single operator is enabled to operate the two composing machines aforesaid and to set alternate lines of type on said composing machines alternately.

11. The combination of (*a*) a plurality of type-composing machines, normally set to substantially the same measure and having type of substantially the same face, and serving normally for the setting of the lines of type successively, one line with one type-composing machine and the next line with another type-composing machine; said type-composing machines operating one at a time, each in its turn, to set a line of type; said type-composing machines being each furnished with type-delivering devices for the individual type, which are to be assembled into a line, and with a line-delivering device for the assembled lines of type (*b*) a key-board, normally fixed in its position, and connections from said key-board to operate the type-delivering devices of the type-composing machines aforesaid, successively, for successive lines of type and (*c*) means, connected with the key-board aforesaid, for giving movement to the line-delivering devices of the type-composing machines aforesaid, each line-delivering device as required; whereby a single operator is enabled to operate a plurality of type-composing machines, setting successive lines of type of the same column or page with said machines successively.

12. A type-composing apparatus including, in combination, (*a*) a key-board; (*b*) a plurality of type-composing machines, normally set to substantially the same measure and having type of substantially the same face; said type-composing machines being connected with, and operated from the key-board aforesaid successively, one machine at a time, each machine as required; said type-composing machines operating normally to set successive lines of type, one line with one machine and the next line with another machine; said type-composing machines each having a magazine of type arranged to fall by gravitation, when released, and escapement devices for releasing said type, each type as required; said composing machines being each furnished with a line-delivering device for the assembled line of type and (*c*) means, operatable by the operator while seated at the key-board aforesaid, for giving movement to the line-delivering devices of the type-composing machines aforesaid, each line-delivering device as required; whereby a single operator is enabled to operate the type-composing machines aforesaid, setting alternate lines of type of the same column or page on said composing machines alternately.

13. The combination of (*a*) a plurality of type-composing machines, each furnished with type-delivering devices for the individual type, to be assembled into a line, and a line-delivering device, for the assembled line of type; (*b*) electro-magnets for operating the type-delivering devices of the type-composing machines aforesaid; (*c*) a key-board; (*d*) switches, operated by the keys of the key-board aforesaid, for controlling the circuits of the electro-magnets, before mentioned as serving to operate the type-delivering devices of the type-composing machines aforesaid; (*e*) shiftable electrical connections whereby the key-board aforesaid is connected now with the type-delivering device-operating electro-magnets of one of the type-composing machines aforesaid, and now with the type-delivering device-operating electro-magnets of another of said type-composing machines, with each type-composing machine as required; and (*f*) means, operatable by the operator, while seated at the key-board aforesaid, for giving movement to the line-delivering devices of the type-composing machines aforesaid, each as required; whereby a single operator is enabled to operate a plurality of type-composing machines, setting successive lines of type of the same column or page on the composing machines aforesaid successively.

14. A type-composing apparatus including, in combination, (*a*) a key-board; (*b*) two circulation machines each having a magazine of type, arranged to fall by gravitation, when released, and escapement devices for releasing said type, each type as required; said machines being connected alternately with the key-board aforesaid and operated alternately therefrom, one machine at a time, each machine in its turn; said machines operating normally to set alternate lines of type; the first, third, fifth, etcetera, lines being set on one machine, and the second, fourth, sixth, etcetera, lines being set on the other machine; and (*c*) means, operatable by the key-board operator, while seated at the key-board aforesaid, for sending up the lines on the two circulation machines aforesaid, on each machine as required; whereby one operator is enabled to operate the two machines aforesaid, setting alternate lines of type of the same column or page on the two machines aforesaid alternately, and whereby the same operator who sets the type, sends up the line of type when set.

15. A type-composing apparatus including, in combination, (*a*) a key-board; and (*b*) two circulation machines, each having a magazine of type, arranged to fall by gravitation, when released and escapement devices for releasing said type, each type as required; said machines being located in proximity to the key-board aforessaid, and connected alternately with and operated alternately from said key-board, one machine at a time, each machine in its turn; said machines being normally set to substantially the same measure and having type of substantially the same face and operating normally to set alternate lines of type of the same column or a page; and (*c*) means, operatable by the key-board operator, while seated at the key-board aforesaid, for sending up the lines on the two circulation machines aforesaid, on each machine as required; the whole constituting a duplex type-composing apparatus, organized in such a manner as to permit the operator to set the alternate lines of type on the two circulation machines aforesaid alternately; whereby he sets, in general, the first, third, fifth, etcetera, lines on one of the two circulation machines aforesaid, and the second, fourth, sixth, etcetera, lines on the other one of the two circulation machines aforesaid; and whereby the same operator who sets the type, sends up the line of type, when set.

16. A type-composing apparatus, including, in combination, (*a*) a plurality of circulation machines, having type of substantially the same face; each of said circulation machines being furnished with type-delivering devices, for the individual type, to be assembled into a line, and a line-delivering device, for the assembled lines of type; (*b*) electro-magnets for operating the type-delivering devices of the circulation machines aforesaid; (*c*) a key-board; (*d*) switches, operated by the keys of the key-board aforesaid, and serving to control the circuits of the electro-magnets before mentioned as serving to operate the type-delivering devices of the circulation machines aforesaid; (*e*) shiftable electrical connections, whereby the keys of the key-board aforesaid are connected now with the electro-magnets that operate the type-delivering devices of one of the circulation machines aforesaid and now with the electro-magnets that operate the type-delivering devices of another of said circulation machines, as required; so that facility is afforded to the operator to set the successive lines of type on the circulation machines aforesaid in a serial order, substantially as before described; and (*f*) means, operated by the operator, while seated at the key-board aforesaid, for giving movement to the line-delivering devices of the circulation machines aforesaid; each line-delivering device as required; whereby a single operator is enabled to operate a plurality of circulation machines.

17. A type-composing appaatus including, in combination, (*a*) two type-composing machines, each having type-delivering devices; (*b*) two sets of power devices, connected to operate the type-delivering devices of the two machines aforesaid, respectively; (*c*) a key-board, normally fixed in its position in the machine and having keys for operating the power devices before mentioned, and through them the type-delivering devices, aforesaid; (*d*) means, whereby the keys of the key-board aforesaid are connected alternately with the power devices of the two composing machines aforesaid, now with the power-devices of the one machine, and then with the power devices of the other machine, so as to set alternate lines of type of the same column or page on the two machines aforesaid, respectively; and (*e*) means operatable by the key-board operator, while seated at the key-board aforesaid, for sending up the lines of type on the two composing machines aforesaid, on each machine as required.

18. A type-composing apparatus including, in combination, (*a*) two type-composing machines, each having a magazine of type arranged to fall, by gravitation, when released, and escapement devices for releasing said type, each type as required; (*b*) two sets of power devices, connected to operate the escapement devices of the two machines aforesaid respectively; (*c*) a key-board, having keys for operating the power device before mentioned, and through them the type escapement devices before mentioned; (*d*) means, whereby the keys of the key-board aforesaid are connected alternately with the power devices of the two composing machines aforesaid, now with the power-devices of the one machine, and then with the power devices of the other machine, so as to normally set alternate lines of type of the same column or page on the two machines aforesaid, respectively; and (*e*) means operatable by the key-board operator, while seated at the key-board aforesaid, for sending up the lines of type on the two composing machines aforesaid, on each machine as required.

19. A type-composing apparatus including, in combination (*a*) two type-composing machines, each having a magazine of type arranged to fall by gravitation, when released, and escapement devices for releasing said type, each type as required; said composing machines being normally set to substantially the same measure and having type of substantially the same face and normally operating one at a time, each in its turn, to set alternate lines of type, the first, third, fifth, etcetera lines of a column or page being set with one machine and the second, fourth, sixth, etcetera lines of the same column or page being set with the other machine, and (*b*) two sets of power devices, connected to operate the escapement devices of the two machines aforesaid, respectively; (*c*) a key-board, having keys for operating the power devices before mentioned, and through them the escapement device, before mentioned; (*d*) means, whereby the keys of the key-board aforesaid are connected alternately with the power devices of the two composing machines aforesaid, now with the power-devices of the one machine, and then with the power devices of the other machine, so as to set alternate lines of type on the two machines aforesaid, respectively; and (*e*) means operatable by the key-board operator, while seated at the key-board aforesaid, for sending up the lines of type in the two composing machines aforesaid, on each machine as required.

20. A type-composing apparatus including, in combination (*a*) a key-board; (*b*) two type-composing machines, located in such proximity to the key-board aforesaid that facility is afforded to the key-board operator, while seated at his key-board, to watch the two composing machines aforesaid and to correct transpositions and to effect hand justification, in each machine, when necessary, while seated at the key-board; said machines each having a magazine of type, arranged to fall by gravitation when released, and escapement devices for releasing said type, each type as required; and (*c*) means whereby said composing machines are connected alternately with the key-board aforesaid and operated alternately therefrom, one machine at a time, each machine in its turn; said machines operating normally to set alternate lines of type; the first, third, fifth, etcetera, lines of a column or page being set on to one of the machine aforesaid and the second, fourth, sixth, etcetera, lines of the same column or page aforesaid being set on the other machine aforesaid; whereby one operator is enabled to operate the two composing machines aforesaid, and to set alternate lines of type on said machines alternately.

21. A type-composing apparatus including, in combination (*a*) a key-board; (*b*) two type-composing machines located, one at the right and the other at the left of the key-board aforesaid, in such proximity to said key-board that facility is afforded to the key-board operator, while seated at his key-board, to watch the two composing machines aforesaid and to correct transpositions and to effect hand justification in each machine, when necessary while seated at the key-board; said machines each having a magazine of type, arranged to fall by gravitation, when released, and escapement devices for releasing said type, each type as required; and (*c*) means, whereby the said composing machines are connected alternately with the key-board aforesaid, and operated alternately therefrom, one machine at a time, each machine in its turn; said machines operating normally to set alternate lines of type; the first, third, fifth, etcetera lines of a column or page being set on one of the machines aforesaid and the second, fourth, sixth, etcetera lines of the same column or page aforesaid being set on the other machine aforesaid; whereby one operator is enabled to operate the two composing machines aforesaid, so as to set alternate lines of type on said machines alternately.

22. A type-composing apparatus including, in combination (*a*) a key-board; (*b*) two type-composing machines, located in such proximity to the key-board aforesaid that facility is afforded to the key-board operator, while seated at his key-board to watch the two composing machines aforesaid and to correct transpositions and to effect hand justification, in each machine, when necessary, while seated at the key-board; said machines each having a magazine of type, arranged to fall by gravitation, when released, and escapement devices for releasing said type, each type as required; (c) means, whereby the said composing machines are connected alternately with the key-board aforesaid and operated alternately therefrom, one machine at a time, each machine in its turn; said machines operating normally to set alternate lines of type; the first, third, fifth, etcetera, lines of a column or page being set on one of the machines aforesaid and the second, fourth, sixth, etcetera, lines of the same column or page aforesaid being set on the other machine aforesaid; and (d) means, operatable by the key-board operator, while seated at the key-board aforesaid, for sending up the lines on the two composing machines aforesaid, on each machine as required; whereby one operator is enabled to operate the two composing machines aforesaid, and whereby the same operator who sets the type, sends up the line of type, when set.

23. A type-composing apparatus including, in combination, (a) a key-board; (b) two type-composing machines, located in such proximity to the key-board aforesaid that facility is afforded to the key-board operator, while seated at his key-board to watch the two composing machines aforesaid and to correct transpositions and to effect hand justification in each machine, when necessary, while seated at the key-board; said machines each having a magazine of type arranged to fall, by gravitation, when released, and escapement devices for releasing said type, each type as required; said machines being normally set to substantially the same measure and having type of substantially the same face; and (c) means, whereby the said composing machines are connected alternately with the key-board aforesaid, and operated alternately therefrom, one machine at a time, each machine in its turn; said machines operating normally to set alternate lines of type; the first, third, fifth, etcetera, lines of a column or page being set on one of the machines aforesaid and the second, fourth, sixth, etcetera lines of the column or page aforesaid being set on the other machine aforesaid; whereby one operator is enabled to operate the two composing machines aforesaid and to set alternate lines of type of said machines alternately.

24. A type-composing apparatus including, in combination (a) a key-board; (b) two type-composing machines, located one at the right and the other at the left of the key-board aforesaid, in such proximity to said key-board that facility is afforded to the key-board operator, while seated at his key-board, to watch the two composing machines aforesaid and to correct transpositions and to effect hand justification in each machine, when necessary, while seated at the key-board; said machines each having a magazine of type arranged to fall by gravitation, when released, and escapement devices for releasing said type, each type as required; said machines being normally set to substantially the same measure and having type of substantially the same face; and (c) means, whereby the said composing machines are connected alternately with the key-board aforesaid, and operated alternately therefrom, one machine at a time, each machine in its turn; said machines operating normally to set alternate lines of type; the first, third, fifth, etcetera, lines of a column or page being set on one of the machines aforesaid and the second, fourth, sixth, etcetera, lines of the column or page aforesaid being set on the other machine aforesaid; whereby one operator is enabled to operate the two composing machines aforesaid, and to set alternate lines of type on said machines alternately.

25. A type-composing apparatus including, in combination (a) a key-board; (b) two type-composing machines, located in such proximity to the key-board aforesaid that facility is afforded to the key-board operator, while seated at his key-board, to watch the two composing machines aforesaid and to correct transpositions and to effect hand justification in each machine, when necessary, while seated at the key-board; said machines each having a magazine of type arranged to fall, by gravitation, when released, and escapement devices for releasing said type, each type as required; said machines being normally set to substantially the same measure and having type of substantially the same face; and (c) means, whereby the said composing machines are connected alternately with the key-board aforesaid, and operated alternately therefrom, one machine at a time, each machine in its turn; said machines operating normally to set alternate lines of type; the first, third, fifth, etcetera, lines of a column or page being set on one of the machines aforesaid, and the second, fourth, sixth, etcetera, lines of the same column or page being set on the other machine aforesaid; and (d) means operatable by the key-board operator, while seated at the key-board aforesaid, for sending up the lines on the two composing machines aforesaid, on each machine as required; whereby one operator is enabled to operate the two machines aforesaid and whereby the same operator who sets the type, sends up the line of type when set.

26. A type-composing apparatus including, in combination (a) a key-board; (b) two type-composing machines, located in such proximity to the key-board aforesaid that facility is afforded to the operator, while seated at his key-board, to watch the two composing machines aforesaid, and to correct transpositions, and to effect hand justification, in each machine, when necessary; (c) electro-magnets, connected to operate the type-delivering devices of the two type-composing machines aforesaid; (*d*) switches, for controlling the circuits of the electro-magnets aforesaid; the keys at the key-board aforesaid, serving to operate said switches; whereby the two composing machines aforesaid are operated from the key-board aforesaid, each machine as required; the whole constituting a duplex type-composing apparatus, organized in such a manner as to permit the operator to set alternate lines of type on the two composing machines aforesaid, alternately; so that he sets, in general, the first, third, fifth, etcetera, lines on one of the two composing machines aforesaid, and the second, fourth, sixth, etcetera lines on the other one of the two composing machines aforesaid.

27. A type-composing apparatus including, in combination (*a*) a key-board; (*b*) two type-composing machines, located one at the right and the other at the left of the key-board aforesaid, in such proximity to said key-board that facility is afforded to the operator, while seated at his key-board, to watch the two composing machines aforesaid and to correct transpositions, and to effect hand justification in each machine, when necessary; (*c*) electro-magnets, connected to operate the type-delivering devices of the two type-composing machines aforesaid; (*d*) switches, for controlling the circuits of the electro-magnets aforesaid; the keys at the key-board aforesaid, serving to operate said switches; whereby the two composing machines aforesaid are operated from the key-board aforesaid, each machine as required; the whole constituting a duplex type-composing apparatus, organized in such a manner as to permit the operator to set alternate lines of type on the two composing machines aforesaid, alternately; so that he sets, in general, the first, third, fifth, etcetera, lines on one of the two composing machines aforesaid, and the second, fourth, sixth, etcetera, lines on the other one of the two composing machines aforesaid.

28. A type-composing apparatus including, in combination, (*a*) a key-board; (*b*) two type-composing machines; (*c*) electro-magnets, connected to operate the type-delivering devices of the two type-composing machines aforesaid; (*d*) switches, for controlling the circuits of the electro-magnets aforesaid; the keys at the key-board aforesaid serving to operate said switches; whereby the two composing machines aforesaid are operated from the key-board aforesaid, each machine as required; and (*e*) means, operatable by the operator, while seated at the key-board aforesaid, for sending up the lines on the two composing machines aforesaid, on each machine as required; the whole constituting a duplex type-composing apparatus, organized in such a manner as to permit the operator to set the alternate lines of type on the two composing machines aforesaid alternately; so that he sets, in general, the first, third, fifth, etcetera, lines on one of the two composing machines aforesaid, and the second, fourth, sixth, etcetera lines on the other one of the two composing machines aforesaid, and whereby the same operator who sets the type, sends up the line of type, when set.

29. A type-composing apparatus including, in combination, (*a*) a key-board; (*b*) two type composing machines of the circulation variety, located in such proximity to the key-board aforesaid that facility is afforded to the operator while seated at his key-board, to watch the two composing machines aforesaid and to correct transpositions and to effect hand justification in each machine, when necessary, while seated at the key-board, said composing machines each having a magazine of type arranged to fall by gravitation when released, and escapement devices for releasing said type; and (*c*), shiftable connections between said key-board and said composing machines, whereby said key-board is connected now with one of the composing machines aforesaid and now with the other; the whole constituting a duplex type-composing apparatus, organized in such a manner as to permit the operator to set the alternate lines of type on the two composing machines aforesaid alternately; so that he sets, in general, the first, third, fifth, etcetera lines on one of the two composing machines aforesaid, and the second, fourth, sixth, etcetera lines on the other one of the two composing machines aforesaid.

30. A type-composing apparatus including, in combination, (*a*) a key-board; (*b*) two type-composing machines of the circulation variety, located, one at the right and the other at the left of the key-board aforesaid, in such proximity to said key-board that facility is afforded to the key-board operator, while seated at his key-board, to watch the two composing machines aforesaid and to correct transpositions and to effect hand justification in each machine, when necessary, while seated at the key-board; and (*c*) shiftable connections between said key-board and said composing machines, whereby said key-board is connected now with one of the composing machines aforesaid, and now with the other; the whole constituting a duplex type-composing apparatus, organized in such a manner as to permit the operator to set the alternate lines of type on the two composing machines aforesaid alternately; so that he sets, in general, the first, third, fifth, etcetera, lines of a column or page on one of the two composing machines aforesaid, and the second, fourth, sixth, etcetera, lines of the same column or page aforesaid on the other one of the two composing machines aforesaid.

31. A type-composing apparatus including, in combination, (*a*), a key-board; (*b*) two type-composing machines of the circulation variety; (*c*) shiftable connections between said key-board and said composing machines whereby said key-board is connected now with one of the composing machines aforesaid and now with the other; and (*d*) means, operatable by the key-board operator, while seated at the key-board aforesaid, for sending up the lines on the two composing machines aforesaid, on each machine as required; the whole constituting a duplex type-composing apparatus, organized in such a manner as to permit the operator to set alternate lines of type on the two composing machines aforesaid, alternately; so that he sets, in general, the first, third, fifth, etcetera, lines of a column or page on one of the two composing machines aforesaid, and the second, fourth, sixth, etcetera lines of the same column or page aforesaid, on the other one of the two composing machines aforesaid, and whereby the same operator who sets the type, sends up the line of type, when set.

32. A type-composing apparatus including, in combination (*a*) two type-composing machines, each furnished with type-delivering devices; (*b*) electro-magnets for operating said type-delivering devices; (*c*) a key-board for operating the electro-magnets of the two type-composing machines aforesaid, each machine as required; said composing machines being located in such proximity to the key-board aforesaid that facility is afforded to the operator, while seated at his keyboard, to watch the two composing machines aforesaid and to correct transpositions and to effect hand justification in each machine, when required, while seated at the key-board; and (*d*) shiftable connections between said key-board and the electro-magnets aforesaid, belonging to the two composing machines aforesaid, respectively; whereby said key-board is connected now with the type-delivering-device-operating electro-magnets of one of the two composing machines aforesaid and now with the type-delivering-device-operating electro-magnets of the other one of the two composing machines aforesaid; the whole constituting a duplex type-composing apparatus, organized in such a manner as to permit the operator to set the alternate lines of type on the two composing machines aforesaid alternately; so that he sets, in general, the first, third, fifth, etcetera lines of a column or page, on one of the two composing machines aforesaid, and the second, fourth, sixth, etcetera, lines of the same column or page aforesaid on the other one of the two composing machines aforesaid.

33. A type-composing apparatus including, in combination, (*a*) two type-composing machines, each furnished with type-delivering devices; (*b*) electro-magnets for operating said type-delivering devices; (*c*) a key-board for operating the electro-magnets of the two composing machines aforesaid, each machine as required; said composing machines being located one at the right and the other at the left of the key-board aforesaid, in such proximity to said key-board that facility is afforded to the operator, while seated at his key-board, to watch the two composing machines aforesaid and to correct transpositions and to effect hand justification in each machine when required; while seated at the key-board; and (*d*) shiftable connections between said key-board and the electro-magnets aforesaid, belonging to the two composing machines aforesaid, respectively; whereby said key-board is connected now with the type-delivering electro-magnets of one of the two composing machines aforesaid and now with the type-delivering electro-magnets of the other one of the two composing machines aforesaid; the whole constituting a duplex type-composing apparatus, organized in such a manner as to permit the operator to set the alternate lines of type on the two composing machines aforesaid alternately; so that he sets, in general, the first, third, fifth, etcetera, lines of a column of page on one of the two composing machines aforesaid, and the second, fourth, sixth, etcetera lines of the same column or page on the other one of the two composing machines aforesaid.

34. A type-composing apparatus including, in combination (*a*) two type-composing machines, each furnished with type-delivering devices; (*b*) electro-magnets for operating said type-delivering devices; (*c*) a key-board for operating the two type-composing machines aforesaid, each machine as required; and (*d*) shiftable conenctions between said key-board and the electro-magnets belonging to the two composing machines aforesaid respectively, whereby said key-board is connected now with the type-delivering-device-operating electro-magnets of one of the two composing machines aforesaid and now with the type-delivering-device-operating electro-magnets of the other one of the two composing machines aforesaid; and (*e*) means, operatable by the key-board operator, while seated at the key-board aforesaid, for sending up the line on the two composing machines aforesaid, on each machine as required; the whole constituting a duplex type-composing apparatus, organized in such a manner as to permit the operator to set alternate lines of type on the two composing machines aforesaid, alternately; so that he sets, in general, the first, third, fifth, etcetera, lines of a column or page on one of the two composing machines aforesaid, and the second, fourth, sixth, etcetera, lines of the same column or page aforesaid on the other one of the two composing machines aforesaid; and whereby the same operator who sets the line of type, sends it up, also, when set.

35. A type-composing apparatus, including in combination (a) a key-board, normally fixed in its position in the machine; (b) two type-composing machines, located in such proximity to the key-board aforesaid that facility is afforded to the operator, while seated at his key-board, to watch the two composing machines aforesaid, and to correct transpositions and to effect hand justification in each machine, when required, while seated at the key-board; and (c) connections from the key-board to the two machines aforesaid, whereby said machines are operated from said key-board alternately, one machine at a time, each machine in its turn; said machines operating normally to set alternate lines of type; the first, third, fifth, etcetera lines of type of a column or page being set normally with one of the machines aforesaid, and the second, fourth, sixth, etcetera, lines of the same column or page aforesaid being set with the other one of said machines.

36. A type-composing apparatus, including in combination (a) a key-board, normally fixed in its position in the machine; (b) two type-composing machines, located one at the right and the other at the left of the key-board aforesaid, in such proximity to said key-board that facility is afforded to the operator, while seated at his key-board, to watch the two composing machines aforesaid, and to correct transpositions and to effect hand justification in each machine, when required, while seated at the key-board; (c) connections from the key-board to the two machines aforesaid, whereby said machines are operated from said key-board alternately, one machine at a time, each machine in its turn; said machines operating normally to set alternate lines of type; the first, third, fifth, etcetera, lines of type of a column or page being set normally with one of the machines aforesaid and the second, fourth, sixth, etceteral, lines of the same column or page aforesaid being set with the other one of said machines.

37. A type-composing apparatus, including in combination, (a) a key-board, normally fixed in its position in the machine; (b) two type-composing machines, located in such proximity to the key-board aforesaid that facility is afforded to the operator, while seated at his key-board, to watch the two composing machines aforesaid, and to correct transpositions and to effect hand justification in each machine, when required, while seated at the key-board; (c) connections from the key-board to the two machines aforesaid, whereby said machines are operated from said key-board alternately, one machine at a time, each machine in its turn; said machines operating normally to set alternate lines of type, the first, third, fifth, etcetera, lines of type being set normally with one of the machines aforesaid, and the second, fourth, sixth, etcetera, lines with the other one of said machines; and (d) means operatable by the operator while seated at the key-board aforesaid, for giving movement to the line-delivering devices of the two composing machines aforesaid, each machine as required; whereby a single operator is enabled to operate the two machines aforesaid, setting alternate lines of type on said machines alternately; and whereby the same operator who assembles the type sends up the line of type, when it has been assembled.

38. In combination (a) two type-composing machines, each provided with type-delivering devices; (b) electro-magnets, connected to operate the type-delivering devices of the type-composing machines aforesaid; (c) a key-board; (d) switches, operated by the keys of the key-board aforesaid and serving to control the circuits of the type-delivering-device-operating electro-magnets aforesaid; the parts aforesaid being constructed, arranged and connected in such a manner that they afford facility to the operator to set alternate lines of type on the two composing machines aforesaid alternately; so that he sets, in general, the first, third, fifth, etcetera, lines of type of a column or page on one of the two composing machines aforesaid and the second, fourth, sixth, etcetera, lines of type of the same column or page aforesaid on the other one of the two composing machines aforesaid; said type-composing machines being located in such proximity to each other and to the key-board aforesaid that facility is afforded to the operator, while seated at the key-board aforesaid, to watch the two composing machines aforesaid and to correct transpositions and to effect hand justification, in each machine when needed.

39. In combination (a) two type-composing machines, each provided with type-delivering devices; (b) electro-magnets, connected to operate the type-delivering devices of the type-composing machines aforesaid; (c) a key-board; (d) switches, operated by the keys of the key-board aforesaid and serving to control the circuits of the type-delivering-device-operating electro-magnets aforesaid; the parts aforesaid being constructed, arranged and connected in such a manner that they afford facility to the operator to set alternate lines of type on the two composing machines aforesaid alternately; so that he sets, in general, the first, third, fifth, etcetera, lines of type of a column or page on one of the two composing machines aforesaid and the second, fourth, sixth, etcetera, lines of type of the same column or page aforesaid on the other one of the two composing machines aforesaid; said type-composing machines being located in such proximity to each other and to the key-board aforesaid, that facility is afforded to the operator, while seated at the key-board aforesaid, to watch the two type-composing machines aforesaid and to correct transpositions and to effect hand justification, in each machine, when needed; and (*e*) means, operatable by the operator, while seated at the key-board aforesaid, for giving movement to the line-delivering devices of the type-composing machines aforesaid, each line-delivering device as required.

40. In combination, (*a*) a key-board; (*b*) two type-composing machines, located in such proximity to the key-board aforesaid, that facility is afforded to the operator, while seated at the key-board aforesaid, to watch the two type-composing machines aforesaid, and to correct transpositions and to effect hand justification, while seated at his key-board; the type-composing machines aforesaid, each having a magazine of type, arranged to fall by gravitation when released; and escapement devices for releasing said type, each type as required; and (*c*) shiftable connections between the key-board and the type-composing machines aforesaid, whereby said key-board is connected, now with one of the two type-composing machines aforesaid, and now with the other one of the two type-composing machines aforesaid; said machines normally operating to set alternate lines of type; the first, third, fifth, etcetera, lines of type of a column or page being normally set on one of said composing machines, and the second, fourth, sixth, etcetera, lines of the same column or page aforesaid being set on the other one of said composing machines.

41. In combination (*a*) a key-board; (*b*) two type-composing machines located one at the right, and the other at the left of the key-board aforesaid, and in such proximity to said key-board that facility is afforded to the operator, while seated at the key-board aforesaid, to watch the two type-composing machines aforesaid, and to correct transpositions and to effect hand justification, while seated at his key-board; the type-composing machines aforesaid, each having a magazine of type, arranged to fall by gravitation when released; and escapement devices for releasing said type, each type as required; and (*c*) shiftable connections between the key-board and the type-composing machines aforesaid, whereby said key-board is connected, now with one of the two type-composing machines aforesaid, and now with the other; said machines normally operating to set alternate lines of type; the first, third, fifth, etcetera, lines of type of a column or page being normally set on one of said composing machines, and the second, fourth, sixth, etcetera, lines of the same column or page aforesaid being set on the other one of said composing machines.

42. In combination (*a*) two type-composing machines; (*b*) a key-board; (*c*) shiftable connections between said key-board and said type-composing machines, whereby said key-board is connected now with one of the two composing machines aforesaid and now with the other one of the said two composing machines and whereby facility is afforded to the operator to set alternate lines of type on the two composing machines aforesaid alternately; the type-composing machines aforesaid, each having a magazine of type, arranged to fall by gravitation when released; and escapement devices for releasing said type, each type as required; said key-board and said type-composing machines being located in such proximity to each other that facility is afforded to the operator, while seated at the key-board aforesaid, to watch the two type-composing machines aforesaid and to correct transpositions and to effect hand justification, in each machine, when needed; and (*d*) means, operatable by the operator, while seated at the key-board aforesaid, for giving movement to the line-delivering devices of the type-composing machines aforesaid, to each line-delivering device, as required.

43. In combination, (*a*) two type-composing machines; (*b*) electro-magnets, connected to operate the type-delivering devices of the type-composing machines aforesaid, respectively; (*c*) a key-board; and (*d*) shiftable electrical connections between the keys of the key-board aforesaid and the type-delivering electro-magnets of the two composing machines aforesaid; whereby said key-board is connected now with one of the two type-composing machines aforesaid and now with the other one of said two composing machines, so that facility is afforded to the operator to set alternate lines of type on the two composing machines aforesaid alternately; he setting, in general, the first, third, fifth, etcetera, lines of type on one of the two composing machines aforesaid and the second, fourth, sixth, etcetera, lines of type on the other one of the two composing machines aforesaid; said key-board and said type-composing machines being located in such proximity to each other that facility is afforded to the operator, while seated at the key-board aforesaid, to watch the two composing machines aforesaid and to correct transpositions and to effect hand justification, in each machine, when needed.

44. In combination, (*a*) two type-composing machines; (*b*) electro-magnets, connected to operate the type-delivering devices of the two type-composing machines aforesaid, respectively; (*c*) a key-board; (*d*) shiftable electrical connections between the keys of the key-board aforesaid and the type-delivering electro-magnets of the two type-composing machines aforesaid; whereby said key-board is connected now with one of the two type-composing machines aforesaid and now with the other one of said two composing machines, so that facility is afforded to the operator to set the alternate lines of type on the two type-composing machines aforesaid, alternately; said key-board and said type-composing machines being located in such proximity to each other that facility is afforded to the operator, while seated at the key-board aforesaid, to watch the two type-composing machines aforesaid and to correct transpositions and to effect hand justification, in each machine, when needed; and (e) means, operatable by the operator, while seated at the key-board aforesaid, for giving movement to the line-delivering devices of the type-composing machines aforesaid, to each line-delivering device, as required.

45. A type-composing apparatus having in combination (A) two mechanisms, each of which includes (a) a magazine of type-dies or matrices, arranged to fall by gravitation when released; (b) escapement devices for releasing the type aforesaid, each type as required; (c) assembling mechanism, for assembling the type into a line; (d) casting mechanism; (e) a line-delivering device, whereby the line of type-dies or matrices, after it has been assembled, is put into a course of motion towards the casting mechanism aforesaid; and (f) distributing mechanism, whereby the type are returned to the magazine, after they have been cast from, by the casting mechanism aforesaid; (B) a key-board, whereby the escapement devices of the two mechanisms aforesaid are operated, so that the alternate lines of type of a column or page are set and cast by the two mechanisms aforesaid alternately; and (C) means, operatable by the operator, while seated at the key-board aforesaid, for giving movement to the line-delivering devices of the two mechanisms aforesaid respectively; each line-delivering device as required.

46. A type-composing apparatus having, in combination, (A) two mechanisms, each of which includes (a) a magazine of type-dies or matrices, arranged to fall by gravitation when released; (b) escapement devices for releasing the type aforesaid; each type as required; (c) power-devices, connected to operate the escapement devices aforesaid, each escapement as required; (d) assembling mechanism, for assembling the type into a line; (e) casting mechanism; (f) a line-delivering device, whereby the line of type-dies or matrices, after it has been assembled, is put into a course of motion towards the casting mechanism aforesaid; and (g) distributing mechanism, whereby the type are returned to the magazine, after they have been cast from, by the casting mechanism aforesaid; (B) a key-board, acting through the power-devices aforesaid, to operate the escapement devices of the two mechanisms aforesaid, so that the alternate lines of type of the same column or page are set and cast by the two mechanisms aforesaid alternately; and (C) means, connected with the key-board aforesaid, for giving movement to the line-delivering devices of the two mechanisms aforesaid respectively, each line-delivering device as required.

47. A type-composing apparatus having, in combination (A) two mechanisms, each of which includes (a) a magazine of type-dies or matrices; (b) type-delivering devices; (c) electro-magnets, connected to operate the type-delivering devices aforesaid, each type-delivering device as required; (d) assembling mechanism, for assembling the type into a line; (e) casting mechanism; (f) a line-delivering device, whereby the line of type-dies or matrices, after it has been assembled, is put into a course of motion towards the casting mechanism aforesaid; and (g) distributing mechanism, whereby the type are returned to the magazine; (B) a key-board, whose keys operate the electro-magnets aforesaid and act through said electro-magnets to operate the type-delivering devices of the two mechanisms aforesaid line for line alternately, so that the alternate lines of type of the same column or page are set and cast by the two mechanisms aforesaid respectively; and (C) means, operatable by the operator, while seated at the key-board aforesaid, for giving movement to the line-delivering devices of the two mechanisms aforesaid respectively, each line delivering device as required.

48. In a composing machine, the combination of (a) a key-board; (b) means connected with said key-board for assembling the line in the assembling elevator of said composing machine; (c) an electro-magnet for giving movement to said assembling elevator; (d) a switch, operated from the key-board aforesaid and serving to control the circuit of the electro-magnet aforesaid.

49. In a composing machine, the combination of (a) a key-board; (b) means connected with said key-board for assembling the line in the assembling elevator of said composing machine; (c) an electrically-operated motor device, for giving movement to said assembling elevator; (d) a switch for controlling the electrically-operated motor device aforesaid; and (e) a key, located within reach of the operator, when seated at the key-board aforesaid; said key serving to operate the switch aforesaid.

50. In a composing machine, the combination of (a) a key-board; (b) means connected with said key-board for assembling the line in the assembling elevator of said composing machine; (c) an electro-magnet for giving movement to said assembling elevator; (d) a switch, operated from the key-board aforesaid and serving to bring the electro-magnet aforesaid into action to lift the assembling elevator; and (e) means acting automatically to break the circuit of the electro-magnet aforesaid, thereby to permit the assembling elevator to return to its normal position, in readiness to receive another line.

51. In combination, (a) a key-board, normally fixed in its position in the machine; (b) a plurality of type-composing machines, each furnished with type-delivering devices; said type-composing machines being normally connected with the key-board aforesaid successively, one machine at a time, so that the type-delivering devices of each machine are operated from said key-board, in turn, whereby successive lines of type of the same column or page are set on the composing machines aforesaid successively; (c) line-carrying devices for said type-setting machines, a line-carrying device for each such machine; (d) power-devices for operating said line-carrying devices; and (e) means for controlling said power-devices; said means being located in such proximity to the key-board aforesaid that the operator at said key-board can operate said means, while seated at such key-board.

52. In combination, (a) a plurality of type-composing machines, each furnished with type-delivering devices; (b) a key-board, normally fixed in position in the machine, and connected to operate the type-delivering devices of the type-composing machines aforesaid successively, one machine at a time, each machine in its turn, whereby successive lines of type of the same column or page are set on the composing machines aforesaid successively; (c) line-delivering devices for said type-composing machines, a line-delivering device for each such machine; (d) power mechanism, for giving movement to these line-delivering devices, each as required; and (e) keys at the key-board for operating, through the power mechanism aforesaid, the line-delivering devices aforesaid, each line-delivering device as required.

53. A type-composing apparatus, including, in combination, (a) two type-composing machines, each furnished with type-delivering devices; (b) a key-board, normally fixed in position and connected to operate the type-delivering devices of the two type-composing machines aforesaid alternately, one machine at a time, each machine as required; (c) line-delivering devices for the two composing machines aforesaid respectively; and (d) two keys, located within reach of the operator, when he is seated at the key-board aforesaid, said keys serving to operate the line-delivering devices of the two type-composing machines aforesaid respectively; the whole constituting a duplex type-composing apparatus, organized in such a manner that it normally sets alternate lines of type on the two composing machines aforesaid alternately; setting, in general, the first, third, fifth, etcetera, lines of type of a column or page on one of the two composing machines aforesaid and the second, fourth, sixth, etcetera, lines of the same column or page aforesaid on the other one of the two composing machines aforesaid; and whereby the same operator who sets the type, sends up the line of type, when set.

54. A type-composing apparatus including, in combination, (a) two type-composing machines, each furnished with type-delivering devices; (b) a key-board, connected to operate the type-delivering devices of the two type-composing machines aforesaid, each machine as required; (c) line-delivering devices for the two type-composing machines aforesaid respectively; (d) power mechanism for giving movement to these line-delivering devices, each as required; and (e) means, operatable by the key-board operator while he is seated at the key-board aforesaid, for operating, through the power mechanism aforesaid, the line-delivering devices aforesaid, each line-delivering device as required; the whole constituting a duplex type-composing apparatus, organized in such a manner that it normally sets alternate lines of type on the two composing machines aforesaid, respectively; and whereby the same operator who sets the type, sends up the line of type, when set.

55. A type-composing apparatus, including, in combination, (a) two type-composing machines, each furnished with type-delivering devices; (b) a key-board, connected to operate the type-delivering devices of the two type-composing machines aforesaid, each machine as required; (c) line-delivering devices for the two type-composing machines aforesaid respectively; (d) power mechanism for giving movement to these line-delivering devices, each as required; (e) one or more keys located within reach of the operator, when he is seated at the key-board aforesaid, for operating, through the power mechanism aforesaid, the line-delivering devices aforesaid, each as required; the whole constituting a duplex type-composing apparatus, organized in such a manner that it normally sets alternate lines of type on the two composing machines aforesaid respectively; and whereby the same operator who sets the type, sends up the line of type, when set.

56. A type-composing apparatus including, in combination (a) two type-composing machines, each furnished with type-delivering devices; (b) a key-board, connected to operate the type-delivering devices of the two type-composing machines aforesaid, each machine as required; (c) line-delivering devices for the two type-composing machines aforesaid respectively; (d) electrically-operated power-devices, for giving movement to these line-delivering devices, each as required; the whole constituting a duplex type-composing apparatus, organized in such a manner as to permit the operator to set alternate lines of type on the two composing machines aforesaid respectively; and (e) switch mechanism, operatable by the operator, when he is seated at the key-board aforesaid, serving to control the electrically-operated power-devices aforesaid, whereby the same operator who sets the type on the composing machines aforesaid, is enabled, also, to set the assembled line of type on each such machine into a course of motion towards the mold, at which the casting operations are performed.

57. A type-composing apparatus including, in combination (a) two type-composing machines, each furnished with type-delivering devices; (b) a key-board, connected to operate the type-delivering devices of the two type-composing machines aforesaid, each machine as required; (c) line-delivering devices for the two type-composing machines aforesaid respectively; (d) electrically-operated power-mechanism for giving movement to these line-delivering devices, each as required; the whole constituting a duplex type-composing apparatus, organized in such a manner as to permit the operator to set successive lines of type on the two composing machines aforesaid alternately; (e) switch mechanism, for controlling the electrically-operated power mechanism aforesaid; and (f) one or more keys at the key-board for controlling said switch mechanism; whereby the same operator who sets the type on the composing machines aforesaid, is enabled also to set the assembled line of type on each such machine into a course of motion towards the mold, at which the casting operations are performed.

58. In combination, (a) a key-board; (b) a plurality of type-composing machines, connected with said key-board and normally operated therefrom in succession, whereby successive lines of type of the same column or page are normally set on the machines aforesaid successively; (c) electro-magnets for giving movement to the assembling elevators of the machines aforesaid respectively, each as required; and (d) switches, for bringing said electro-magnets into operation, to lift their respective assembling elevators; said switches being operated from the key-board aforesaid.

59. In combination, (a) a key-board; (b) a plurality of type-composing machines, connected with said key-board and normally operated therefrom in succession, whereby successive lines of type of the same column or page are normally set on the machines aforesaid successively; (c) electro-magnets for giving movement to the assembling elevators of the machines aforesaid respectively, each as required; (d) switches, for bringing said electro-magnets into operation, to lift their respective assembling elevators; said switches being operated from the key-board aforesaid; and (e) means acting automatically to break the circuits of the electro-magnets aforesaid, each as required, thereby to permit the return of the assembling elevator, controlled by such magnet, to its normal position.

60. In a type-composing apparatus, the combination of (a) a key-board; (b) two type-composing machines, connected with said key-board; (c) shiftable connections, whereby said key-board is connected first with one of the type-composing machines aforesaid and then with the other one, and so on, alternately; (d) means located in proximity to the keys of the key-board aforesaid, and operating when a line of type has been set on one of the composing machines aforesaid, both to send up the line of type on such machine and to shift the connections of the key-board aforesaid from the machine on which a line of type has been set, and on which said line is being sent up, to the other composing machine aforesaid, on which the next line is to be set; and so on, alternately.

61. In combination (a) a plurality of type-composing machines, normally set, when acting together, to substantially the same measure and having type of substantially the same face; each of said machines being furnished with suitable type-delivering devices; (b) a key-board normally fixed in its position in the machine, for operating the type-delivering devices of all said machines, each machine as required; (c) shiftable connections between said key-board and the type-composing machines aforesaid, whereby said key-board is connected with the machines aforesaid, as required, first with one and then with another, to operate the type-delivering devices thereof, so that the successive lines of type are normally set on the several machines aforesaid, in succession; (d) a line-delivering device in each of the type-composing machines aforesaid; and (e) means, operated by the key-board operator, while seated at the key-board, acting to operate the line-delivering device of that machine on which a line has just been set; also to disconnect the type-delivering devices of such last mentioned machine from the key-board aforesaid and to connect the type-delivering devices of another machine, on which the next line is to be set, with the key-board aforesaid.

62. In combination (a) a plurality of type-composing machines, normally set, when acting together, to substantially the same measure and having type of substantially the same face; each of said machines being furnished with suitable type-delivering devices; (b) a key-board for operating all of said type-composing machines, each machine as required; (c) shiftable connections between said key-board and the type-composing machines aforesaid, whereby said key-board is connected with the machines aforesaid, as required, first with one and then with another, to operate the type-delivering devices thereof, so that the successive lines of type are normally set on the several machines aforesaid, in succession; (*d*) a line-delivering device, in each of said type-composing machines, and a power-device, connected with said line-delivering device, to operate the same; and (*e*) means operated by the keyboard operator, while seated at the key-board aforesaid; said means acting to bring the appropriate power-device into action, to operate the line-delivering device of that type-composing machine on which a line has just been set; also to disconnect the type-deliver ing devices of such machine from the key-board aforesaid and to connect the type-delivering devices of another type-composing machine with said key-board.

63. In combination (*a*) a plurality of type-composing machines normally set, when acting together, to substantially the same measure and having type of substantially the same face; each of said machines being furnished with suitable type-delivering devices; (*b*) a key-board for operating the type-composing devices of all said type-composing machines, each machine as required; (*c*) shiftable connections between said key-board and the type-composing machines aforesaid, whereby said key-board is connected with the machines aforesaid, as required, first with one and then with another, to operate the type-delivering devices thereof, so that the successive lines of type are normally set on the several machines aforesaid in succession; (*d*) a line-delivering device in each of said type-composing machines, and a power-device connected with said line-delivering device, to operate the same; and (*e*) a key, located at the key-board and acting to bring the appropriate power-device into action, to operate the line-delivering device of that type-composing machine on which a line has just been set; also to disconnect the type-delivering devices of such machine from the key-board aforesaid and to connect the type-delivering devices of another machine, on which the next line is to be set, with said key-board.

64. In combination, (*a*) a plurality of type-composing machines, each furnished with suitable type-delivering devices; (*b*) electro-magnets for operating said type-delivering devices; (*c*) a key-board for operating, through the electro-magnets aforesaid, the type-delivering devices of the type-composing machines aforesaid, each machine as required; (*d*) switch mechanism, whereby the key-board aforesaid is connected now with the type-delivering-device-operating electro-magnets of one of the type-composing machines aforesaid and now with the type-delivering-device-operating electro-magnets of another of said type-composing machines, as required; (*e*) a line-delivering device for each of said type-composing machines; and (*f*) means, operated by the key-board operator, while he is seated at the key-board aforesaid, acting to operate the line-delivering device of that composing machine on which a line has just been set and also to disconnect the type-delivering-device-operating electro-magnets of that composing machine on which a line has just been set, from the key-board aforesaid and to connect the type-delivering-device-operating electro-magnets of another composing machine, on which the next line is to be set, with the key-board aforesaid.

65. The combination of (*a*) two type-composing machines; (*b*) electro-magnets, for operating the type-delivering devices of said type-composing machines; (*c*) a key-board having keys and switches operated by said keys, to control the electro-magnets aforesaid; and (*d*) a set of oscillating change-over switches; said change-over switches and their accessories being constructed and arranged in such a manner that when said change-over switches are in one position, the key-board aforesaid is connected with the type-delivering-device-operating electro-magnets of one of the two composing machines aforesaid, and when said switches are oscillated into another position, said key-board is then connected with the type-delivering-device-operating electro-magnets of the other one of the two composing machines aforesaid.

66. In combination (*a*) two type-composing machines; (*b*) electro-magnets for operating the type-delivering devices of said type-composing machines; (*c*) a key-board, having keys and switches operated by said keys, to control the electro-magnets aforesaid; (*d*) a set of oscillating change-over switches; said change-over switches and their accessories being constructed and arranged in such a manner that when said change-over switches are in one position, the key-board aforesaid is connected with the type-delivering device-operating electro-magnets of one of the two composing machines aforesaid and when said switches are oscillated into another position, said key-board is connected with the type-delivering-device-operating electro-magnets of the other one of the two composing machines aforesaid; and (*e*) means operatable by the operator, while he is seated at the key-board aforesaid, for giving movement to the line-delivering devices of the type-composing machines aforesaid, each line-delivering device as required; whereby a single operator is enabled to operate the two composing machines aforesaid.

67. The combination of (*a*) two type-composing machines; (*b*) electro-magnets for operating the type-delivering devices of said type-composing machines; (*c*) a key-board, having keys and switches operated by said keys, to control the electro-magnets aforesaid; (*d*) a set of oscillating change-over switches; said change-over switches and their accessories being constructed and arranged in such a manner that when said change-over switches are in one position, the key-board aforesaid is connected with the type-delivering-device-operating electro-magnets of one of the two composing machines aforesaid and when said switches are oscillated into another position, said key-board is connected with the type-delivering-device-operating electro-magnets of the other one of the two composing machines aforesaid; and (e) means, operated by the key-board operator, while he is seated at the key-board aforesaid, acting to operate the line-delivering devices of that one of the two composing machines aforesaid on which a line has just been set, and also to operate the change-over switches aforesaid, thereby to disconnect the key-board aforesaid from the type-delivering-device-operating electro-magnets of the composing machine aforesaid, on which a line has just been set, and to connect said key-board with the type-delivering-device-operating electro-magnets belonging to the other one of the two composing machines aforesaid, so that the next line of type will be set thereon.

68. A type-composing apparatus including, in combination, (a) two type-composing machines, each furnished with suitable type-delivering devices; (b) a key-board; and (c) connections from said key-board to the type-delivering devices of the two type-composing machines aforesaid; the composing machines, key-board and connections aforesaid, being constructed and arranged and operating in such a manner that they afford facility to the operator both to set the letters, in general, in pairs and also to set the alternate lines of type on the two composing machines aforesaid respectively; so that he sets, in general, the first, third, fifth, etcetera, lines of type of a column or page on one of the two composing machines aforesaid, and the second, fourth, sixth, etcetera lines of type of the same column or page aforesaid on the other one of the two composing machines aforesaid.

69. A type-composing apparatus including, in combination (a) two type-composing machines, each furnished with suitable type-delivering devices; (b) a key-board; and (c) connections from said key-board to the type-delivering devices of the two type-composing machines aforesaid; the composing machines, key-board and connections aforesaid being constructed and arranged and operating in such a manner that they afford facility to the operator both to set the letters, in general, in pairs, and also to set alternate lines of type on the two composing machines aforesaid alternately; so that he sets, in general, the first, third, fifth, etcetera, lines of type of a column or page on one of the two composing machines aforesaid, and the second, fourth, sixth, etcetera, lines of type of the same column or page aforesaid on the other one of the two composing machines aforesaid; the type-composing machines aforesaid having each a suitable line-delivering device; and (d) means, operatable by the operator while seated at the key-board aforesaid for giving movement to the line-delivering devices of the type-composing machines aforesaid, each line-delivering device as required.

70. A type-composing apparatus including, in combination, (a) two type-composing machines, each furnished with suitable type-delivering devices; (b) a duplex key-board, for operating the type-delivering devices of the type-composing machines aforesaid, each machine as required; said duplex key-board having two sub-sets of keys, serving to afford facility to the operator to set two letters with a single impulse by depressing two keys simultaneously, one of said keys belonging to one of the two sub-sets of keys aforesaid and the other one of said simultaneously-depressed keys belonging to the other one of the two sub-sets of keys aforesaid; (c) connections from said key-board to the type-delivering devices aforesaid whereby, when two keys, corresponding to two consecutive letters of a word and belonging one key to one of the sub-sets of keys aforesaid and the other key to the other one of the two sub-sets of keys aforesaid, are depressed simultaneously at the key-board, the type corresponding to said letters are delivered in appropriate order by the type-delivering devices aforesaid; said duplex key-board and the connections from said key-board to the type-delivering devices aforesaid serving to afford facility to the operator to set the letters, in general, in pairs, saving one letter in a word having an odd number of letters; and the two type-composing machines aforesaid serving to afford facility to the operator to set alternate lines of type on said composing machines respectively.

71. A type-composing apparatus including, in combination (a) two type-composing machines, each furnished with suitable type-delivering devices; (b) a duplex key-board, for operating the type-delivering devices of the type-composing machines aforesaid, each machine as required; said duplex key-board having two sub-sets of keys, serving to afford facility to the operator to set two letters with a single impulse, by depressing two keys simultaneously, one of said keys belonging to one of the two sub-sets of keys aforesaid and the other one of said simultaneously-depressed keys belonging to the other one of the two sub-sets of keys aforesaid; (c) connections from said key-board to the type-delivering devices aforesaid whereby, when two keys, corresponding to two consecutive letters of a word and belonging one key to one of the two sub-sets of keys aforesaid and the other key to the other one of the two sub-sets of keys aforesaid, are depressed simultaneously at the key-board, the type corresponding to said two letters are delivered in appropriate order by the type-delivering devices aforesaid; said duplex key-board and the connections from said key-board to the type-delivering devices aforesaid serving to afford facility to the operator to set the letters, in general, in pairs, saving one letter, in a word having an odd number of letters; and the two type-composing machines aforesaid serving to afford facility to the operator to set alternate lines of type on said machines respectively; the two type-composing machines aforesaid having each a suitable line-delivering device; and (d) means, operatable by the operator, while seated at the key-board aforesaid, for giving movement to the line-delivering devices of the type-composing machines aforesaid, each line-delivering device as required.

72. The combination of (a) a duplex key-board, whereby facility is afforded to the operator to select the letters in pairs, as before described; (b) a plurality of type-composing machines, each furnished with type-delivering devices; and (c) shiftable connections between the duplex key-board and the type-composing machines aforesaid, whereby said key-board is connected with the type-delivering devices of the type-composing machines aforesaid, one machine at a time, each machine as required.

73. The combination of (a) a duplex key-board, whereby facility is afforded to the operator to select the letters in pairs, as before described; (b) a plurality of type-composing machines, each furnished with type-delivering devices; said composing machines being normally set, when co-acting, to substantially the same measure and having type of substantially the same face; and (c) shiftable connections between the said key-board and the type-composing machines aforesaid, whereby said key-board is connected first with one of the type-composing machines aforesaid, to operate the type-delivering devices thereof, and then with another of said machines, to operate its type-delivering devices; and so on; whereby successive lines of type are normally set on the machines aforesaid successively.

74. The combination, in a type-composing apparatus of (a) a plurality of type-setting machines, each furnished with suitable type-delivering devices; (b) a duplex key-board for operating the type-delivering devices of the type-setting machines aforesaid, each machine as required; said duplex key-board having two sets of keys, to wit, a quick-acting set of keys and a slower-acting set of keys; the whole apparatus being constructed, arranged and operating in such a manner that when two keys, one belonging to the quick-acting set and the other to the slow-acting set of keys aforesaid, are depressed simultaneously, the type which is released by the type-delivering device that corresponds to and is controlled by the quick-acting keys depressed, reaches its place in the line of type that is being assembled, in advance of the type which is released by the other type-delivering device which corresponds to and is controlled by the slower-acting key, which was simultaneously depressed, as aforesaid.

75. The combination, in a type-composing apparatus, of (a) a plurality of type-setting machines, each furnished with suitable type-delivering devices; (b) a duplex key-board for operating the type-delivering devices of the type-setting machines aforesaid, each machine as required; said duplex key-board having two sets of keys, to wit, a quick-acting set of keys and a slower-acting set of keys; the whole apparatus being constructed, arranged and operating in such a manner that when two keys, one belonging to the quick-acting set and the other to the slower-acting set of keys aforesaid are depressed simultaneously, the type which is released by the type-delivering device that corresponds to and is controlled by the quick-acting key depressed, reaches its place in the line of type that is being assembled in advance of the type which is released by the other type-delivering device which corresponds to and is controlled by the slower-acting key, which was simultaneously depressed, as aforesaid; and (c) shiftable connections between the keys at the key-board aforesaid and the type-delivering devices of the type-setting machines aforesaid, whereby the keys at the key-board aforesaid are connected now with the type-delivering devices of one of the type-setting machines aforesaid, and then with the type-delivering devices of another of said type-setting machines, so that the successive lines of type are set on the several type-setting machines aforesaid, in serial order.

76. The combination, in a type-composing apparatus of (a) a plurality of type-setting machines, each furnished with suitable type-delivering devices; (b) a duplex key-board, for operating the type-delivering devices of the type-setting machines aforesaid, each machine as required; (c) quick-acting connections between the keys of one set and the type-delivering devices controlled by them, and slower-acting connections between the keys of the other set and the type-delivering devices controlled by them; so that when two keys, one belonging to the one set and the other to the other set of keys before mentioned, are depressed simultaneously, the type which is released by the type-delivering device that is controlled by the key depressed which key belongs to the set of keys before mentioned as having quick-acting connections to the type-releasing devices, will be assembled, in the line of type that is being assembled, in advance of the type which is released, by the type-delivering device that is controlled by the key depressed, which key belongs to the set of keys before mentioned as having slower-acting connections to the type-delivering devices aforesaid.

77. The combination, in a type-composing apparatus, of (a) a plurality of type-setting machines, each furnished with suitable type-delivering devices; (b) a duplex key-board, for operating the type-delivering devices of the type-setting machine aforesaid, each machine as required, said duplex key-board having two sets of keys to afford facility to the operator to make two letters with a single impulse by depressing two keys simultaneously; one of said keys belonging to one of the two sets aforesaid, and the other of said keys belonging to the other of said two sets of keys; (c) quick-acting connections between the keys of one set and the type-delivering devices controlled by them, and slower-acting connections between the keys of the other set and the type-delivering devices controlled by them, so that when two keys, one belonging to the one set and the other to the other set of keys before mentioned, are depressed simultaneously, the type which is released by the type-delivering device that is controlled by the key depressed, which key belongs to the set of keys before mentioned as having quick-acting connections to the type-releasing devices aforesaid, will be assembled, in the line of type that is being assembled, in advance of the type which is released by the type-delivering device that is controlled by the key depressed, which key belongs to the set of keys before mentioned as having slower-acting connections to the type-delivering devices aforesaid; and (d) shiftable connections between the keys at the key-board aforesaid, and the type-delivering devices of the type-setting machines aforesaid, whereby the keys at the key-board aforesaid are connected now with the type-delivering devices of one of the type-setting machines aforesaid, and then with the type-delivering devices of another of said type-setting machines, so that successive lines of type are set on the type-setting machines aforesaid, in serial order.

78. The combination, in a type-composing apparatus, of (a) a plurality of type-setting machines, each furnished with suitable type-delivering devices; (b) a duplex key-board, for operating the type-delivering devices of the type-setting machines aforesaid, each machine as required; said duplex key-board having two sub-sets of keys to afford facility to the operator to set two letters at a time, by depressing two keys simultaneously, one of said keys belonging to one of the sub-sets aforesaid and the other of said keys belonging to the other sub-set of keys aforesaid; (c) electro-magnets for operating the type-delivering devices of the type-setting machines aforesaid, (d) switches operated by the keys at the key-board aforesaid, serving to control the circuits of the electro-magnets aforesaid; (e) quick-acting electrical connections between the keys of one of the two sub-sets aforesaid and the type-delivering-device-operating electro-magnets, controlled by said keys, and slower-acting electrical connections between the keys of the other one of the two sub-sets aforesaid and the type-delivering-device-operating electro-magnets controlled by said keys; whereby, when two keys, one belonging to the one, and the other to the other of the sub-sets aforesaid, are depressed simultaneously, in order to set two consecutive letters of a word with a single impulse on the part of the operator, the first in order in the word of these letters is released by the quick-acting connections aforesaid, before the second in order of said letters is released by the slower-acting connections aforesaid; and (f) shiftable connections between the keys at the key-board aforesaid and the type-delivering-device-operating electro-magnets of the type-setting machines aforesaid, whereby the keys at the key-board aforesaid are connected now with the type-delivering-device-operating electro-magnets of one of the type-setting machines aforesaid and then with the similar electro-magnets of another of the type-setting machines aforesaid; whereby successive lines of type of the same column or page are normally set on the type-setting machines aforesaid successively.

79. In a type-composing apparatus, the combination of (a) a key-board; (b) a plurality of line-casting machines, each of which is provided with assembling devices for assembling its type-dies or matrices into a line; said line-casting machines being controlled from the key-board aforesaid, each as required, and being located in such proximity to said key-board that the operator, while seated at the key-board can observe the line-assembling devices of each of the line-casting machines aforesaid, each as required, and can make corrections and effect hand justification in each of said machines, as required; (c) line-casting apparatus and slug-ejecting apparatus in each of the line-casting machines aforesaid; and (d) slug-assembling mechanism, by which the slugs, when ejected from the several line-casting machines aforesaid, are assembled in due order into a common galley or column.

80. In a type-composing apparatus, the combination of (a) a key-board; (b) a plurality of line-casting machines, each of which is provided with assembling devices for assembling its type-dies or matrices into a line; said line-casting machines being controlled from the key-board aforesaid, each as required, and being located in such proximity to said key-board that the operator, while seated at the key-board can observe the line-assembling devices of each of the line-casting machines aforesaid, each as required, and can make corrections and effect hand justification in each of said machines, as required; (c) line-casting apparatus and slug-ejecting apparatus in each of the line-casting machines aforesaid; (d) a slug-assembling device; and (e) a moving conveyer, on to which the slugs from the several line-casting machines aforesaid are ejected and by which they are carried to the slug-assembling device aforesaid, whereby the slugs from the several line-casting machines aforesaid, controlled from the key-board aforesaid, are arranged in due order in a common galley or column.

81. In a type-composing apparatus, the combination of (a) a key-board; (b) a plurality of line-casting machines, connected with said key-board and normally operated therefrom successively, whereby successive lines of type of the same column or page are set on the machines aforesaid successively; said composing machines being located in such proximity to the key-board aforesaid that the operator, while seated at the key-board, can make corrections and effect hand justification in each of the line-casting machines aforesaid, as required, the assembling devices aforesaid including an assembling elevator, in which the line is assembled; said elevator being operable from the key-board aforesaid, so that the same operator who sets the line sends up the line of type, when set; (c) line-casting apparatus and slug-ejecting apparatus in each of the line-casting machines aforesaid; and (d) slug-assembling mechanism, by which the slugs, when ejected from the several line-casting machines aforesaid, are assembled in due order into a common galley or column.

82. In a type-composing apparatus, the combination of (a) a key-board; (b) two line-casting machines, connected with said key-board and each provided with matrices corresponding to letters of the alphabet and with releasing devices for said matrices, whereby the several matrices are released, each as required; (c) assembling devices in each of the line-casting machines aforesaid for assembling the matrices of such machine into a line, as required; the line-casting machines aforesaid being located one at the right and the other at the left of the key-board aforesaid and in such proximity to said key-board, that the operator, while seated at the key-board can observe the line-assembling devices in the machines aforesaid, each machine as required, and can make corrections and effect hand justification in each of said machines, as required; (d) line-casting apparatus and slug-ejecting apparatus in each of the line-casting machines aforesaid; and (e) slug-assembling mechanism, by which the slugs, when ejected from the several line-casting machines aforesaid, are assembled in due order into a common galley or column.

83. In a type-composing apparatus, the combination of (a) a key-board; (b) two line-casting machines, connected with said key-board and each provided with matrices corresponding to letters of the alphabet and with releasing devices for said matrices, whereby the several matrices are released, each as required; (c) assembling devices in each of the line-casting machines aforesaid for assembling the matrices of such machine into a line, as required; the line-casting machines aforesaid being located one at the right and the other at the left of the key-board aforesaid and in such proximity to said key-board, that the operator, while seated at the key-board can observe the line-assembling devices in the machines aforesaid, each machine as required, and can make corrections and effect hand justification in each of said machines, as required; (d) line-casting apparatus and slug-ejecting apparatus in each of the line-casting machines aforesaid; (e) a slug-assembling device; and (f) a moving conveyer, on to which the slugs from the several line-casting machines aforesaid are ejected and by which they are carried to the slug-assembling device aforesaid, whereby the slugs from the several line-casting machines aforesaid, controlled from the key-board aforesaid, are assembled in due order in a common galley or column.

84. In a type-composing apparatus, the combination of (a) a key-board; (b) two line-casting machines connected with said key-board and normally operated therefrom alternately, whereby successive lines of type of the same column or page are set on said machines alternately, the first, third, fifth, etcetera, lines on the one machine and the second, fourth, sixth, etcetera, lines of the same column or page on the other machine aforesaid; the line-casting machines aforesaid being each provided with matrices corresponding to the letters of the alphabet and with releasing devices for said matrices, whereby the several matrices are released, each as required; (c) assembling devices in each of the line-casting machines aforesaid, for assembling the matrices of such machine into a line, as required; the line-casting machines aforesaid being located one at the right and the other at the left of the key-board aforesaid and in such proximity to said key-board, that the operator, while seated at the key-board, can observe the line-assembling devices in the machines aforesaid, each machine as required, and can make corrections and effect hand justification in each of said machines, as required, the assembling devices aforesaid including an assembling elevator in which the line is assembled; said elevator being operable from the key-board aforesaid, so that the same operator who sets the line sends up the line of type, when set; (d) line-casting apparatus and slug-ejecting apparatus in each of the line-casting machines aforesaid; and (e) slug-assembling mechanism, by which the slugs, when ejected from the several line-casting machines aforesaid, are assembled in due order into a common galley or column.

85. In a type-composing apparatus, the combination of (a) a duplex key-board whereby facility is afforded to the operator to set the letters in pairs, as before described; (b) a plurality of line-casting machines, each of which is provided with assembling devices for assembling its type-dies or matrices into a line; said composing machines being controlled from the key-board aforesaid, each as required, and being located in such proximity to said key-board that the operator, while seated at the key-board, can observe the line-assembling devices of the line-casting machines aforesaid, each as required, and can make corrections and effect hand justification in each of said machines, as required; (c) line-casting and slug-ejecting apparatus in each of the line-casting machines aforesaid; and (d) slug-assembling mechanism, by which the slugs, when ejected from the several line-casting machines aforesaid, are assembled in due order into a common galley or column.

86. In a type-composing apparatus, the combination of (a) a plurality of line-casting machines, each of which is provided with type-releasing devices and also with assembling devices for assembling its type-dies or matrices into a line; (b) a duplex key-board for operating the line-casting machines aforesaid, each as required; said key-board having two sub-sets of keys to afford facility to the operator to set the letters in pairs, by depressing two keys simultaneously, one key belonging to the one and the other to the other of the two sub-sets of keys aforesaid; (c) shiftable connections between the duplex key-board aforesaid and the line-casting machines aforesaid, whereby said key-board is connected now with one and now with another of said line-casting machines as required; the connections for this purpose including (i) quick-acting connections between one of the sub-sets of keys aforesaid and the type-releasing devices of the line-casting machine with which the key-board aforesaid is, at the moment, connected; and (ii) slower-acting connections between the other sub-set of keys aforesaid and the type-releasing devices of the line-casting machine with which said key-board is, at the time, connected; whereby, when two keys are depressed simultaneously by the operator, one key belonging to one and the other to the other of the two sub-sets of keys aforesaid, the type-releasing device corresponding to the quick-acting key depressed, is operated at once while the type-releasing device corresponding to the slower-acting key depressed is operated a fraction of a second later; (d) line-casting apparatus and slug-ejecting apparatus in each of the line-casting machines aforesaid; and (e) slug-assembling mechanism, by which the slugs, when ejected from the several line-casting machines aforesaid, are assembled in due order into a common galley or column.

In testimony whereof, I have hereunto set my hand, at New York city, New York, this 7th day of December, 1927.

THADDEUS CAHILL.